(12) United States Patent
Volmerding et al.

(10) Patent No.: US 11,486,289 B2
(45) Date of Patent: Nov. 1, 2022

(54) BODY MIXING DECOMPOSITION REACTOR

(71) Applicant: Cummins Emission Solutions Inc., Columbus, IN (US)

(72) Inventors: Matthew K. Volmerding, Columbus, IN (US); Ryan M. Johnson, Cottage Grove, WI (US); Jim L. Alonzo, Verona, WI (US); Samuel Johnson, East Wenatchee, WA (US); Apoorv Kalyankar, Madison, WI (US); Pranjal Naik, Stoughton, WI (US); Kartiki Jagtap, Pune (IN); Mahendra Mittapalli, Mancherial (IN)

(73) Assignee: CUMMINS EMISSION SOLUTIONS INC., Columbus, IN (US)

( * ) Notice: Subject to any disclaimer, the term of this patent is extended or adjusted under 35 U.S.C. 154(b) by 0 days.

(21) Appl. No.: 17/255,310

(22) PCT Filed: Jul. 3, 2018

(86) PCT No.: PCT/US2018/040737
§ 371 (c)(1),
(2) Date: Dec. 22, 2020

(87) PCT Pub. No.: WO2020/009694
PCT Pub. Date: Jan. 9, 2020

(65) Prior Publication Data
US 2021/0270174 A1    Sep. 2, 2021

(51) Int. Cl.
*F01N 3/28* (2006.01)
*B01D 53/94* (2006.01)
(Continued)

(52) U.S. Cl.
CPC ....... *F01N 3/2892* (2013.01); *B01D 53/9431* (2013.01); *B01F 25/3131* (2022.01);
(Continued)

(58) Field of Classification Search
CPC .. F01N 3/2892; F01N 3/2066; F01N 2240/20; F01N 2610/02; F01N 2610/1453;
(Continued)

(56) References Cited

U.S. PATENT DOCUMENTS

| 4,111,778 A | 9/1978 | Davis et al. |
| 4,534,213 A | 8/1985 | Mirikidani |

(Continued)

FOREIGN PATENT DOCUMENTS

| CN | 210858886 U | 6/2020 |
| CN | 211116205 U | 7/2020 |

(Continued)

OTHER PUBLICATIONS

Dwyer, "Air Velocity Measurement," retrieved from https://www.dwyer-inst.com/products/airvelocityintroduction.cfm, 6 pages (2010).
(Continued)

*Primary Examiner* — Tom P Duong
(74) *Attorney, Agent, or Firm* — Foley & Lardner LLP

(57) ABSTRACT

A mixing assembly for an exhaust system can include an outer body, a front plate, a back plate, a middle member, and an inner member. The outer body defines an interior volume and has a center axis. The front plate defines an upstream portion of the interior volume and the back plate defines a downstream portion of the interior volume. The middle member is positioned transverse to the center axis and defines a volume. The inner member is positioned coaxially with the middle member inside the middle member. The front plate includes inlets configured to direct exhaust to (i) a first flow path into an interior of the inner member, (ii) a
(Continued)

second flow path into the volume of the middle member between a sidewall of the middle member and a sidewall of the inner member, and (iii) a third flow path into the interior volume of the outer body.

20 Claims, 46 Drawing Sheets

(51) Int. Cl.
*F01N 3/20* (2006.01)
*B01F 25/313* (2022.01)

(52) U.S. Cl.
CPC ........ *F01N 3/2066* (2013.01); *F01N 2240/20* (2013.01); *F01N 2610/02* (2013.01); *F01N 2610/1453* (2013.01)

(58) Field of Classification Search
CPC ............. F01N 2470/02; B01D 53/9431; B01F 25/3131
USPC ........................................................ 422/176
See application file for complete search history.

(56) References Cited

U.S. PATENT DOCUMENTS

| | | | |
|---|---|---|---|
| 4,851,015 A | 7/1989 | Wagner et al. | |
| 5,009,065 A | 4/1991 | Howe | |
| 5,285,640 A * | 2/1994 | Olivo | F01N 3/2006 422/174 |
| 5,355,973 A | 10/1994 | Wagner | |
| 5,403,557 A | 4/1995 | Harris | |
| 5,521,339 A | 5/1996 | Despain et al. | |
| 6,158,214 A | 12/2000 | Kempka et al. | |
| 6,220,021 B1 | 4/2001 | Frederiksen | |
| 6,651,773 B1 | 11/2003 | Marocco | |
| 6,722,123 B2 | 4/2004 | Liu et al. | |
| 6,729,127 B2 * | 5/2004 | Woerner | F01N 3/035 60/299 |
| 6,732,509 B2 | 5/2004 | Shiga | |
| 6,843,104 B2 | 1/2005 | Busch | |
| 6,976,397 B2 | 12/2005 | Widmer | |
| 7,104,358 B2 | 9/2006 | Frederiksen | |
| 7,273,592 B2 | 9/2007 | Jacob et al. | |
| 7,415,901 B2 | 8/2008 | Desrochers et al. | |
| 7,430,855 B2 | 10/2008 | Amemiya et al. | |
| 7,533,520 B2 | 5/2009 | Cheng et al. | |
| 7,665,797 B1 | 2/2010 | Brosseau | |
| 8,079,211 B2 | 12/2011 | Levin et al. | |
| 8,114,364 B2 | 2/2012 | Harinath et al. | |
| 8,220,253 B2 | 7/2012 | Werni et al. | |
| 8,240,137 B2 | 8/2012 | Liu et al. | |
| 8,341,936 B2 | 1/2013 | Zhang | |
| 8,371,109 B2 | 2/2013 | Endo et al. | |
| 8,393,147 B2 | 3/2013 | Gerges | |
| 8,528,319 B2 | 9/2013 | Wilhelm et al. | |
| 8,580,003 B2 | 11/2013 | Mitsuda | |
| 9,010,096 B2 | 4/2015 | Golin et al. | |
| 9,103,252 B2 | 8/2015 | Golin et al. | |
| 9,221,016 B2 | 12/2015 | Van Niekerk et al. | |
| 9,346,790 B2 * | 5/2016 | Alvaro | A61P 25/18 |
| 9,352,276 B2 | 5/2016 | Sampath | |
| 9,435,240 B2 * | 9/2016 | Sampath | B01F 25/102 |
| 9,556,781 B2 | 1/2017 | Ludeman et al. | |
| 9,790,832 B2 | 10/2017 | Mitsuda | |
| 10,188,994 B2 * | 1/2019 | Tyni | B01D 53/94 |
| 10,493,410 B2 | 12/2019 | Muruganantham et al. | |
| 2004/0040782 A1 | 3/2004 | Frederiksen | |
| 2004/0099475 A1 | 5/2004 | Schulte | |
| 2007/0039316 A1 | 2/2007 | Bosanec et al. | |
| 2007/0101703 A1 | 5/2007 | Kanaya et al. | |
| 2007/0214862 A1 | 9/2007 | Kubinski et al. | |
| 2008/0041043 A1 | 2/2008 | Andersen | |
| 2009/0007551 A1 | 1/2009 | Wahlstrom et al. | |
| 2009/0145689 A1 | 6/2009 | Han | |
| 2009/0266644 A1 | 10/2009 | Price | |
| 2010/0064662 A1 | 3/2010 | Hinz et al. | |
| 2010/0107614 A1 | 5/2010 | Levin et al. | |
| 2010/0139258 A1 | 6/2010 | Hackett et al. | |
| 2010/0196225 A1 | 8/2010 | Harinath et al. | |
| 2010/0212292 A1 | 8/2010 | Rusch et al. | |
| 2010/0263359 A1 * | 10/2010 | Haverkamp | F01N 3/2066 60/303 |
| 2010/0319329 A1 * | 12/2010 | Khadiya | F01N 3/0256 60/303 |
| 2011/0030343 A1 | 2/2011 | Kiser et al. | |
| 2011/0094206 A1 | 4/2011 | Liu et al. | |
| 2011/0099978 A1 | 5/2011 | Davidson et al. | |
| 2011/0107743 A1 | 5/2011 | Ranganathan et al. | |
| 2011/0113759 A1 | 5/2011 | Tilinski et al. | |
| 2011/0131958 A1 | 6/2011 | Adelman et al. | |
| 2011/0146253 A1 | 6/2011 | Isada et al. | |
| 2011/0146254 A1 | 6/2011 | Yi et al. | |
| 2011/0167805 A1 | 7/2011 | Chen | |
| 2011/0180347 A1 | 7/2011 | Butler | |
| 2012/0090305 A1 | 4/2012 | Floyd et al. | |
| 2012/0102920 A1 | 5/2012 | Pipis, Jr. | |
| 2012/0174561 A1 | 7/2012 | Troxler et al. | |
| 2012/0324872 A1 | 12/2012 | Jaruvatee et al. | |
| 2013/0031891 A1 | 2/2013 | Ponnathpur | |
| 2013/0061577 A1 | 3/2013 | Floyd et al. | |
| 2013/0340417 A1 | 12/2013 | Morey et al. | |
| 2014/0230411 A1 * | 8/2014 | De Rudder | F01N 3/2892 60/274 |
| 2014/0325967 A1 * | 11/2014 | Kimura | B01F 23/2132 60/286 |
| 2015/0101318 A1 | 4/2015 | Munnannur et al. | |
| 2015/0233276 A1 | 8/2015 | Cassity et al. | |
| 2016/0006111 A1 | 1/2016 | Miskovsk et al. | |
| 2016/0084133 A1 | 3/2016 | Sampath et al. | |
| 2016/0215673 A1 | 7/2016 | Noren et al. | |
| 2017/0074133 A1 | 3/2017 | Reichelt et al. | |
| 2017/0361273 A1 | 12/2017 | Zoran et al. | |
| 2017/0370262 A1 | 12/2017 | Zoran et al. | |

FOREIGN PATENT DOCUMENTS

| | | |
|---|---|---|
| CN | 112196645 A | 1/2021 |
| DE | 102 03 310 A1 | 7/2003 |
| DE | 103 48 175 A1 | 5/2004 |
| DE | 10 2008 018 063 A1 | 11/2008 |
| DE | 10 2009 036 511 A | 2/2011 |
| EP | 0 556 846 A1 | 8/1993 |
| EP | 0 931 913 A1 | 7/1999 |
| EP | 0 978 721 A1 | 2/2000 |
| EP | 1 748 162 A1 | 1/2007 |
| GB | 2 448 993 A | 11/2008 |
| WO | WO-2011/126930 A2 | 10/2011 |
| WO | WO-2011/163395 A1 | 12/2011 |
| WO | WO-2013/025860 A1 | 2/2013 |
| WO | WO-2018/040300 | 3/2018 |

OTHER PUBLICATIONS

Elnady, et al., "Investigation of the Acoustic Performance of After Treatment Devices," SAE International Journal of Passenger Cars—Mechanical Systems 42(2), pp. 1068-1075 (2011).
Extended European Search Report in European Patent App. No. 13154457.9 dated May 7, 2013, 7 pages.
Howard & Craig, "Adaptive-Passive Quarter-Wave Tube Resonator Silencer," Proceedings of Acoustics 2011, 64, 6 pages (2011).
International Search Report & Written Opinion in PCT/US2015/010837, dated May 6, 2015, 9 pages.
International Search Report & Written Opinion inin PCT/US2018/040737, dated Sep. 7, 2018, 9 pages.
International Search Report and Written opinion for PCT/US2018/00259, dated Dec. 6, 2018, 10 pages.

(56) References Cited

OTHER PUBLICATIONS

Office Action issued for U.S. Appl. No. 17/042,578 dated May 12, 2021, 34 pages.

* cited by examiner

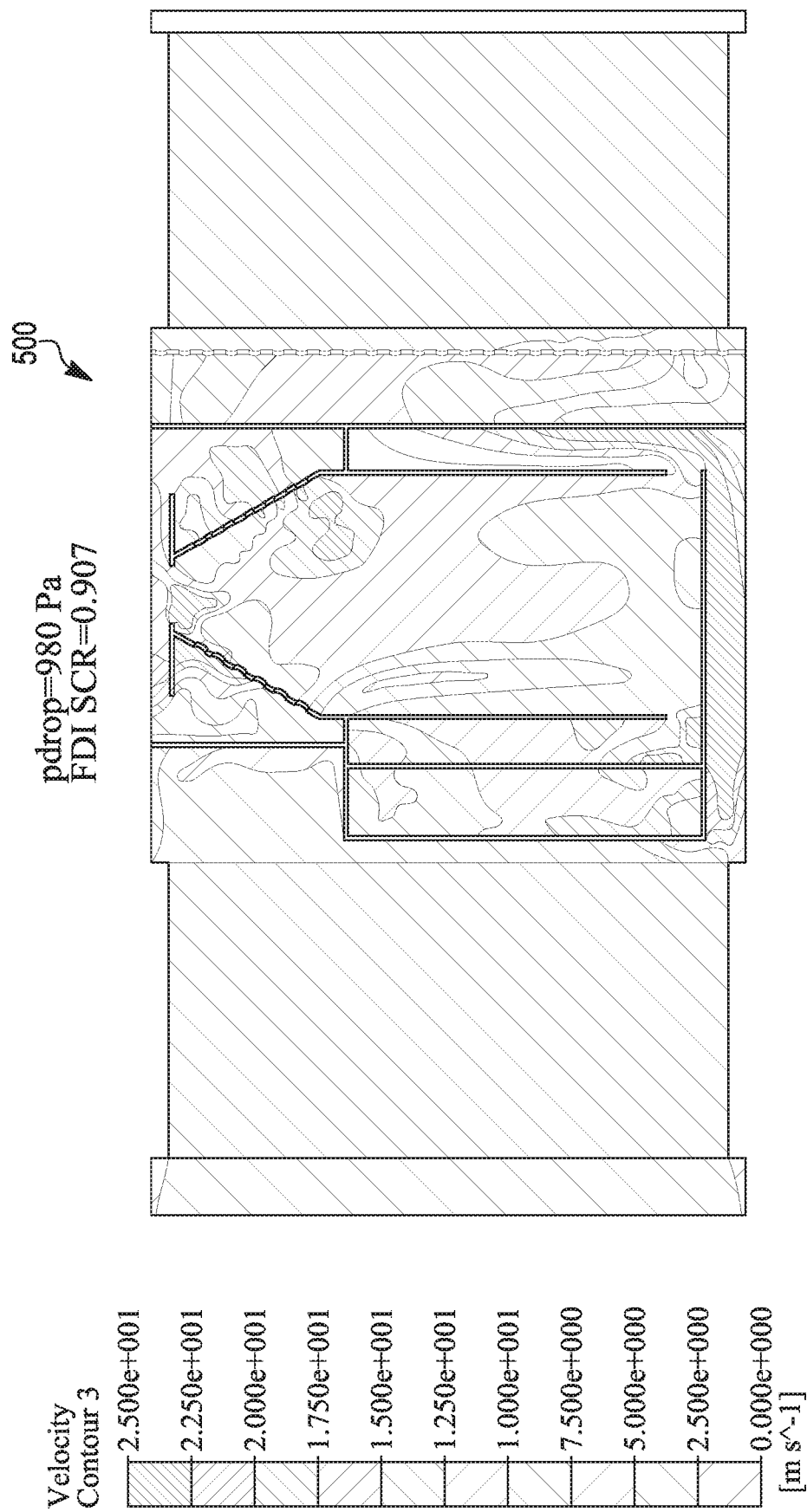

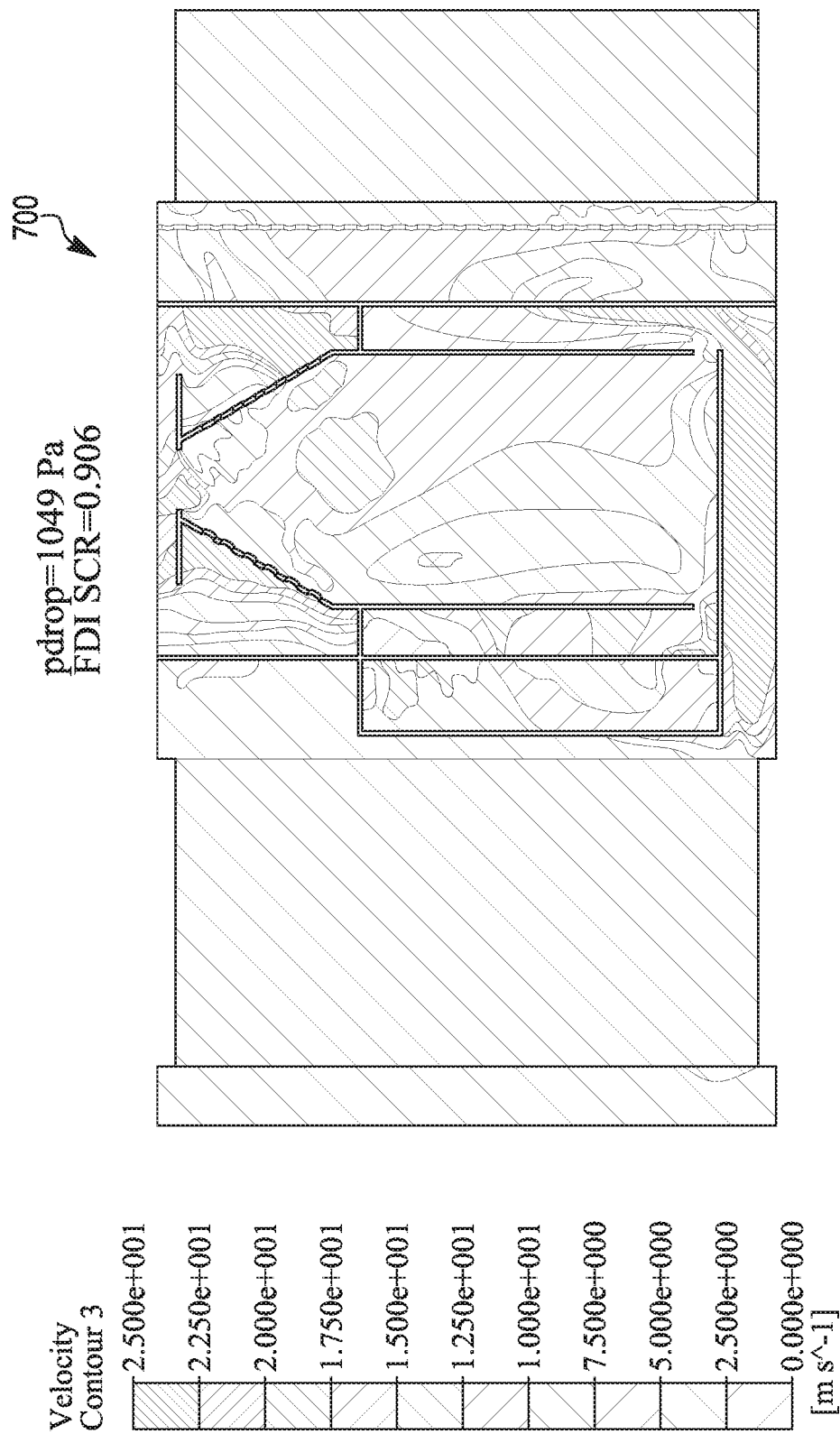

FIG. 23
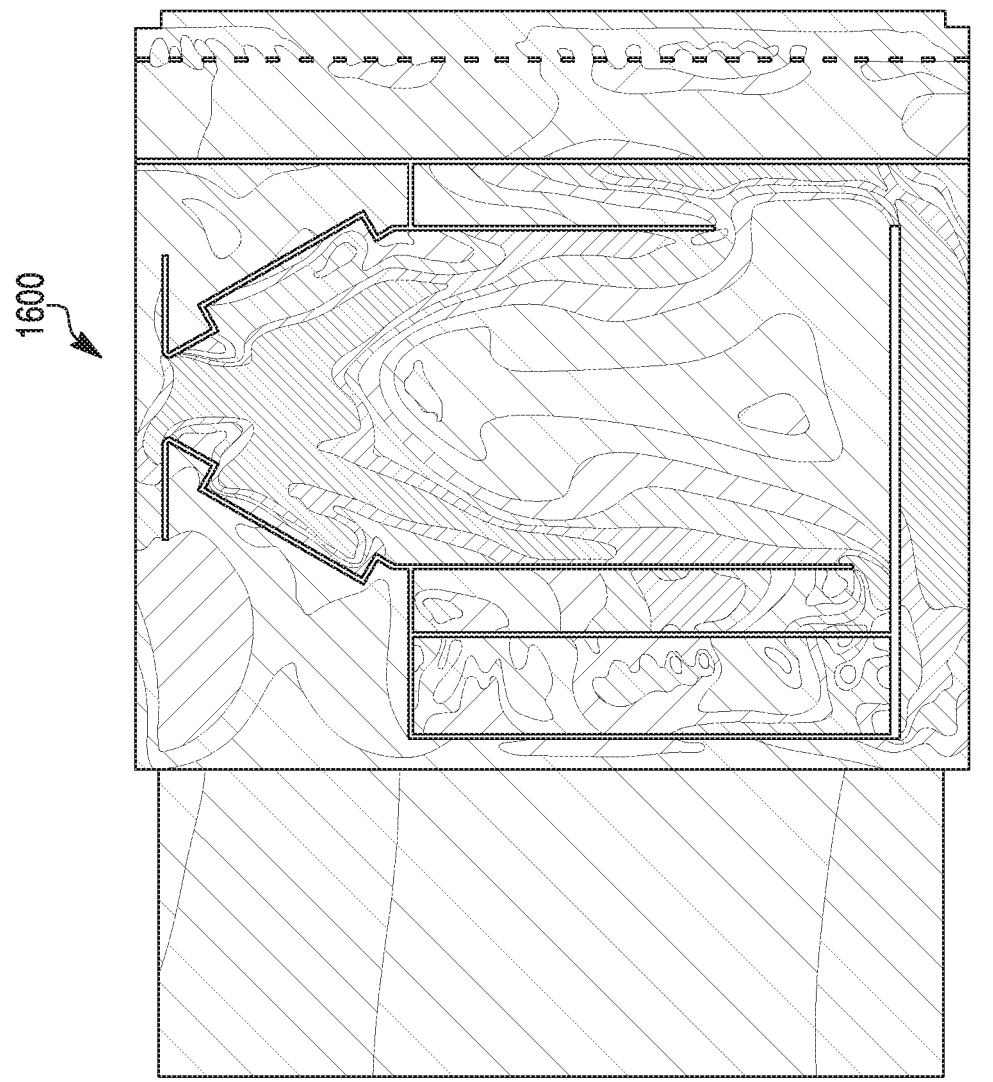
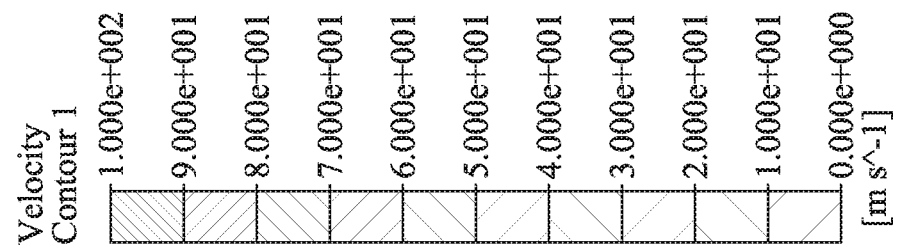

FIG. 25
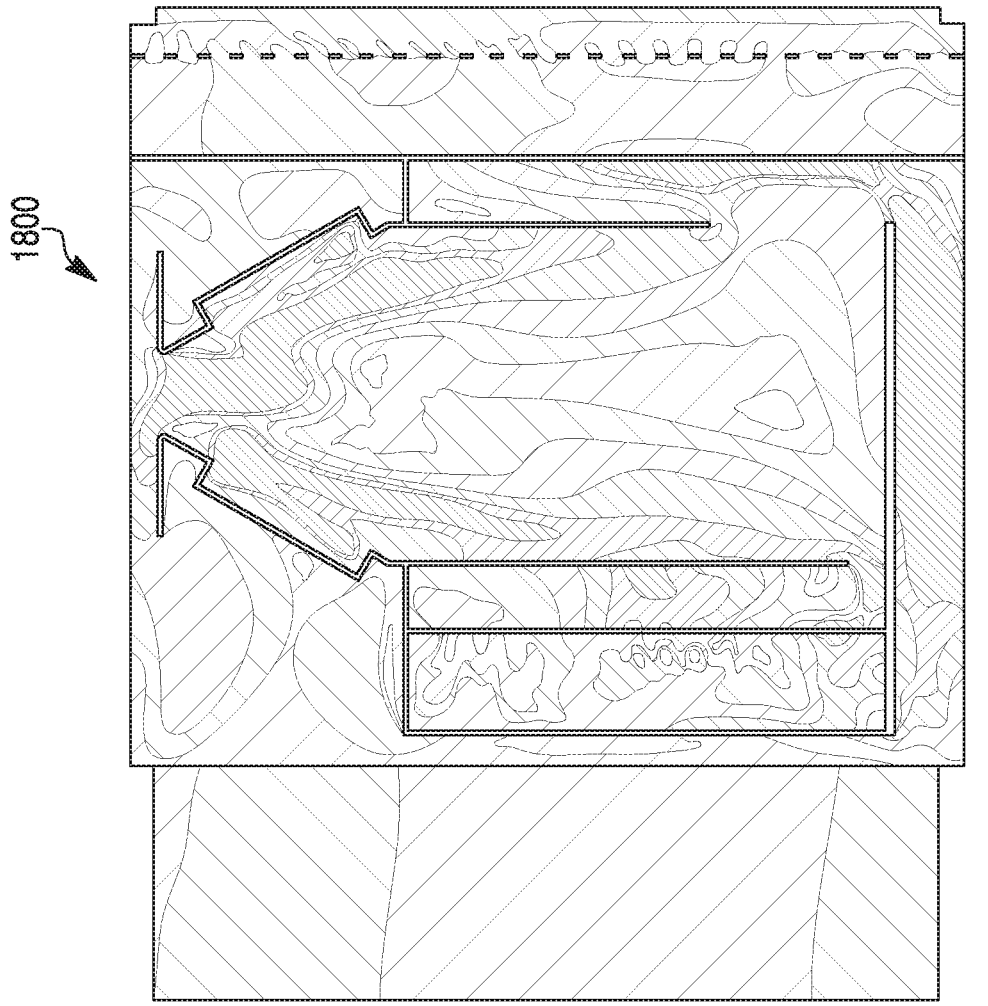
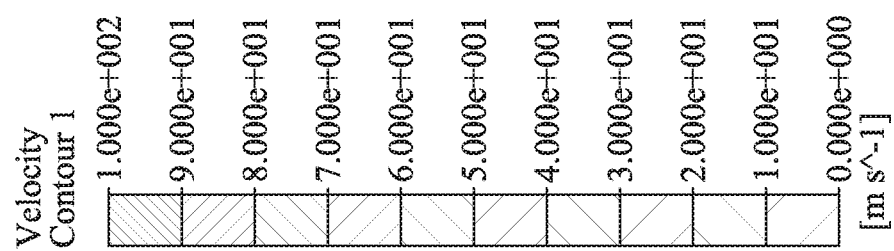

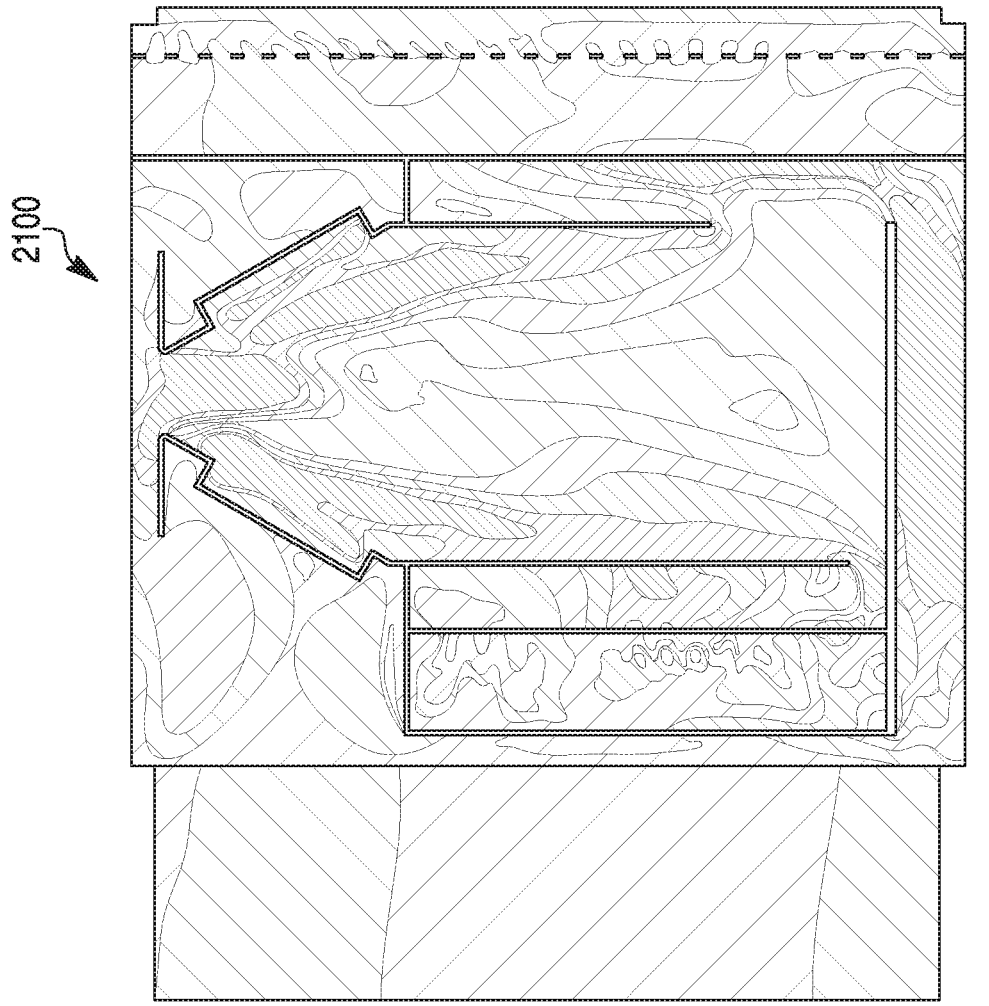
FIG. 28
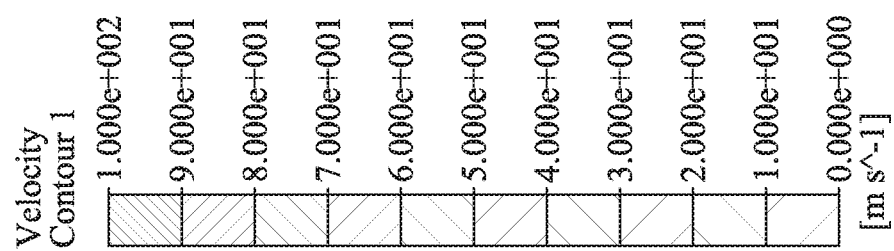

FIG. 31
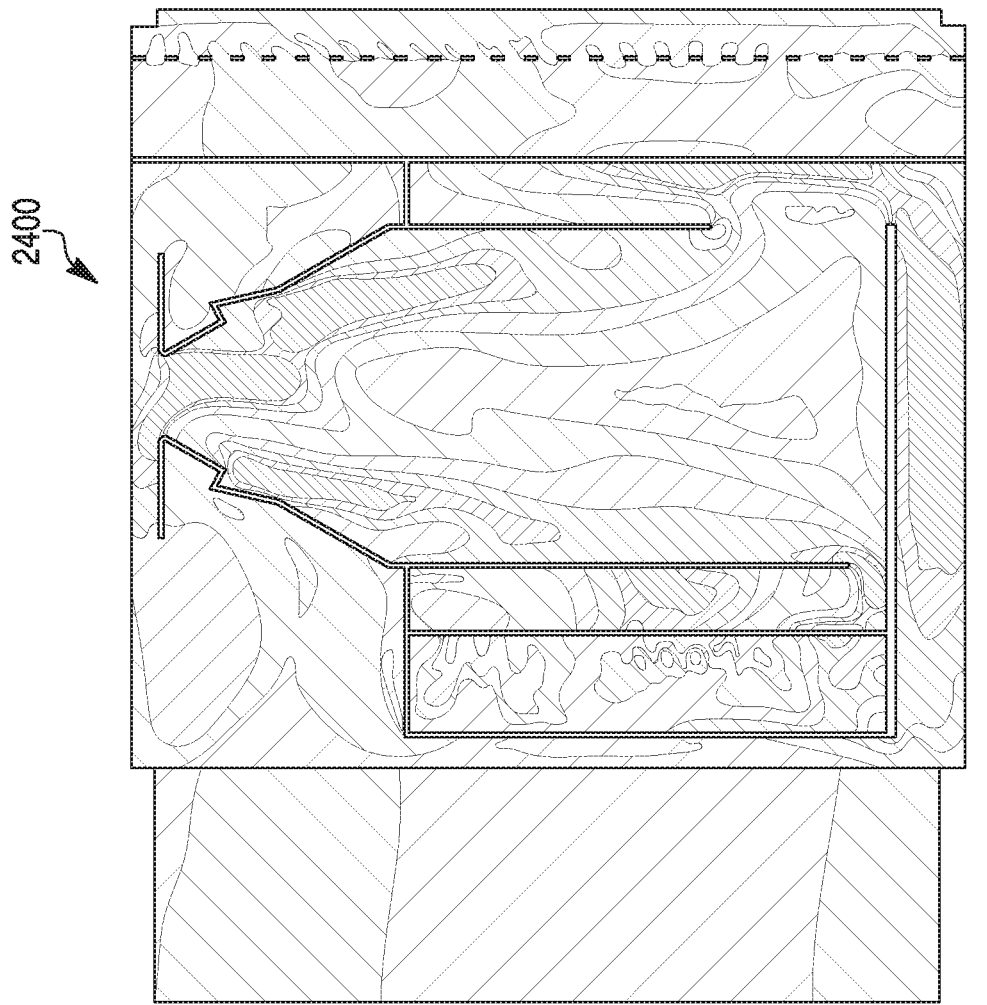
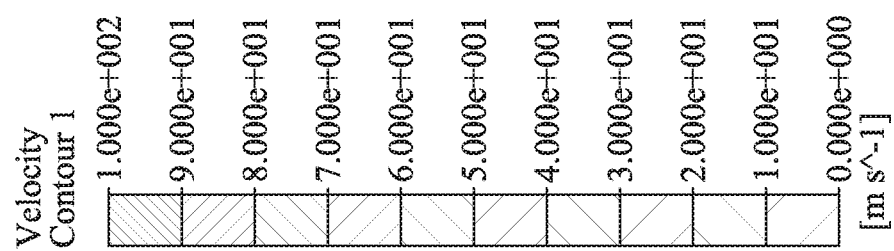

FIG. 34
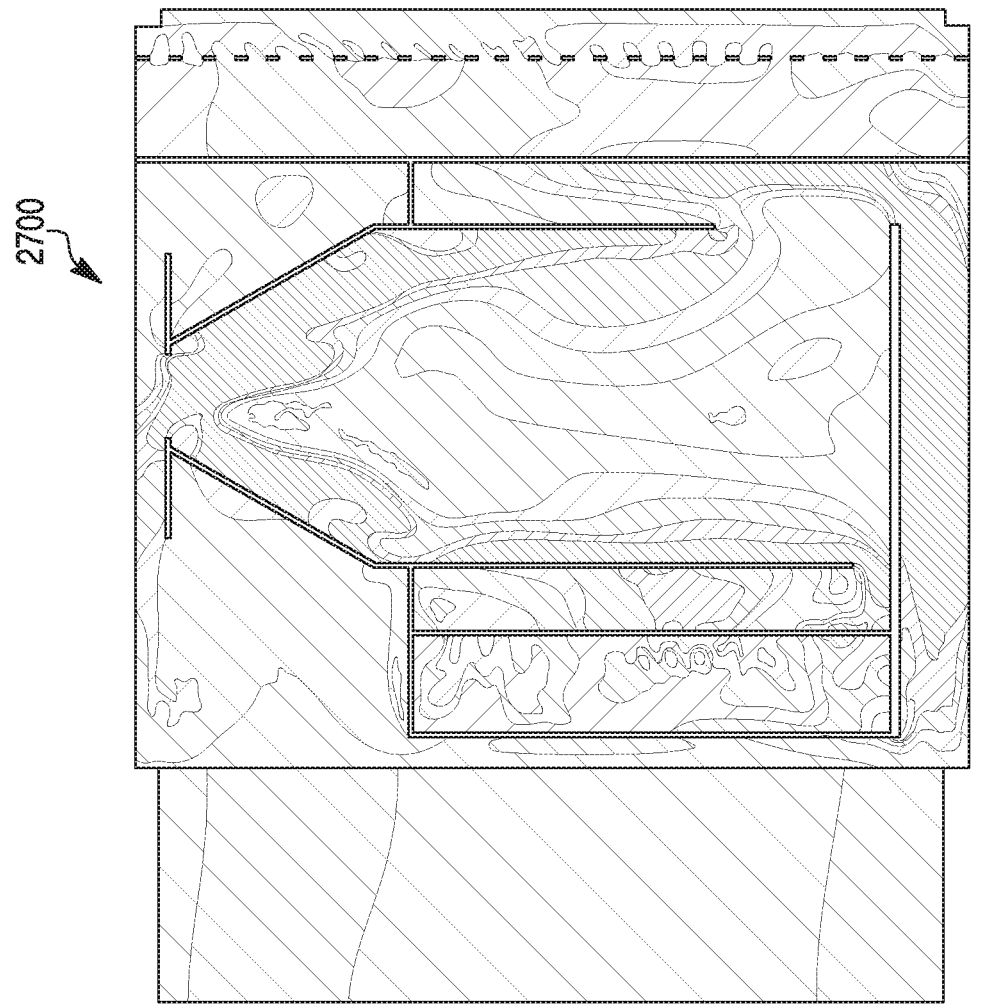
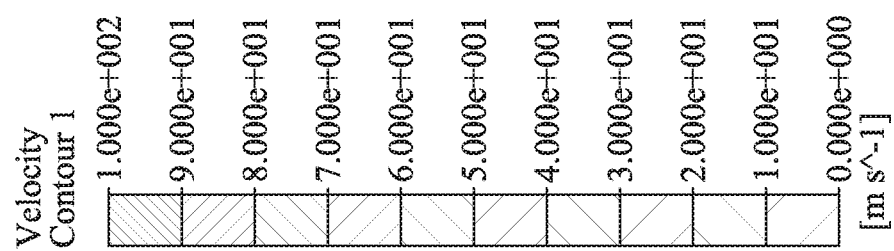

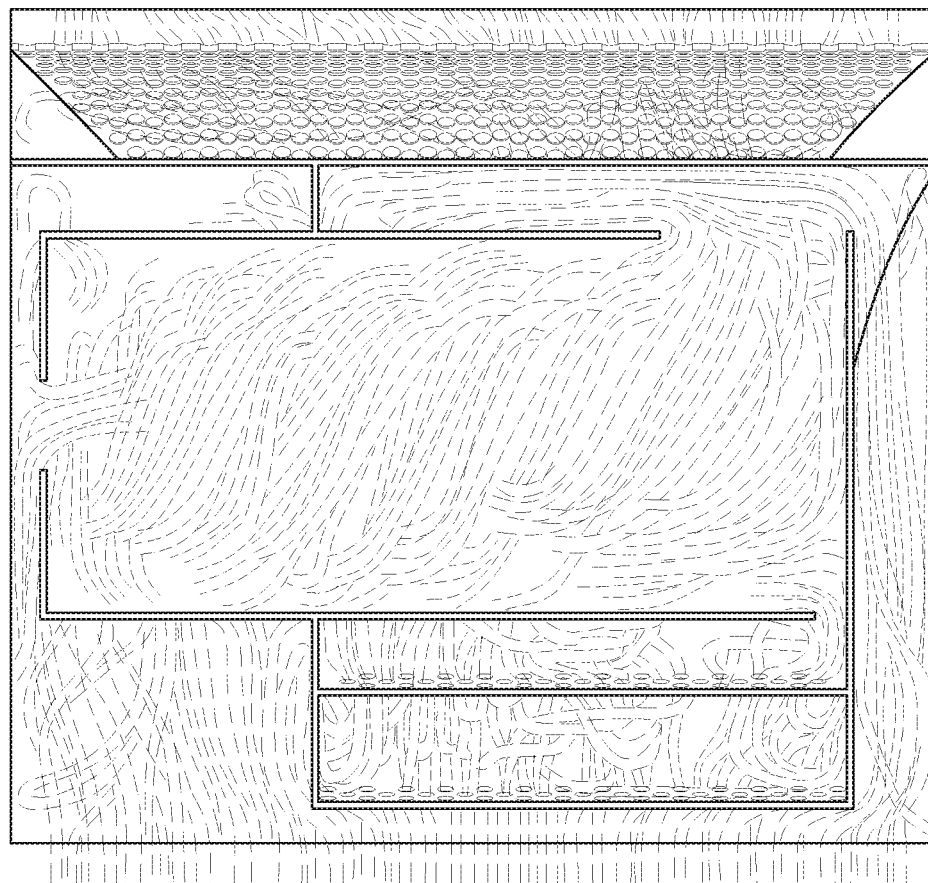
FIG. 48
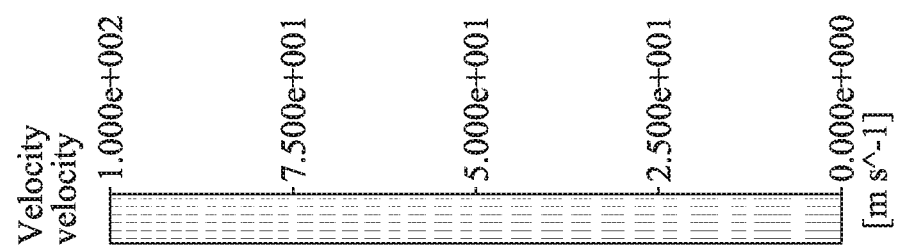

BODY MIXING DECOMPOSITION REACTOR

CROSS-REFERENCE TO RELATED APPLICATIONS

The present application is a National Phase Application of PCT/US2018/040737, filed Jul. 3, 2018, the contents of which are hereby incorporated by reference in their entirety.

TECHNICAL FIELD

The present application relates generally to the field of aftertreatment systems for internal combustion engines.

BACKGROUND

For internal combustion engines, such as diesel engines, nitrogen oxide ($NO_x$) compounds may be emitted in the exhaust. To reduce $NO_x$ emissions, an SCR process may be implemented to convert the $NO_x$ compounds into more neutral compounds, such as diatomic nitrogen, water, or carbon dioxide, with the aid of a catalyst and a reductant. The catalyst may be included in a catalyst chamber of an exhaust system, such as that of a vehicle or power generation unit. A reductant, such as anhydrous ammonia, aqueous ammonia, or urea is typically introduced into the exhaust gas flow prior to the catalyst chamber. To introduce the reductant into the exhaust gas flow for the SCR process, an SCR system may dose or otherwise introduce the reductant through a dosing module that vaporizes or sprays the reductant into an exhaust pipe of the exhaust system up-stream of the catalyst chamber. The SCR system may include one or more sensors to monitor conditions within the exhaust system.

SUMMARY

Implementations described herein relate to mixing assemblies. One implementation relates to a mixing assembly that includes: an outer body defining an interior volume and having a center axis; a front plate defining an upstream portion of the interior volume; a back plate defining a downstream portion of the interior volume; a middle member positioned transverse to the center axis of the outer body and defining a volume; and an inner member positioned coaxially with the middle member inside the volume defined by the middle member; wherein the front plate comprises inlets configured to direct exhaust to (i) a first flow path into an interior of the inner member, (ii) a second flow path into the volume of the middle member between a sidewall of the middle member and a sidewall of the inner member, and (iii) a third flow path into the interior volume of the outer body.

Another implementation relates to an exhaust assembly that includes: a catalyst; and a mixing assembly positioned upstream of the catalyst, the mixing assembly comprising: an outer body defining an interior volume and having a center axis; a front perforation plate defining an upstream portion of the interior volume; a back perforation plate defining a downstream portion of the interior volume; a middle cylinder positioned transverse to the center axis of the outer body and defining a volume; and an inner tube positioned coaxially with the middle cylinder inside the volume defined by the middle cylinder; wherein the front perforation plate comprises inlets configured to direct exhaust gas to (i) a first flow path into an interior of the inner tube, (ii) a second flow path into the volume of the middle cylinder between a sidewall of the middle cylinder and a sidewall of the inner tube, and (iii) a third flow path into the interior volume of the outer body.

Yet a further implementation relates to an exhaust aftertreatment assembly that includes: a doser and a top cone. The top cone includes a sidewall defining a conical shape, an upper opening at an upper end of the sidewall, and a bottom opening at a lower end of the sidewall. The sidewall includes a a plurality of inlets. The upper opening has a diameter based, at least in part, on a spray cone diameter for reductant spray from the doser at a spray break-up length for the doser. The conical shape defined by the sidewall forms an angle relative to a central axis, and the angle based, at least in part, on a spray angle for reductant spray from the doser.

BRIEF DESCRIPTION

The details of one or more implementations are set forth in the accompanying drawings and the description below. Other features, aspects, and advantages of the disclosure will become apparent from the description, the drawings, and the claims, in which:

FIGS. 9A and 9B are fluid flow velocity diagrams showing fluid velocity profiles within the mixing assembly at different exhaust flow speeds;

FIGS. 10A and 10B are fluid flow velocity diagrams showing fluid velocity profiles within the mixing assembly at different exhaust flow speeds;

FIG. 23 is a side view of fluid flow velocity showing a fluid velocity profile within the mixing assembly having a modified radial louvered cone with a 25 degree louver opening;

FIG. 25 is a side view of fluid flow velocity showing a fluid velocity profile within the mixing assembly having a modified radial louvered cone with a 30 degree louver opening;

FIG. 28 is a side view of fluid flow velocity showing a fluid velocity profile within the mixing assembly having a modified radial louvered cone with a 35 degree louver opening;

FIG. 31 is a side view of fluid flow velocity showing a fluid velocity profile within the mixing assembly having the modified radial louvered cone of FIGS. 13-14 with 30 degree louver openings angled at 30 degrees;

FIG. 34 is a side view of fluid flow velocity showing a fluid velocity profile within the mixing assembly having the modified radial louvered cone of FIGS. 15-16 with 10 degree louver openings;

FIG. 48 is a fluid flow velocity path diagram showing fluid velocity paths within the mixing assembly having the louvered cylinder of FIGS. 17-18.

It will be recognized that some or all of the figures are schematic representations for purposes of illustration. The figures are provided for the purpose of illustrating one or more implementations with the explicit understanding that they will not be used to limit the scope or the meaning of the claims.

DETAILED DESCRIPTION

Following below are more detailed descriptions of various concepts related to, and implementations of, methods, apparatuses, and systems for compact mixers for an aftertreatment system. The various concepts introduced above and discussed in greater detail below may be implemented in any of numerous ways, as the described concepts are not limited to any particular manner of implementation. Examples of specific implementations and applications are provided primarily for illustrative purposes.

I. Overview

In some vehicles, generators, or other applications for exhaust systems, the area or space may be limited or a reduction in the space claim of the exhaust system may permit other advantages, such as a larger engine, a larger passenger cabin, smaller generator size, etc. One particular portion of an exhaust system that presents difficulties for reduction of the space claim is the aftertreatment system and, particularly, the decomposition chamber or reactor pipe. The decomposition chamber must both adequately mix dosed reductant with flowing exhaust gas while also distributing the reductant and exhaust gas mixture across the cross-sectional area of the downstream catalyst. Where there is no limitation to the space claim sizing of the aftertreatment system, a relatively long tube structure is implemented where the exhaust gas and dosed reductant can mix while flowing along the length. However, reduction of a length or size of the decomposition chamber can result in reduced mixing and/or reduced distribution of the reductant and exhaust gas mixture.

Presented herein are implementations of mixing assemblies for decomposition chambers that are provided having a compact length, but also result in adequate mixing and distribution of the reductant and exhaust gas mixture.

II. Overview of Aftertreatment System

Figure 1:
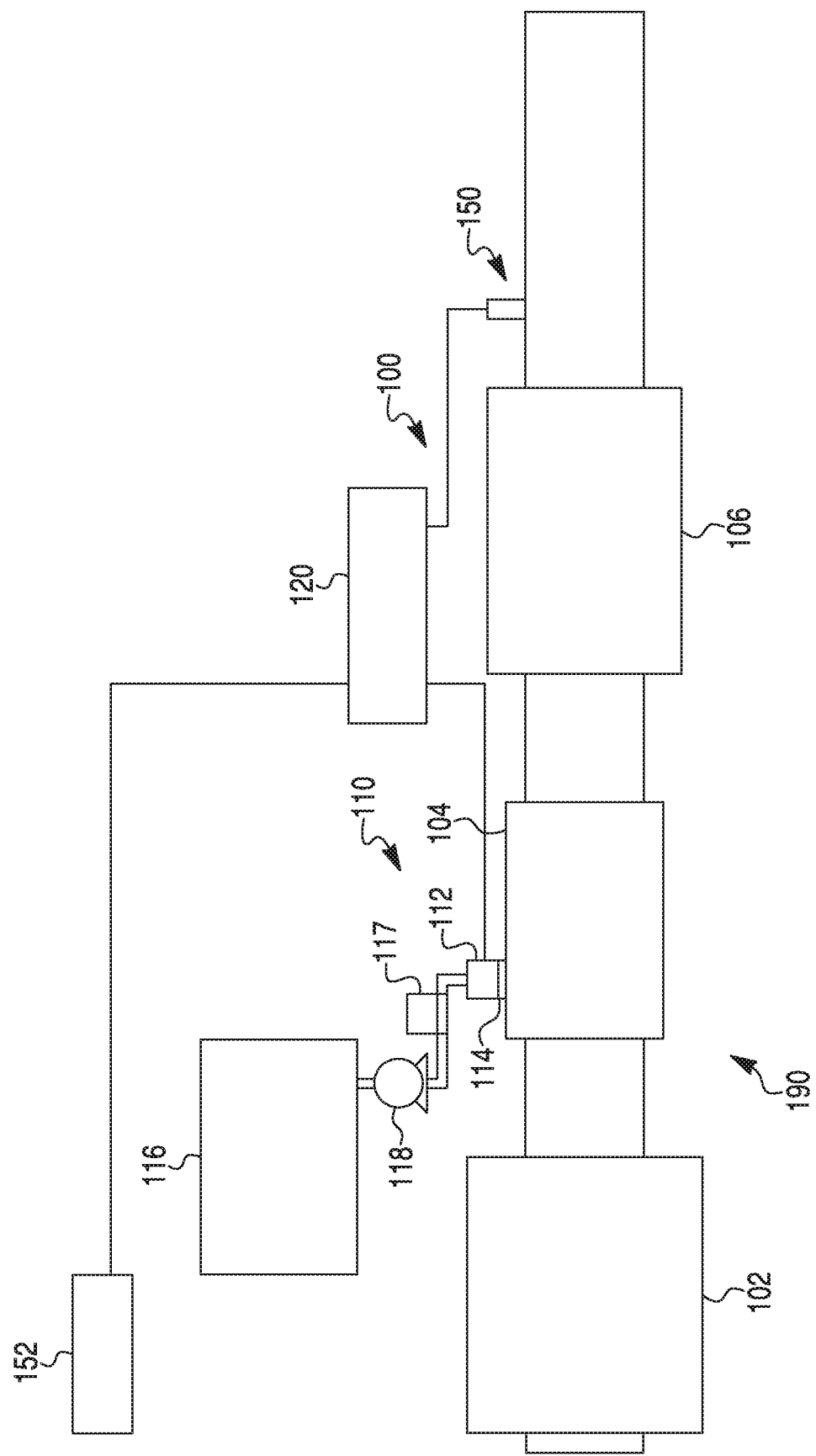
FIG. 1 is a block schematic diagram of an example selective catalytic reduction system having an example reductant delivery system for an exhaust system.
Figure 2:
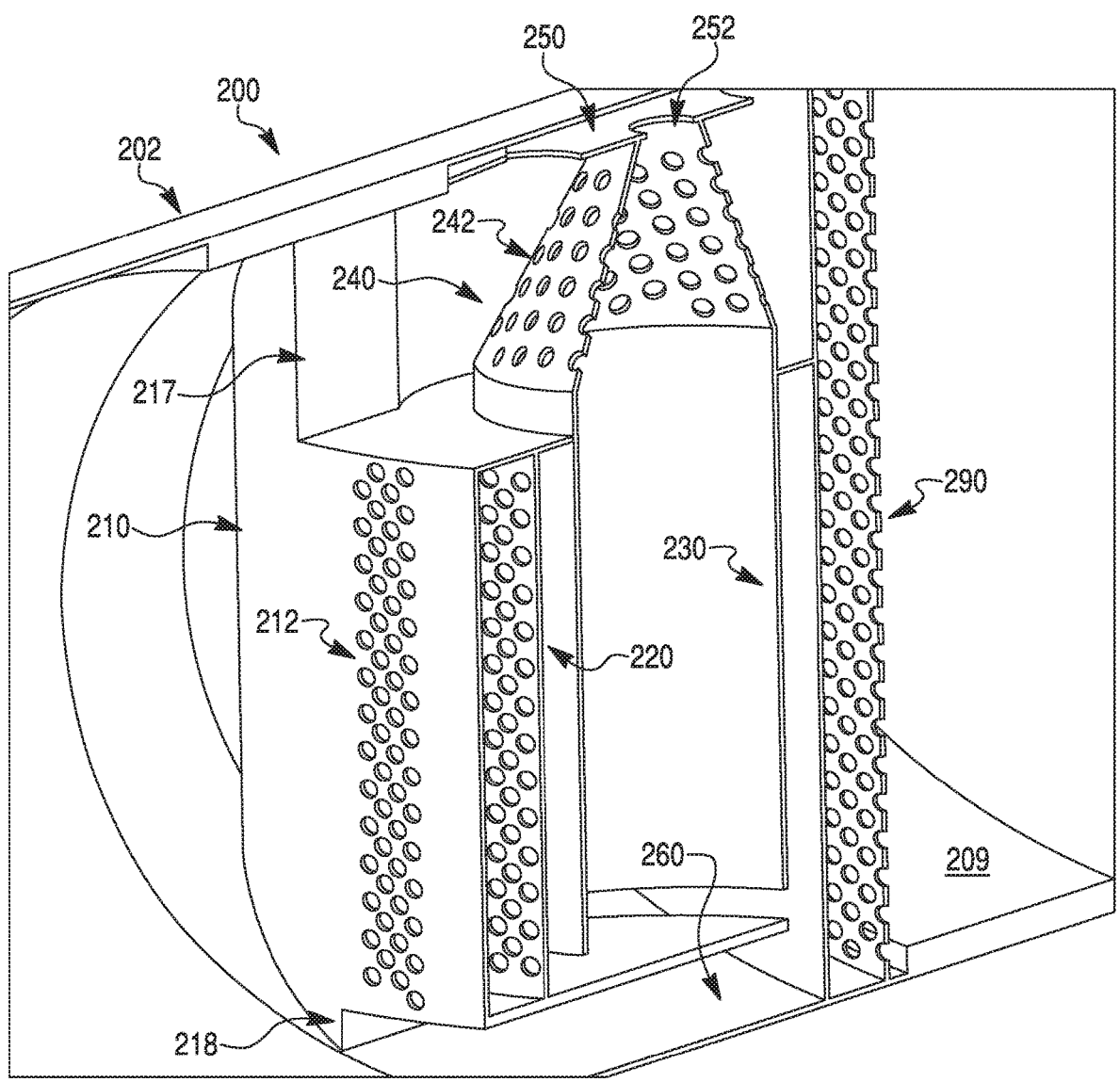
FIG. 2 is perspective cross-sectional view of a mixing assembly.
Figure 3:
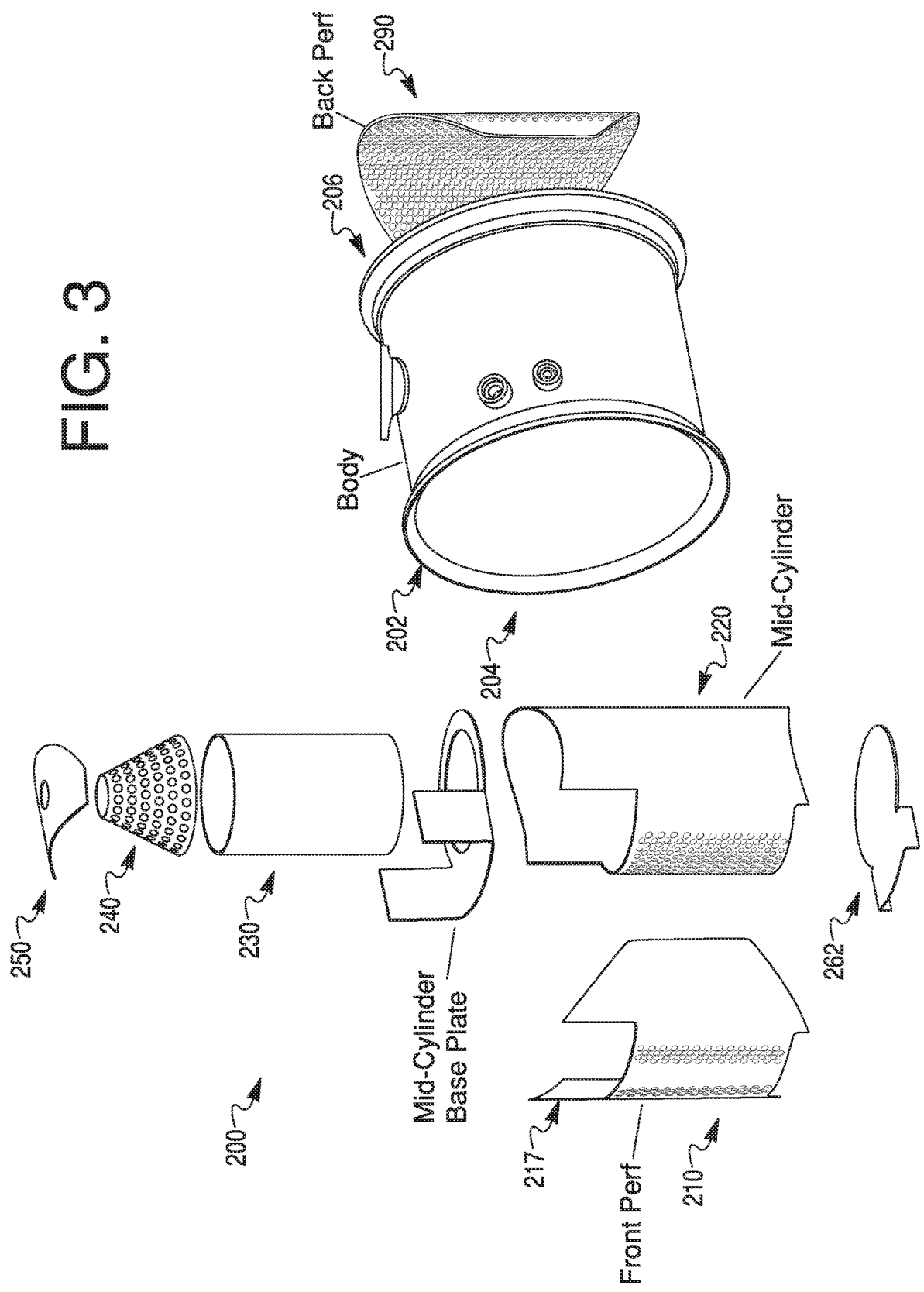
FIG. 3 is an exploded perspective view of the mixing assembly.
Figure 4:
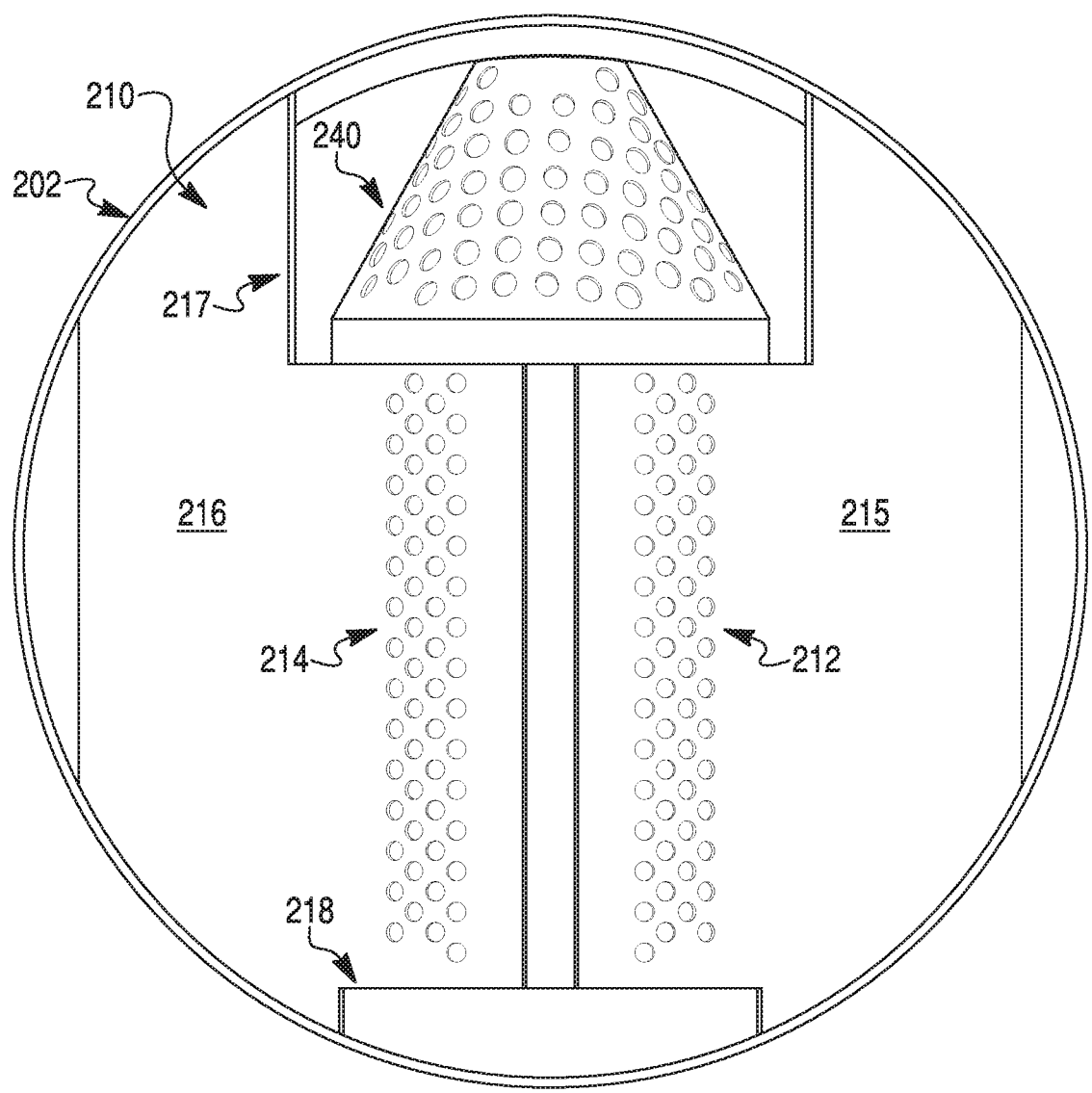
FIG. 4 is front elevation view of the mixing assembly.

FIG. 1 depicts an aftertreatment system 100 having an example reductant delivery system 110 for an exhaust system 190. The aftertreatment system 100 includes a particulate filter, for example a diesel particulate filter (DPF) 102, the reductant delivery system 110, a decomposition chamber or reactor pipe 104, an SCR catalyst 106, and a sensor 150.

The DPF 102 is configured to remove particulate matter, such as soot, from exhaust gas flowing in the exhaust system 190. The DPF 102 includes an inlet, where the exhaust gas is received, and an outlet, where the exhaust gas exits after having particulate matter substantially filtered from the exhaust gas and/or converting the particulate matter into carbon dioxide.

The decomposition chamber 104 is configured to convert a reductant, such as urea or diesel exhaust fluid (DEF), into ammonia. The decomposition chamber 104 includes a reductant delivery system 110 having a doser 112 configured to dose the reductant into the decomposition chamber 104. In some implementations, the reductant is injected upstream of the SCR catalyst 106. The reductant droplets then undergo the processes of evaporation, thermolysis, and hydrolysis to form gaseous ammonia within the exhaust system 190. The decomposition chamber 104 includes an inlet in fluid communication with the DPF 102 to receive the exhaust gas containing NOx emissions and an outlet for the exhaust gas, NOx emissions, ammonia, and/or remaining reductant to flow to the SCR catalyst 106.

The decomposition chamber 104 includes the doser 112 mounted to the decomposition chamber 104 such that the doser 112 may dose the reductant into the exhaust gases flowing in the exhaust system 190. The doser 112 may include an insulator 114 interposed between a portion of the doser 112 and the portion of the decomposition chamber 104 to which the doser 112 is mounted. The doser 112 is fluidly coupled to one or more reductant sources 116. In some implementations, a pump 118 may be used to pressurize the reductant from the reductant source 116 for delivery to the doser 112. In some implementations, a filter assembly 117 can be positioned between the reductant source 116 and the doser 112. The filter assembly 117 can be upstream or downstream of the pump 118. In other implementations, the filter assembly 117 can be integrated into the pump 118. In still other implementations, the filter assembly 117 can be integrated into the doser 112 and/or reductant source 118. The filter assembly 117 can include a filter housing, a filter media, and one or more valves, as described in greater detail below.

The doser 112 and pump 118 are also electrically or communicatively coupled to a controller 120. In some implementations, the one or more valves can be electrically or communicatively coupled to the controller 120. The controller 120 is configured to control the doser 112 to dose reductant into the decomposition chamber 104. The controller 120 may also be configured to control the pump 118 and/or the filter assembly 117. The controller 120 may include a microprocessor, an application-specific integrated circuit (ASIC), a field-programmable gate array (FPGA), etc., or combinations thereof. The controller 120 may include memory which may include, but is not limited to, electronic, optical, magnetic, or any other storage or transmission device capable of providing a processor, ASIC, FPGA, etc. with program instructions. The memory may include a memory chip, Electrically Erasable Programmable Read-Only Memory (EEPROM), erasable programmable read only memory (EPROM), flash memory, or any other suitable memory from which the controller 120 can read instructions. The instructions may include code from any suitable programming language.

The SCR catalyst 106 is configured to assist in the reduction of NOx emissions by accelerating a NOx reduction process between the ammonia and the NOx of the exhaust gas into diatomic nitrogen, water, and/or carbon dioxide. The SCR catalyst 106 includes inlet in fluid communication with the decomposition chamber 104 from which exhaust gas and reductant is received and an outlet in fluid communication with an end of the exhaust system 190.

The exhaust system 190 may further include an oxidation catalyst, for example a diesel oxidation catalyst (DOC), in fluid communication with the exhaust system 190 (e.g., downstream of the SCR catalyst 106 or upstream of the DPF 102) to oxidize hydrocarbons and carbon monoxide in the exhaust gas.

In some implementations, the DPF 102 may be positioned downstream of the decomposition chamber or reactor pipe 104. For instance, the DPF 102 and the SCR catalyst 106 may be combined into a single unit, such as a DPF with SCR-coating (SDPF). In some implementations, the doser 112 may instead be positioned downstream of a turbocharger or upstream of a turbocharger.

The sensor 150 may be coupled to the exhaust system 190 to detect a condition of the exhaust gas flowing through the exhaust system 190. In some implementations, the sensor 150 may have a portion disposed within the exhaust system 190, such as a tip of the sensor 150 may extend into a portion of the exhaust system 190. In other implementations, the sensor 150 may receive exhaust gas through another conduit, such as a sample pipe extending from the exhaust system 190. While the sensor 150 is depicted as positioned downstream of the SCR catalyst 106, it should be understood that the sensor 150 may be positioned at any other position of the exhaust system 190, including upstream of the DPF 102, within the DPF 102, between the DPF 102 and the decomposition chamber 104, within the decomposition chamber 104, between the decomposition chamber 104 and the SCR catalyst 106, within the SCR catalyst 106, or downstream of the SCR catalyst 106. In addition, two or more sensors 150 may be utilized for detecting a condition of the exhaust gas, such as two, three, four, five, or six sensors 150 with each sensor 150 located at one of the foregoing positions of the exhaust system 190. In some implementations, one or more actuators 152, such as actuators to move a valve (e.g., an EGR valve) or to control operation of other devices, may be included for the exhaust system 190 in addition to the one or more sensors 150.

III. Implementation of Mixing Assemblies for Aftertreatment Systems

FIGS. 2-6 depict an implementation of a mixing assembly 200 that can be implemented as the decomposition chamber 104 of FIG. 1. The mixing assembly 200 includes an outer body 202, a front plate 210, a middle member 220, an inner member 230, a top cone 240, an exhaust assist port 250, a bleed port 260, and a back plate 290. In some implementations, a middle cylinder base plate 270 can be included as a separate component or can be integrated into one of the front plate 210 or middle member 220.

The outer body 202 includes an inlet 204 and an outlet 206 with a sidewall 208 extending therebetween and defining a decomposition chamber interior volume 209. The outer body 202 is defined by a center longitudinal axis. The front plate 210 defines an upstream portion of the interior volume 209 and the back plate 290 defines a downstream portion of the interior volume 209.

The front plate 210 includes one or more openings 212 formed in at least a part of the front plate 210. The one or more openings 212 can be circular, triangular, square, etc. In some implementations, the one or more openings 212 can form a mesh. The front perforation plate 210 shown in FIGS. 2-6 is a curved member having the one or more openings 212 positioned in a middle region 214 with solid portions 215, 216 on either side. The front perforation plate 210 includes an inlet opening 217 and a bleed port opening 218.

The inlet opening 217 provides an open flow path for exhaust to enter the middle member or cylinder 220, exhaust assist port 250, and the top cone 240. The one or more openings 212 formed in the front plate 210 provide a flow path for exhaust to enter into the middle cylinder 220 and in a space formed between the front plate 210 and the middle cylinder 220. The bleed port opening 218 provides an open flow path for exhaust to enter through into a bleed port 260 defined by a bleed port plate 262 and the outer body 202.

The size of the inlet opening 217, size of the bleed port opening 218, and the number and size of the one or more openings 212 in the front perforation plate 210 can be varied to modify an amount of exhaust flow through each. In some implementations, the size of the inlet opening 217, size of the bleed port opening 218, and the number and size of the one or more openings 212 in the front perforation plate 210 can be based on a percentage of a cross-sectional area of an inlet 204 of the outer body 202. For instance, the inlet opening 217 can be between 10% and 30%, such as 20%, of the size of the cross-sectional area of the inlet of the outer body 202.

The cross-sectional area of the bleed port opening 218 can be between 0% and 15%, such as 4.2%, of the cross-sectional area of the inlet of the outer body 202. The cross-sectional area of the bleed port opening 218 can determine an amount of exhaust gas that is used for thermal heating of the bleed port plate 262. The thermal heating can reduce the impingement of dosed reductant from the interior of the inner member or tube 230 on the bleed port plate 262.

The aggregate cross-sectional area of the one or more openings 212 in the front perforation plate 210 can be between 0% and 15%, such as 5.7%, of the cross-sectional area of the inlet of the outer body 202. The aggregate cross-sectional area of the one or more openings 212 in the front perforation plate 210 can determine an amount of exhaust gas that bypasses the inlet opening 217 and/or is used for backpressure reduction.

The middle member 220 can be a middle cylinder positioned transverse to the center longitudinal axis of the outer body 202, and defines an interior middle volume. The inner member 230 can be an inner tube that is positioned coaxially with the middle member 220 inside the volume defined by the middle member 220. The inner member 230 can define an interior.

Figure 7:
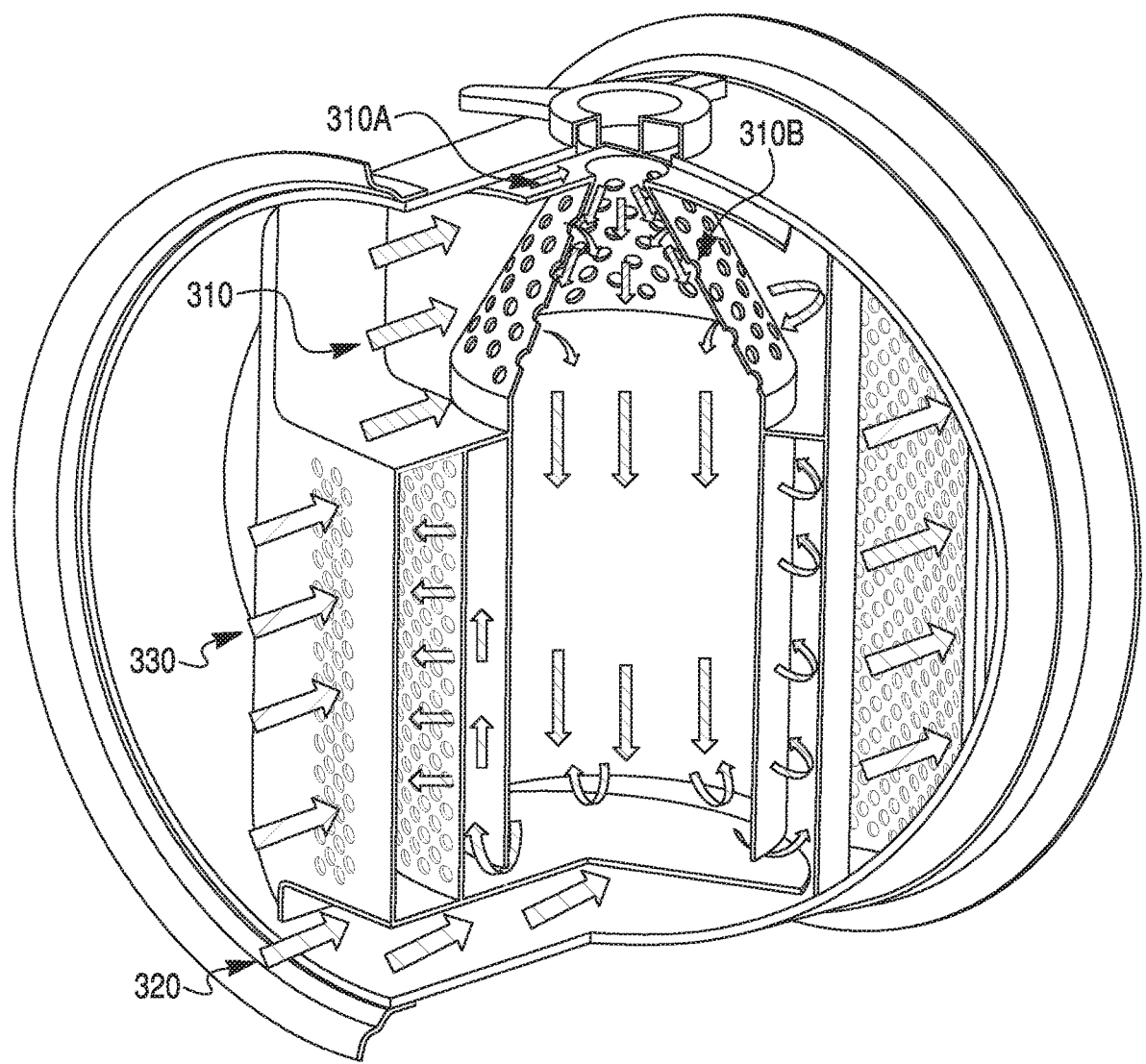
FIG. 7 is a partial cutaway perspective view of the mixing assembly showing fluid flow paths through the mixing assembly.
Figure 8:
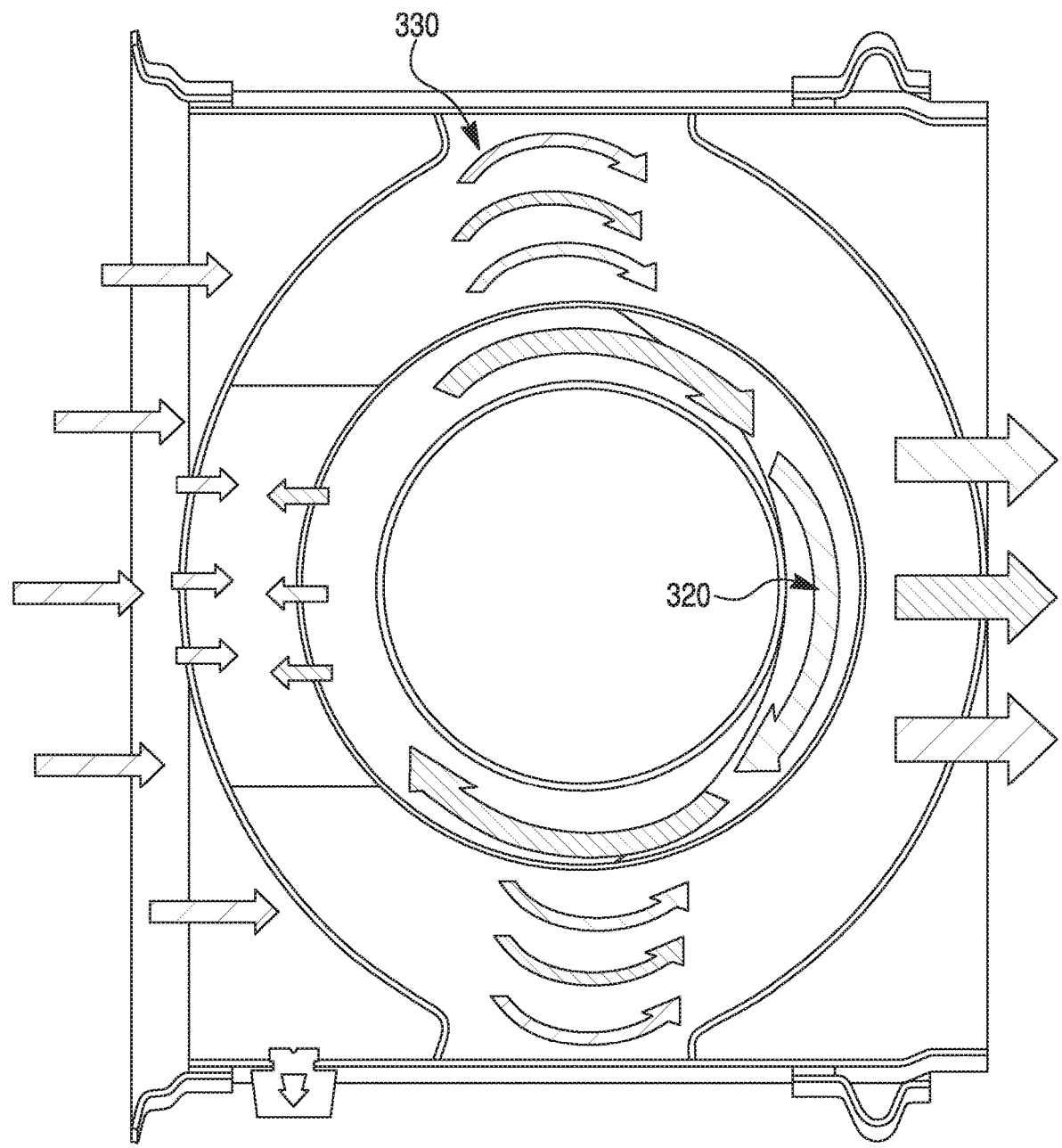
FIG. 8 is a top cross-sectional view of the mixing assembly showing the fluid flow paths of FIG. 7.

Exhaust that enters through the inlet opening 217 flows along a first flow path formed by two portions, collectively 310. A first portion 310A of the first flow path 310, shown in FIGS. 7-8, flows through an opening between the exhaust assist port 250 and the around the top cone 240 and the outer body 202. The exhaust combines with dosed reductant from a doser (not shown) that is sprayed through an opening 252. In some implementations, the exhaust assist port 250 abuts the top cone 240. In other implementations, the exhaust assist port 250 can be spaced apart from the top cone 240. The exhaust gas flowing along this first portion 310A of the first flow path 310 adds momentum to the dosed reductant to increase mixing and reduce deposit formation downstream.

A second portion 310B of the first flow path 310 for the exhaust entering through the inlet opening 217 flows around and into openings 242 in the top cone 240. In the implementation shown, the openings 242 include perforations. In other implementations, such as those shown in FIGS. 11 and 13-18, slots, slats, or other opening features may be implemented for openings 242. The exhaust flowing through the openings 242 mixes with the exhaust gas and dosed reductant from the first portion 310A of the first flow path 310 in an interior of the inner tube 230.

Figure 5:
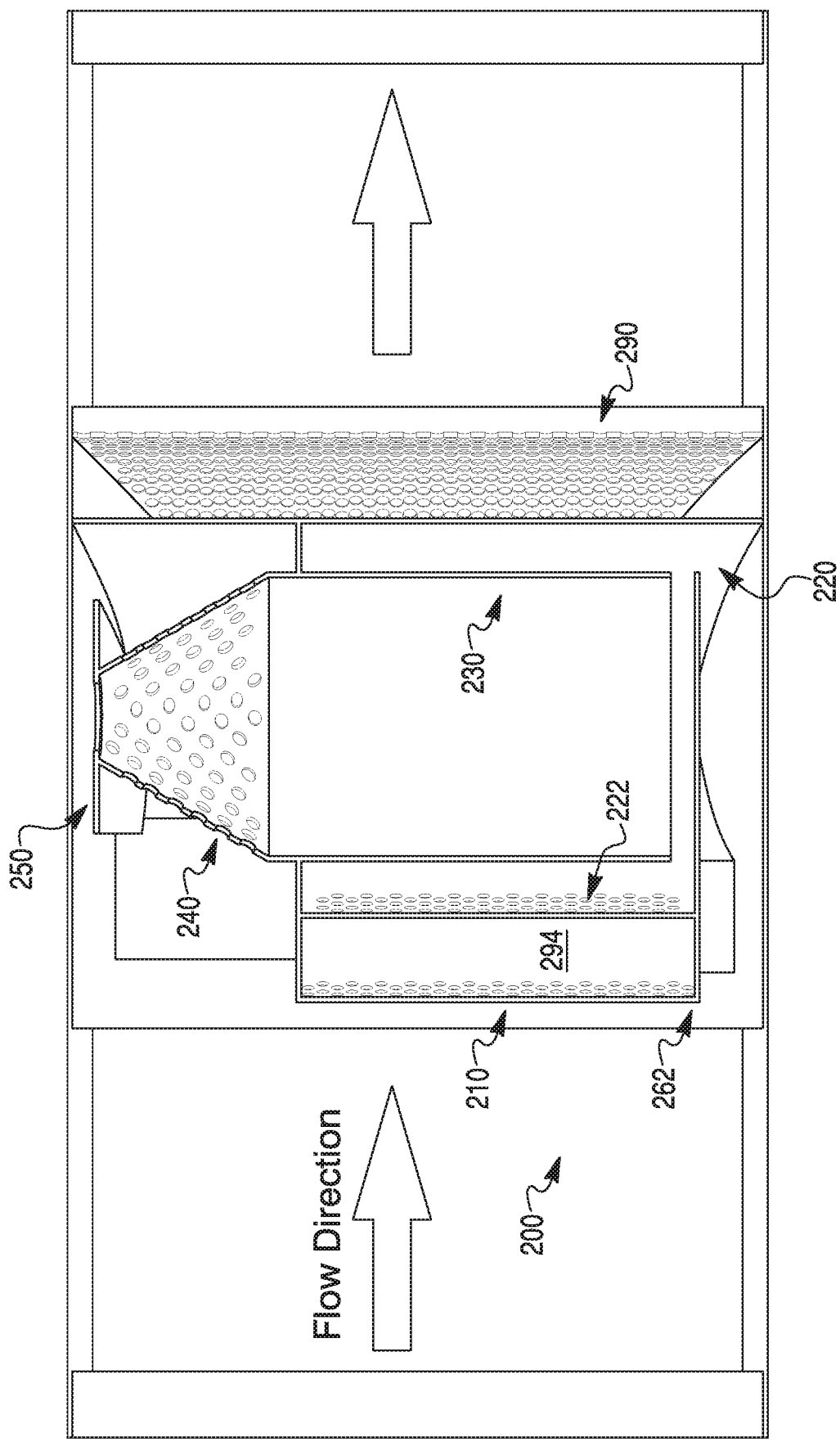
FIG. 5 is a side elevation cross-sectional view of the mixing assembly.
Figure 6:
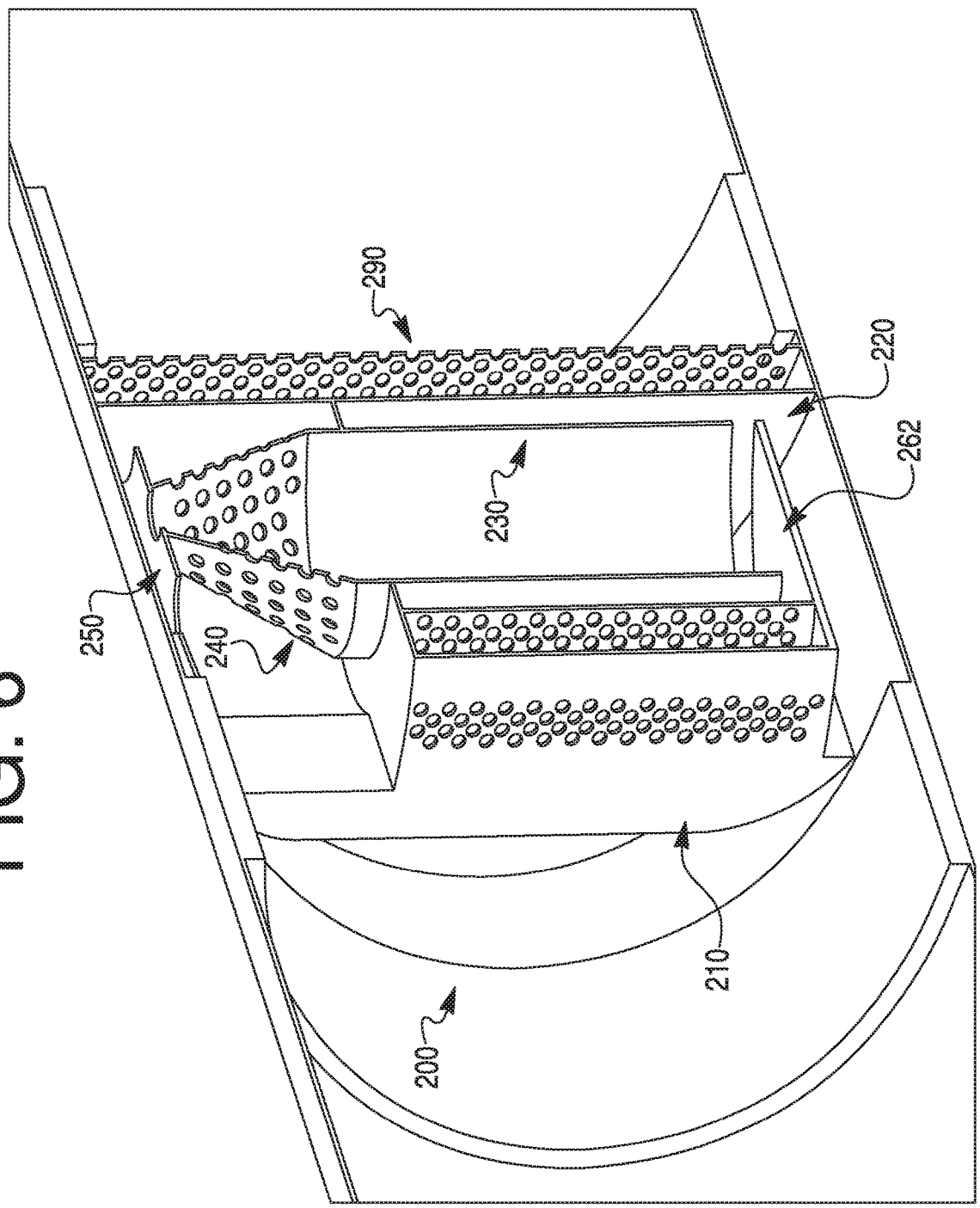
FIG. 6 is a perspective cross-sectional view of the mixing assembly.

The mixed exhaust gas and dosed reductant flows from a first end of the inner tube 230 from the top cone 240 to a second end at a bottom of the inner tube 230. The second end is open to an interior of the middle cylinder 220. A second flow path flows 320 into the middle cylinder 220 from the bleed port opening 218. Exhaust from the inlet 204 of the outer body 202 enters through the bleed port opening 218 and flows between the outer body 202 and the bleed port plate 262. A space between the bleed port plate 262 and the middle cylinder 220 permits the exhaust gas to flow into an interior of the middle cylinder 220. The exhaust gas can flow around the inner tube 230 and/or to mix with exhaust gas and reductant exiting from the second end of the inner tube 230. The resulting further mixed exhaust gas and reductant flows out through openings 222 formed in the middle cylinder 220. In some implementations, the openings 222 can be perforations, such as shown in FIG. 5, or can be other openings 222, such as slats, slots, mesh, etc. In the implementation shown, the openings 222 are on an upstream surface of the middle cylinder 220. In other implementations, the openings 222 can be on a side, downstream, or any other surface or combination of surfaces of the middle cylinder 220. When the exhaust and reductant mixture exits through the openings 222, the exhaust gas and reductant mixture enters into a volume 294 between the front perforation plate 210, the rear perforation plate 290, and the middle cylinder 220.

As described above, the front perforation plate 210 includes one or more openings 212 through which exhaust gas from the inlet 204 of the outer body 202 enters into the volume 294 to mix with the exhaust gas and reductant exiting from the openings 222 of the middle cylinder 220 as a third flow path 330. The exhaust gas and reductant mixture flows through the volume 294, around the middle cylinder 220, to the rear perforation plate 290. At the rear perforation plate 290, the exhaust gas and reductant mixture exits through openings 292 formed through the rear perforation plate 290 and exits through the outlet 206 toward a downstream component, such as a catalyst.

Figure 9A:
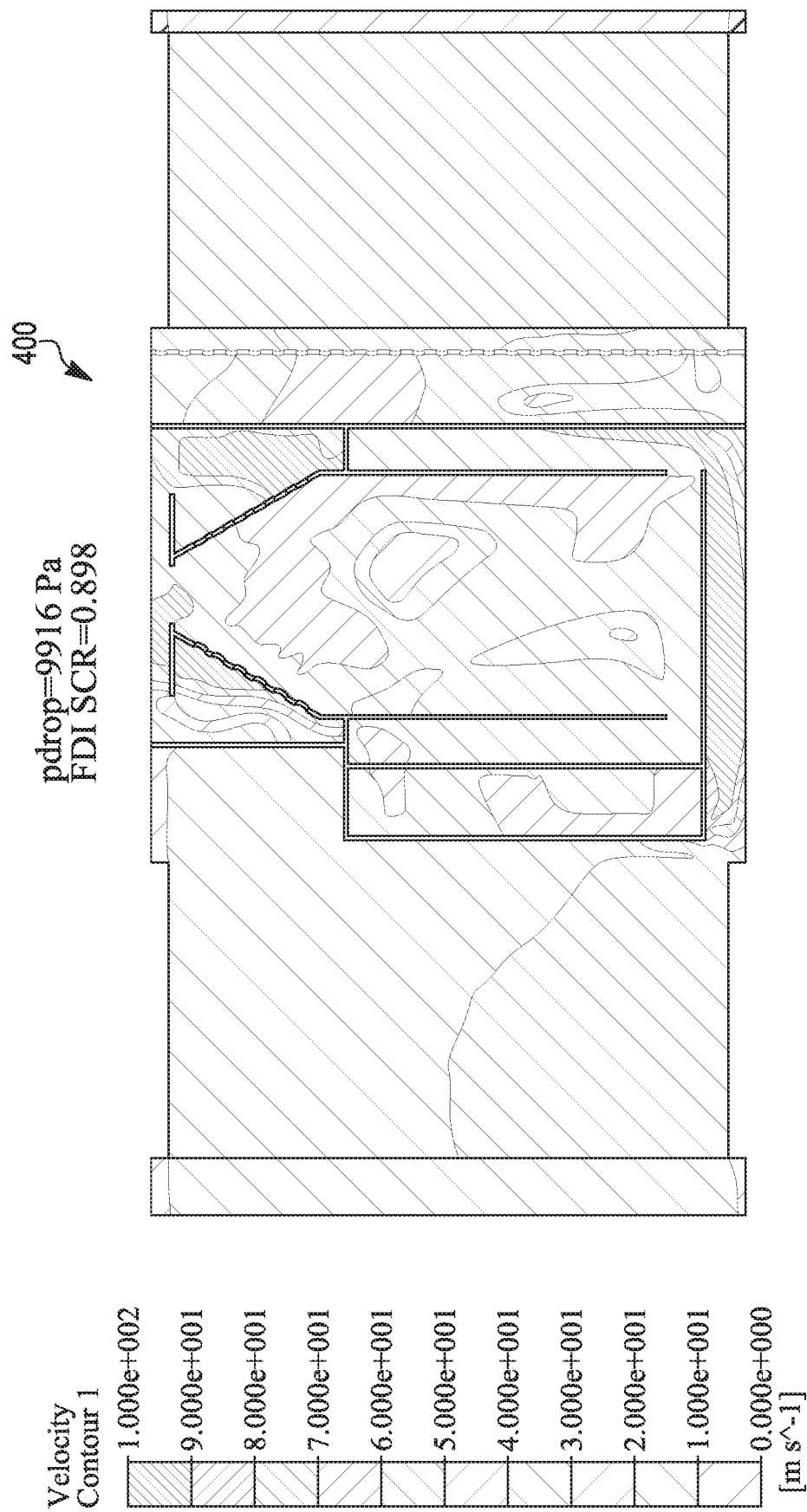

FIG. 9A depicts a flow velocity profile 400 showing fluid velocities of fluid flowing through the mixing assembly 200 at a first operating exhaust inlet flow speed. FIG. 9B depicts another flow velocity profile 500 showing fluid velocities of fluid flowing through the mixing assembly 200 at a second operating exhaust inlet flow speed. In both implementations, the front perforation plate 210 is positioned approximately 10 millimeters from the middle cylinder 220.

Figure 10A:
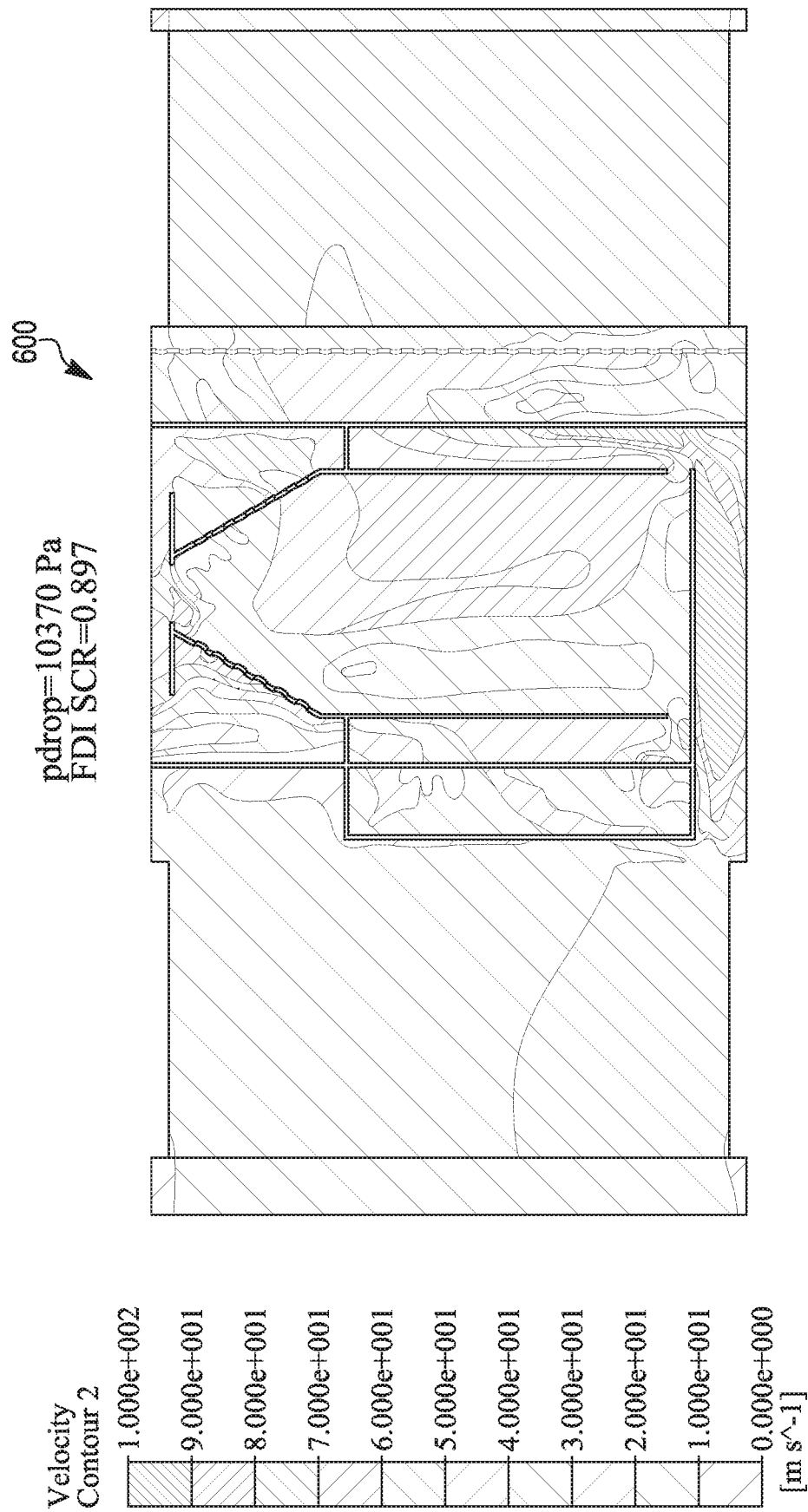

FIG. 10A depicts a flow velocity profile 600 showing fluid velocities of fluid flowing through the mixing assembly 200 at a first operating exhaust inlet flow speed. FIG. 10B depicts another flow velocity profile 700 showing fluid velocities of fluid flowing through the mixing assembly 200 at a second operating exhaust inlet flow speed. In both implementations, the front perforation plate 210 is positioned approximately 8 millimeters from the middle cylinder 220.

Figure 11:
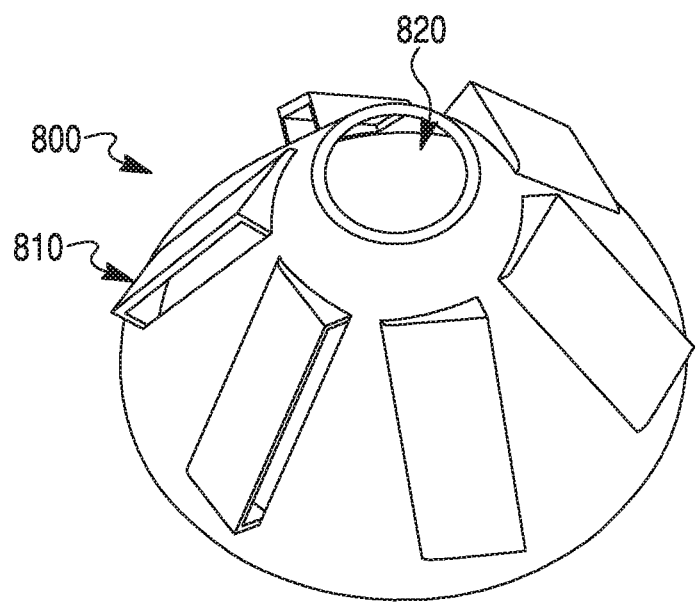
FIG. 11 is a perspective view of a radial louvered cone for the mixing assembly.
Figure 12:
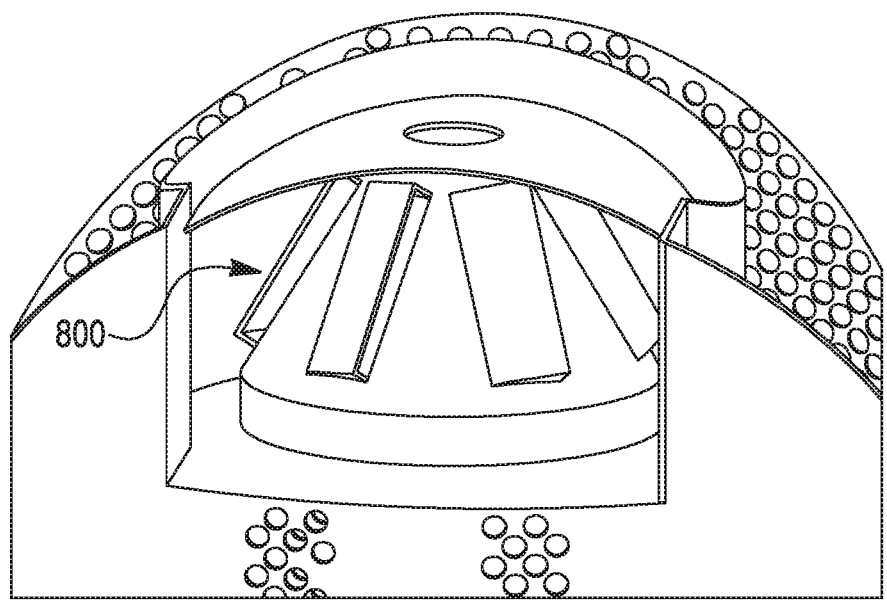
FIG. 12 is a partial perspective view of the radial louvered cone of FIG. 11 assembled with the mixing assembly.

As shown in FIGS. 11 and 13-18, the top cone 240 can have a variety of configurations. For example, as shown in FIGS. 11-12, a top cone 800 can include a plurality, such as six, scooped inlets 810 spaced about the exterior of the cone 800. As shown, the scooped inlets 810 are formed by a spaced apart flap with sidewalls to form a scoop type shape. Of course other inlets 810 can be used. The top cone 800 can be applied to various decomposition reactors with various reductant dosers. The top cone 800 defines an exhaust assist opening 820 that can be located at a distance from the doser to align with a breakup length of the reductant spray and having a diameter equal to a spray diameter at the spray breakup area. In some implementations, the diameter may include a factor of safety to avoid impingement. The top cone 800 has a side wall positioned at an angle similar to an angle of the dosed reductant spray cone. The side wall as shown includes scooped inlets 810. In some implementations, the side wall may include perforations or louvers to allow exhaust gas to pass into the top cone 800 interior. The exhaust assist opening 820 utilizes exhaust flow to protect the sprayed reductant and uses a small amount of exhaust velocity to merge the reductant spray with an exhaust cross flow. FIG. 12 depicts the top cone 800 incorporated into the mixing assembly 200 of FIGS. 2-6. As noted above, the top cone 240 can be dimensioned based on the spray pattern produced by a reductant doser. The top cone 240 can include a sidewall defining a conical shape and having a plurality of openings, an upper opening at an upper end of the sidewall, and a bottom opening at a lower end of the sidewall. The upper opening can have a diameter based, at least in part, on a spray cone diameter for reductant spray from a doser at a spray break-up length for the doser. In one embodiment, a top opening in the top cone 240 corresponding to the opening for the exhaust assist port 250 can be spaced approximately 15-25 millimeters from an end of an injector for the reductant doser. Such a spacing can correspond to the spray break-up length when reductant is dosed. The spray break-up length is a distance from an injector or doser of a reductant doser at which a continuous liquid jet from a nozzle exit of the reductant doser breaks into fragments. A diameter of the top opening of the top cone 240 and the corresponding opening of the exhaust assist port 250 can be between 20 and 40 millimeters, such as 29.3 millimeters. The diameter can correspond to a sum of a spray cone diameter and a factor of safety or buffer based on the spray cone diameter. The spray cone diameter is the diameter of the spray cone at the spray break-up length. The factor of safety or buffer can be between 5% and 50% of the spray cone diameter, such as 10%, 20%, 30%, 40% or 50%. The conical shape defined by the sidewall of the top cone 240 forms an angle relative to a central axis of the top cone 240.

The angle can be based on a spray angle of reductant dosed by the reductant doser and a factor of safety or buffer. The spray angle is the angle formed by the spray cone from the nozzle exit to the spray break-up length. The angle for the top cone 240 can be between 30 degrees and 80 degrees, such as 60 degrees. The factor of safety or buffer can be between 5% and 50% of the spray angle, such as 10%, 20%, 30%, 40% or 50%. A bottom diameter for a bottom opening of the top cone can be coupled to a downstream mixing component, such as the inner member 230, and can be sized based on a diameter of the inner member 230. In some implementations, the bottom diameter can be between 3 inches and 6 inches, such as 4.5 inches or 5 inches.

Figure 13:
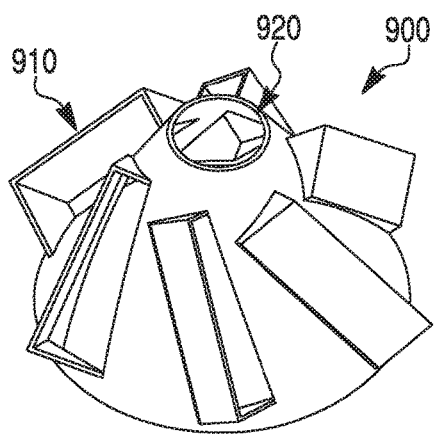
FIG. 13 is a perspective view of a modified radial louvered cone for the mixing assembly.
Figure 14:
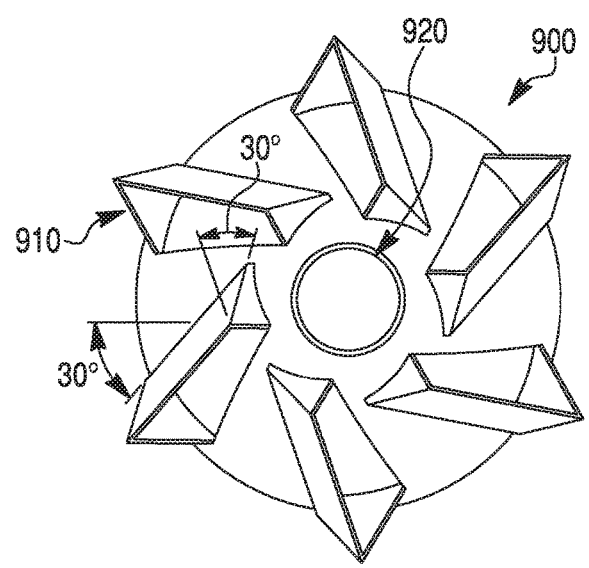
FIG. 14 is a top view of the modified radial louvered cone of FIG. 13.

FIGS. 13-14 depicts another top cone 900 that can include a plurality, such as six, scooped inlets 910 spaced about the exterior of the cone 900. In the implementation shown, the scooped inlets 910 are angled, such as between 10 degrees and 45 degrees, such as 30 degrees, relative to a vertical axis of the top cone 900. The top cone 900 can be applied to various decomposition reactors with various reductant dosers. The top cone 900 includes an exhaust assist opening 920 that can be located at a distance from the doser to align with a breakup length of the reductant spray and having a diameter equal to a spray diameter at the spray breakup area. In some implementations, the diameter may include a factor of safety to avoid impingement. The top cone 900 has a side wall positioned at an angle similar to an angle of the dosed reductant spray cone. The side wall as shown includes scooped inlets 910. In some implementations, the side wall may include perforations or louvers to allow exhaust gas to pass into the top cone 900 interior. The exhaust assist opening 920 utilizes exhaust flow to protect the sprayed reductant and uses a small amount of exhaust velocity to merge the reductant spray with an exhaust cross flow.

Figure 15:
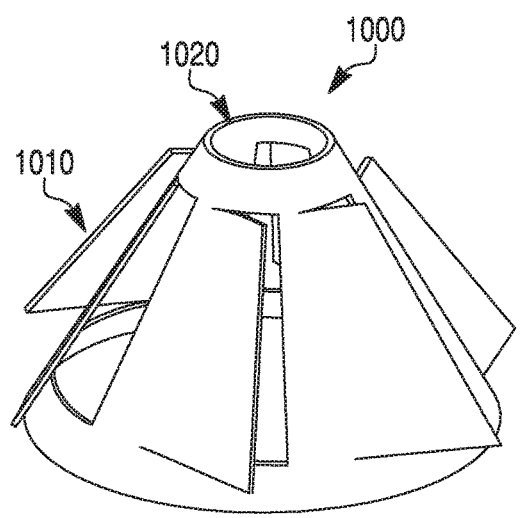
FIG. 15 is a perspective view of another modified radial louvered cone for the mixing assembly.
Figure 16:
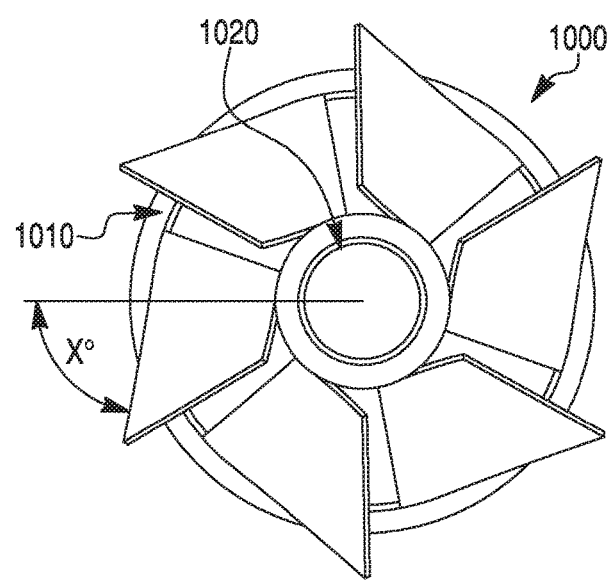
FIG. 16 is a top view of the modified radial louvered cone of FIG. 15.

FIGS. 15-16 depicts another top cone 1000 that can include a plurality, such as six, inlet flaps 1010 spaced about the exterior of the cone 1000. In the implementation shown, the inlet flaps 1010 are not angled, but in other implementations, the inlet flaps 1010 can be angled, such as between 10 degrees and 45 degrees, such as 30 degrees, relative to a vertical axis of the top cone 1000. The top cone 1000 can be applied to various decomposition reactors with various reductant dosers. The top cone 1000 includes an exhaust assist opening 1020 that can be located at a distance from the doser to align with a breakup length of the reductant spray and having a diameter equal to a spray diameter at the spray breakup area. In some implementations, the diameter may include a factor of safety to avoid impingement. The top cone 1000 has a side wall positioned at an angle similar to an angle of the dosed reductant spray cone. The side wall as shown includes inlet flaps 1010. In some implementations, the side wall may include perforations or louvers to allow exhaust gas to pass into the top cone 1000 interior. The exhaust assist opening 1020 utilizes exhaust flow to protect the sprayed reductant and uses a small amount of exhaust velocity to merge the reductant spray with an exhaust cross flow.

Figure 17:
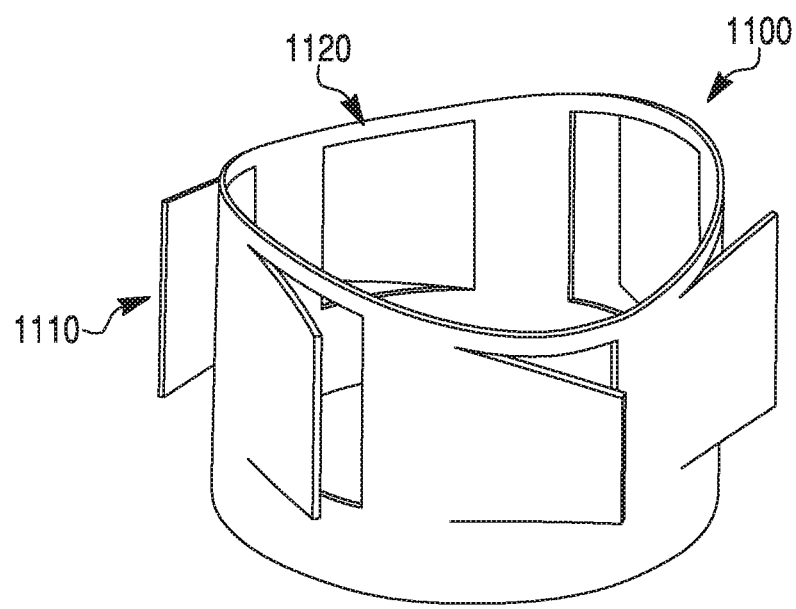
FIG. 17 is a perspective view of a louvered cylinder for the mixing assembly.
Figure 18:
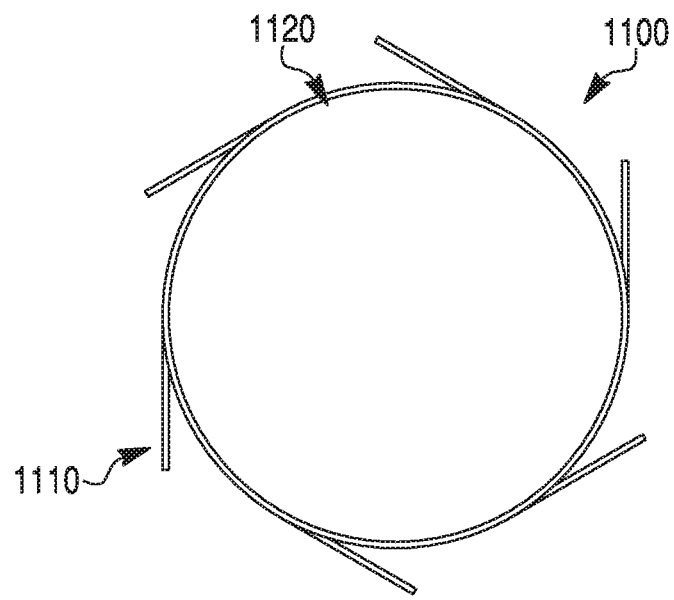
FIG. 18 is a top view of the louvered cylinder of FIG. 17.

FIGS. 17-18 depicts a top cylinder 1100 that can include a plurality, such as six, inlet flaps 1110 spaced about the exterior of the cylinder 1100. In the implementation shown, the inlet flaps 1110 are not angled, but in other implementations, the inlet flaps 1110 can be angled on a surface of the sidewall, such as between 10 degrees and 45 degrees, such as 30 degrees, relative to a vertical axis of the cylinder 1100. The cylinder 1100 can be applied to various decomposition reactors with various reductant dosers. The cylinder 1100 includes an exhaust assist opening 1120 that can be located at a distance from the doser to align with a breakup length of the reductant spray and having a diameter equal to a spray diameter at the spray breakup area. In some implementations, the diameter may include a factor of safety to avoid impingement. The cylinder 1100 has a side wall that includes the inlet flaps 1110. In some implementations, the side wall may include perforations or louvers to allow exhaust gas to pass into the cylinder 1100 interior. The exhaust assist opening 1120 utilizes exhaust flow to protect the sprayed reductant and uses a small amount of exhaust velocity to merge the reductant spray with an exhaust cross flow.

Figure 19:
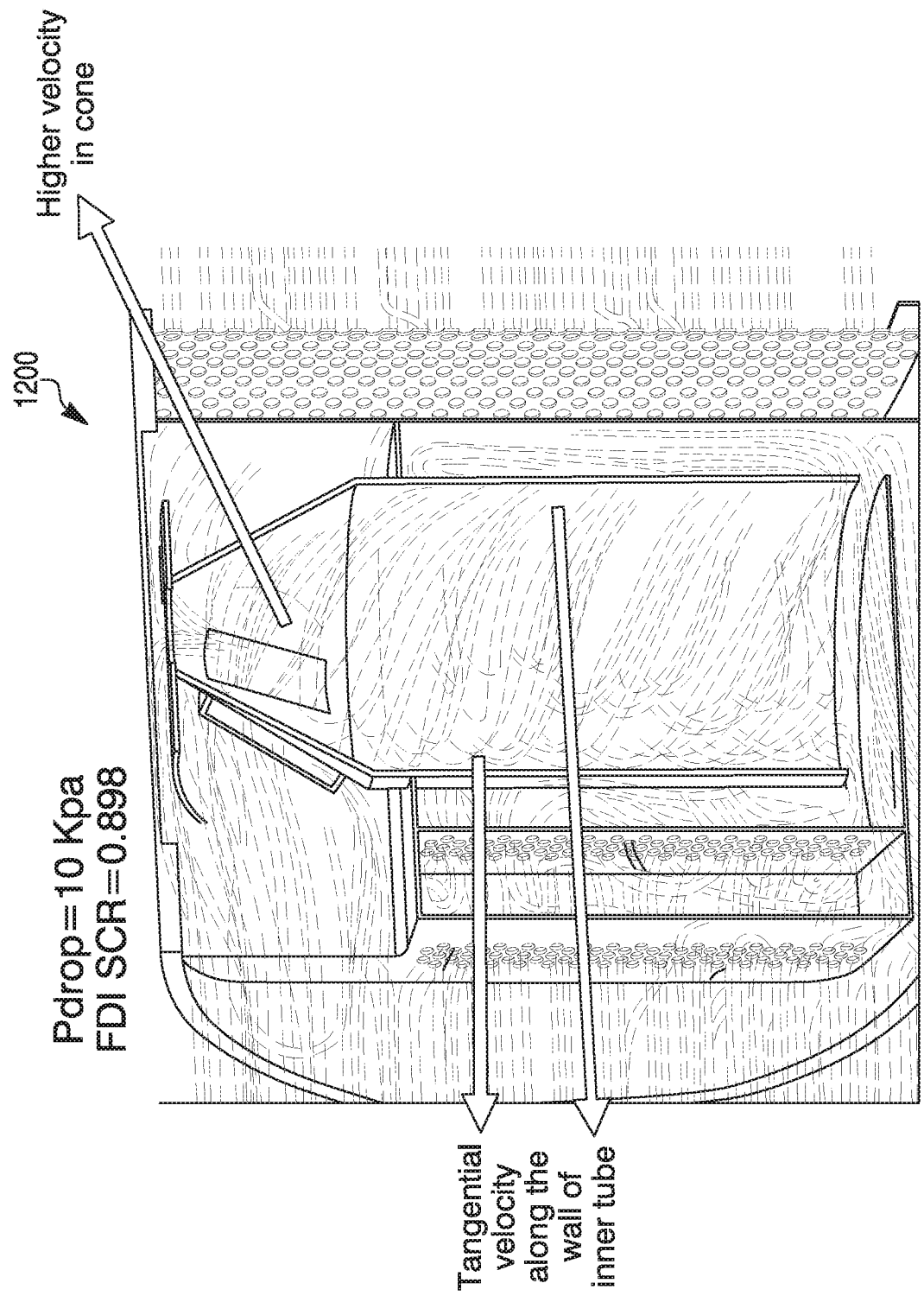
FIG. 19 is a fluid flow velocity path diagram showing fluid velocity paths within the mixing assembly having the radial louvered cone of FIGS. 11-12.
Figure 20:
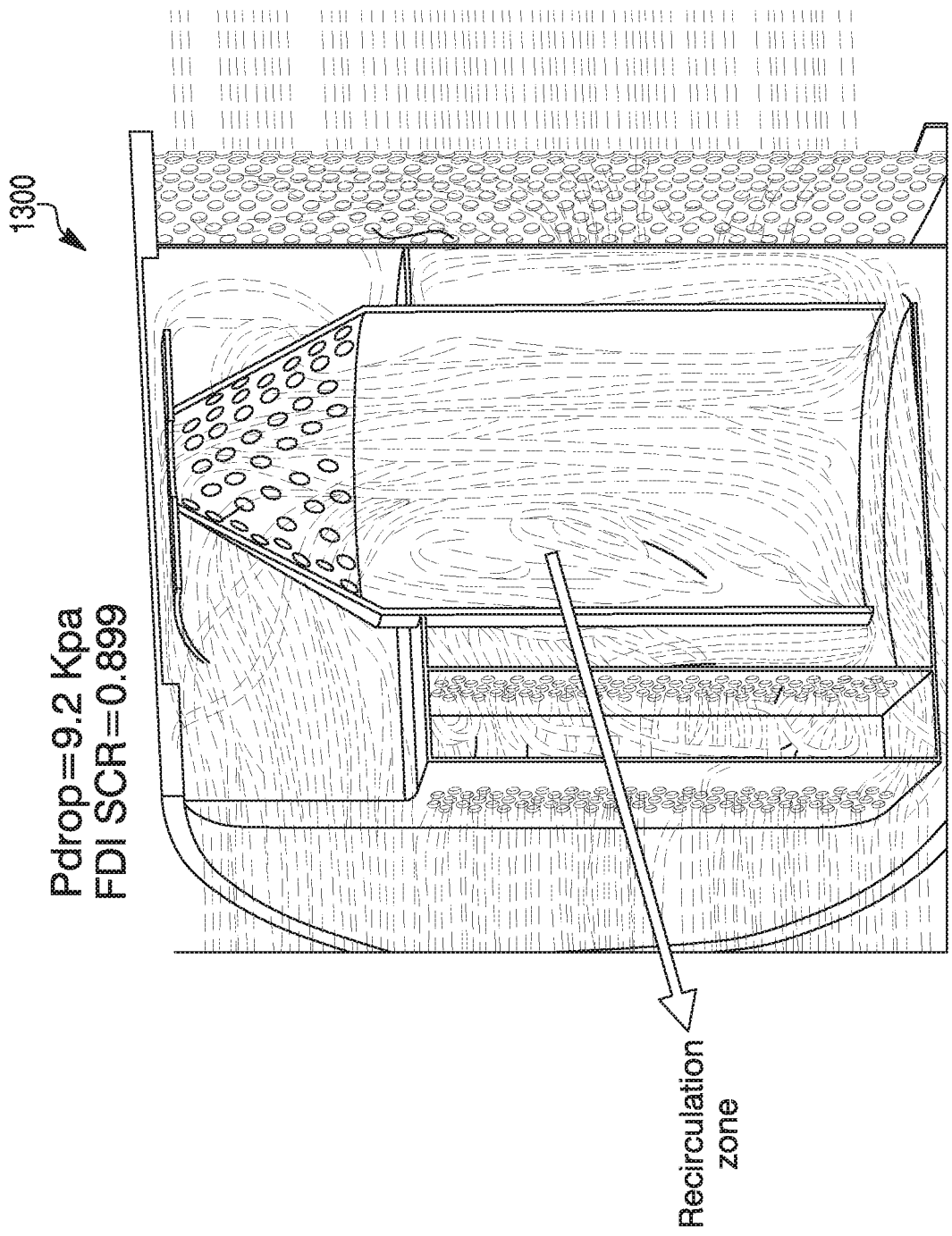
FIG. 20 is a fluid flow velocity path diagram showing fluid velocity paths within the mixing assembly having a perforated cone.
Figure 21:
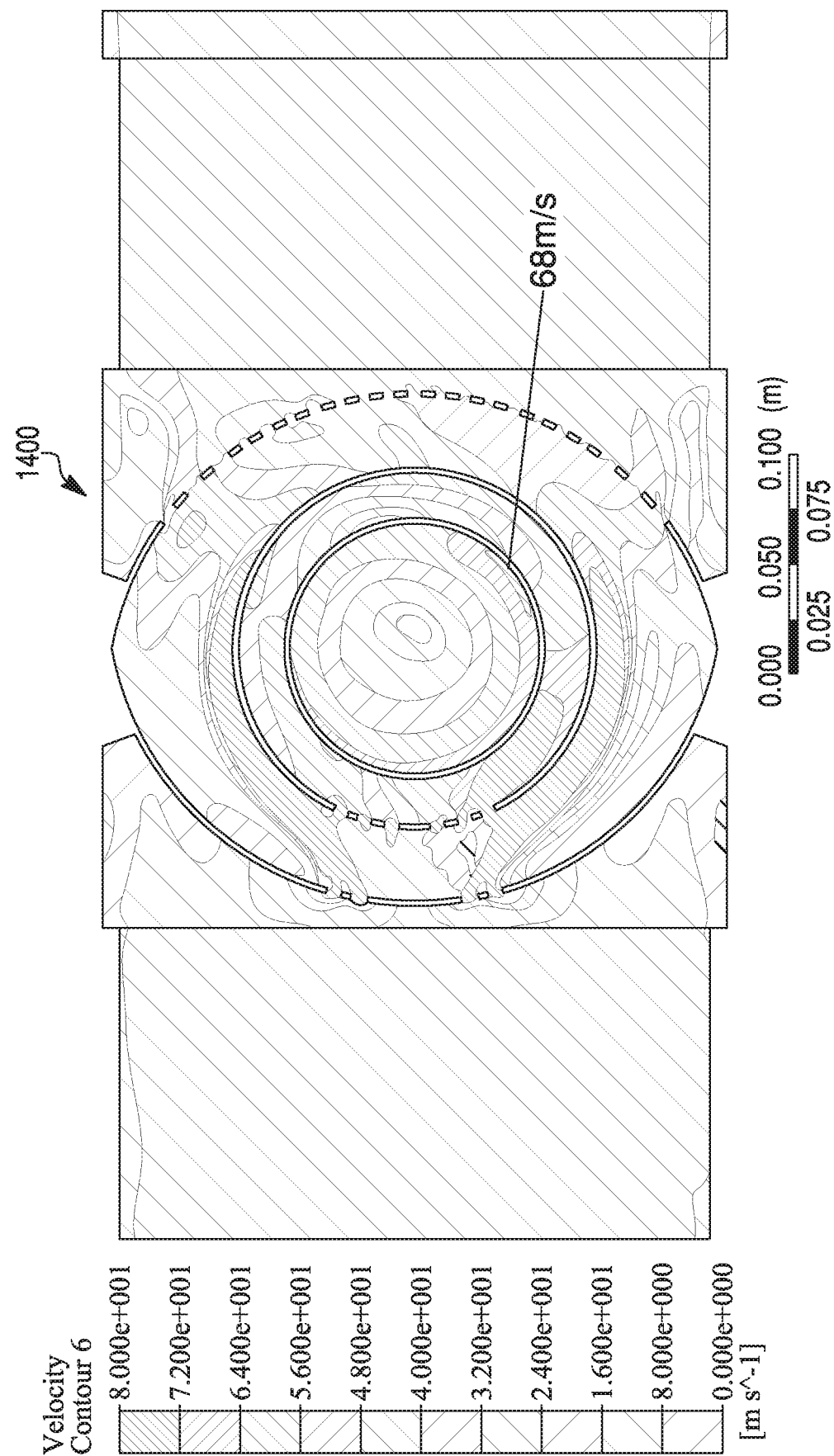
FIG. 21 is a top down view of fluid flow velocity showing a fluid velocity profile within the mixing assembly having the radial louvered cone of FIGS. 11-12.
Figure 22:
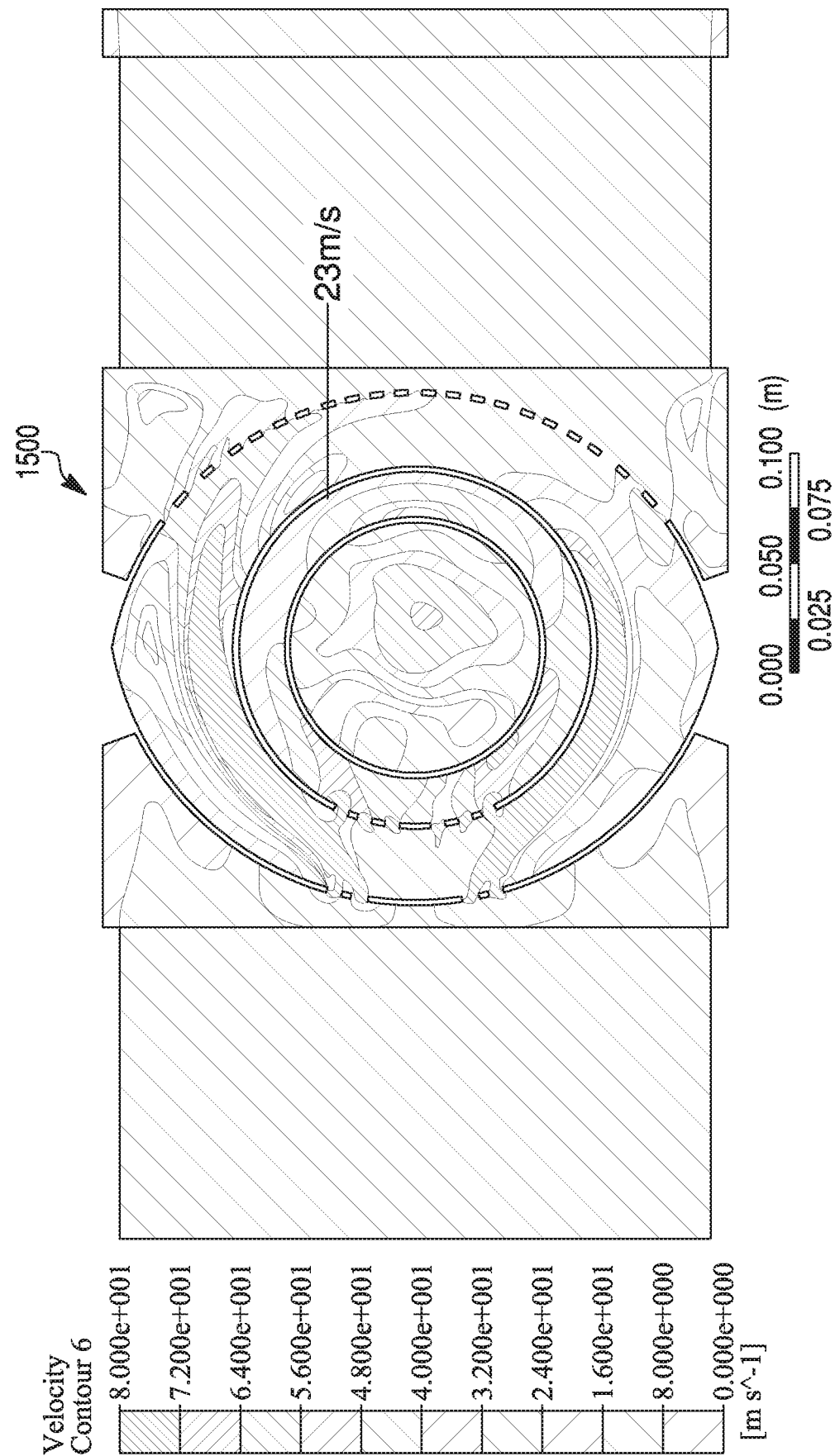
FIG. 22 is a top down view of fluid flow velocity showing a fluid velocity profile within the mixing assembly having a perforated cone.

FIG. 19 depicts a flow velocity profile 1200 showing fluid velocities of fluid flowing through the mixing assembly 200 having the top cone 800 of FIGS. 11-12 at a first operating exhaust inlet flow speed. In the implementation shown, the scooped inlets 810 have a 25 degree angled inlet opening relative to the sidewall of the top cone 800. FIG. 20 depicts a flow velocity profile 1300 showing fluid velocities of fluid flowing through the mixing assembly 200 with the top cone 240 with perforations at the first operating exhaust inlet flow speed. As shown, the scooped inlets 810 of the top cone 800 impart a vortical velocity to the exhaust gas. FIG. 21 depicts a top down flow velocity profile 1400 showing fluid velocities of fluid flowing through the mixing assembly 200 having the top cone 800 of FIGS. 11-12 at a first operating exhaust inlet flow speed. In the implementation shown, the scooped inlets 810 have a 25 degree angled inlet opening relative to the sidewall of the top cone 800. FIG. 22 depicts a top down flow velocity profile 1500 showing fluid velocities of fluid flowing through the mixing assembly 200 with the top cone 240 with perforations at the first operating exhaust inlet flow speed. As shown, the scooped inlets 810 of the top cone 800 impart a vortical velocity to the exhaust gas.

Figure 24:
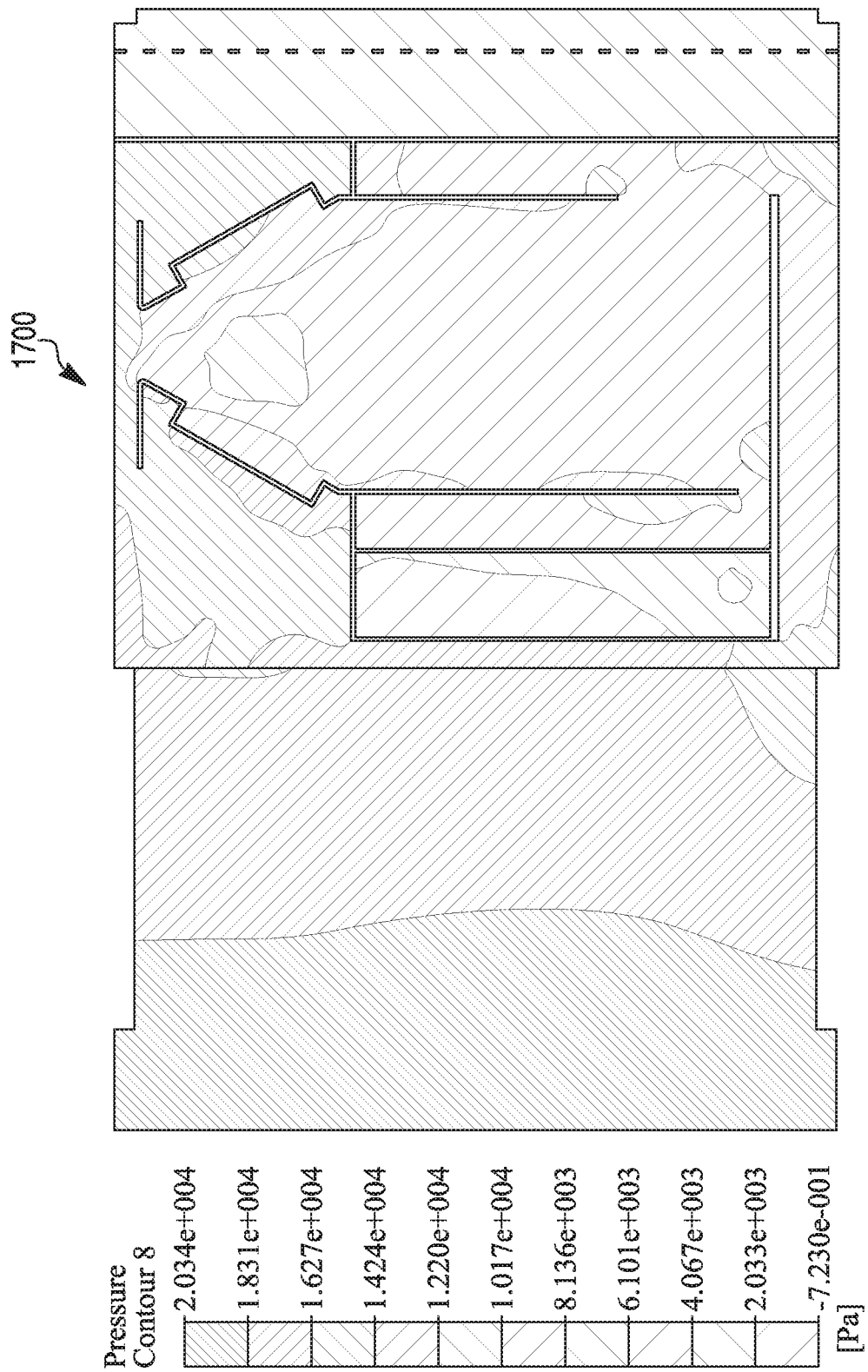
FIG. 24 is a side view of a pressure contour showing pressures within the mixing assembly having the modified radial louvered cone with a 25 degree louver opening.

FIG. 23 depicts a flow velocity contour profile 1600 showing fluid velocities of fluid flowing through the mixing assembly 200 having the top cone 800 of FIGS. 11-12 at the first operating exhaust inlet flow speed. In the implementation shown, the scooped inlets 810 have a 25 degree angled inlet opening relative to the sidewall of the top cone 800. FIG. 24 depicts a pressure contour profile 1700 showing fluid pressures within the mixing assembly 200 having the top cone 800 of FIGS. 11-12 at the first operating exhaust inlet flow speed. In the implementation shown, the scooped inlets 810 have a 25 degree angled inlet opening relative to the sidewall of the top cone 800.

Figure 26:
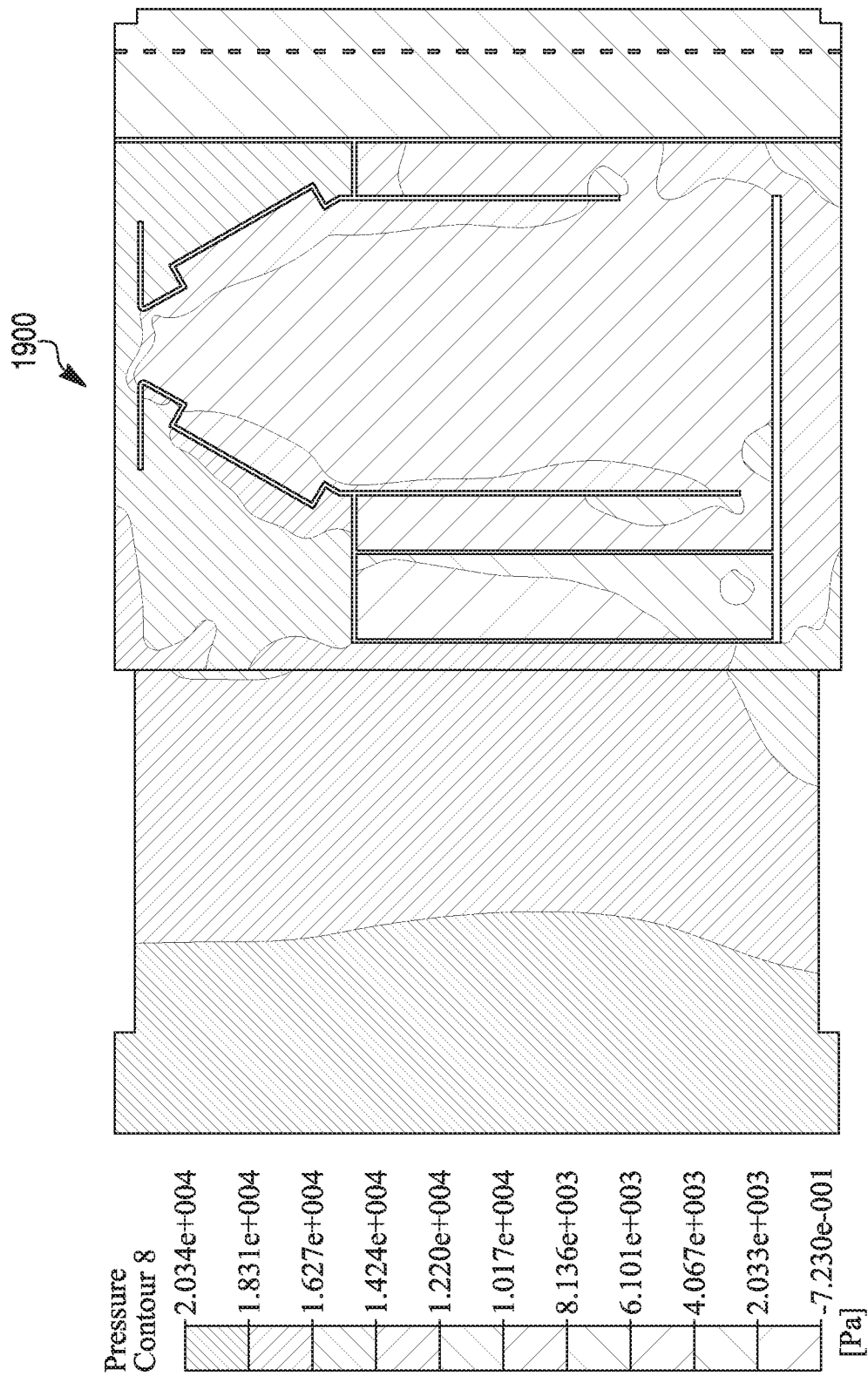
FIG. 26 is a side view of a pressure contour showing pressures within the mixing assembly having the modified radial louvered cone with a 30 degree louver opening.
Figure 27:
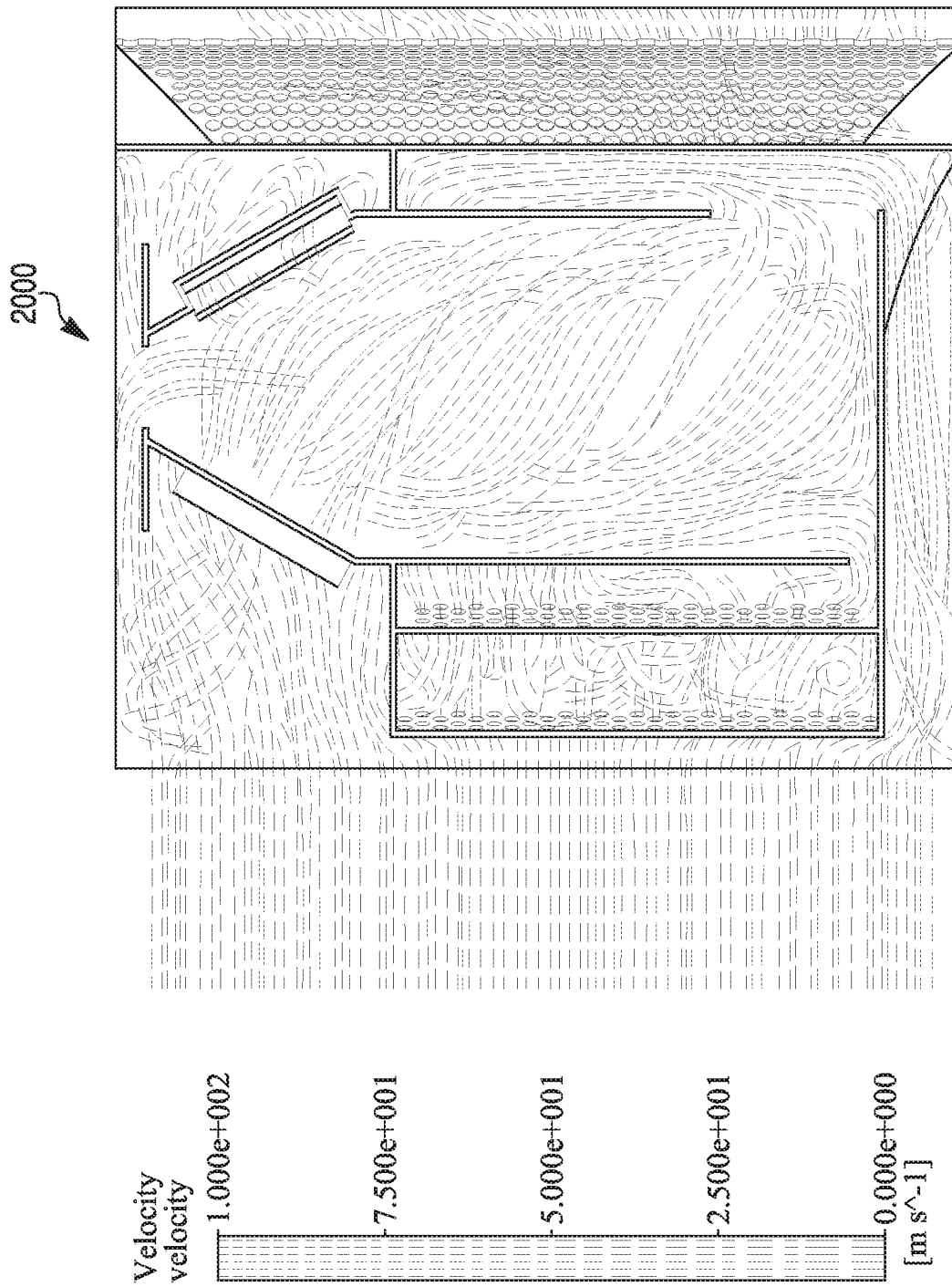
FIG. 27 is a fluid flow velocity path diagram showing fluid velocity paths within the mixing assembly having the modified radial louvered cone with a 30 degree louver opening.

FIG. 25 depicts a flow velocity contour profile 1800 showing fluid velocities of fluid flowing through the mixing assembly 200 having the top cone 800 of FIGS. 11-12 at the first operating exhaust inlet flow speed. In the implementation shown, the scooped inlets 810 have a 30 degree angled inlet opening relative to the sidewall of the top cone 800. FIG. 26 depicts a pressure contour profile 1900 showing fluid pressures within the mixing assembly 200 having the top cone 800 of FIGS. 11-12 at the first operating exhaust inlet flow speed. In the implementation shown, the scooped inlets 810 have a 30 degree angled inlet opening relative to the sidewall of the top cone 800. FIG. 27 depicts a flow velocity profile 2000 showing fluid velocities of fluid flowing through the mixing assembly 200 having the top cone 800 of FIGS. 11-12 at the first operating exhaust inlet flow speed. In the implementation shown, the scooped inlets 810 have a 30 degree angled inlet opening relative to the sidewall of the top cone 800.

Figure 29:
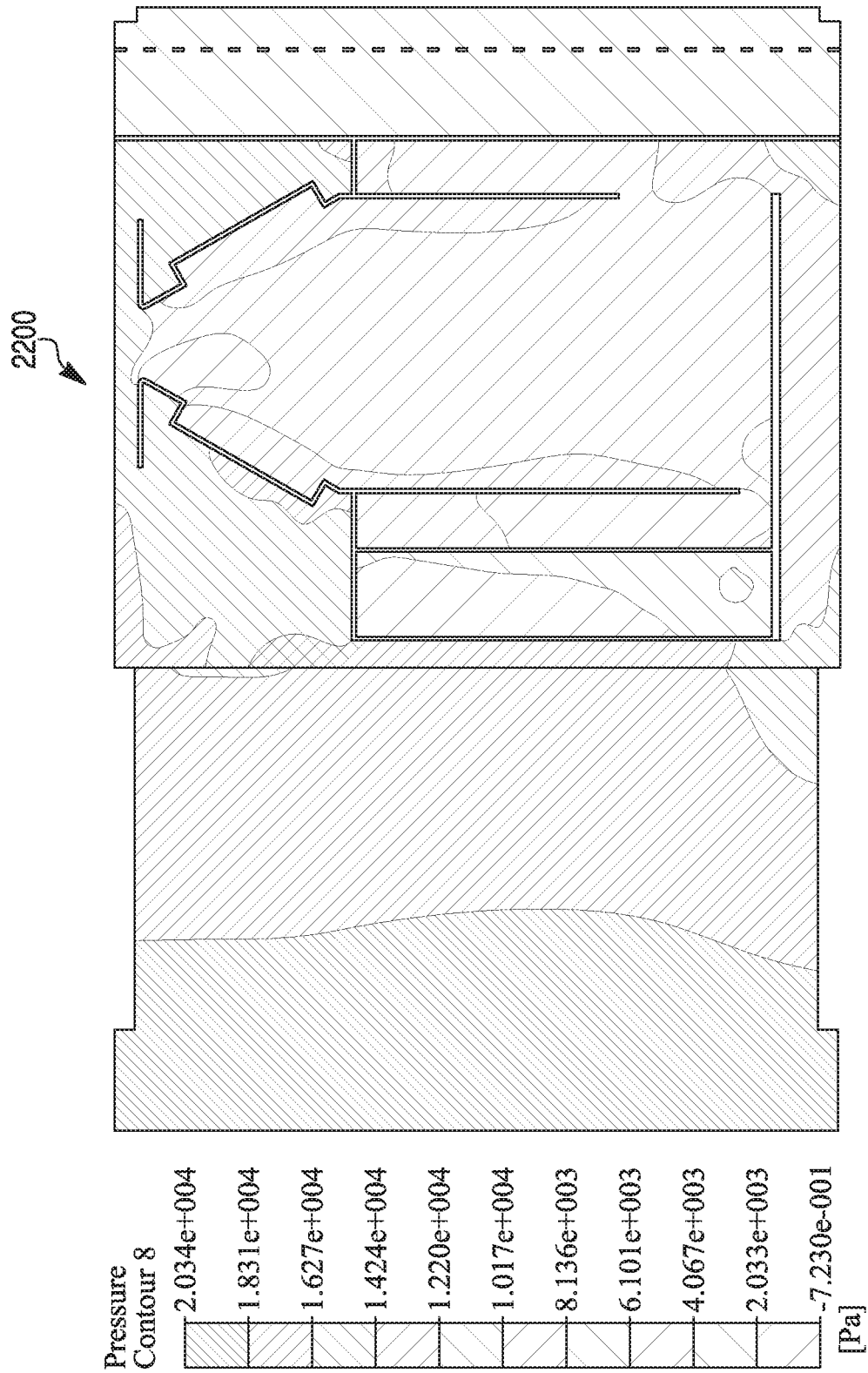
FIG. 29 is a side view of a pressure contour showing pressures within the mixing assembly having the modified radial louvered cone with a 35 degree louver opening.
Figure 30:
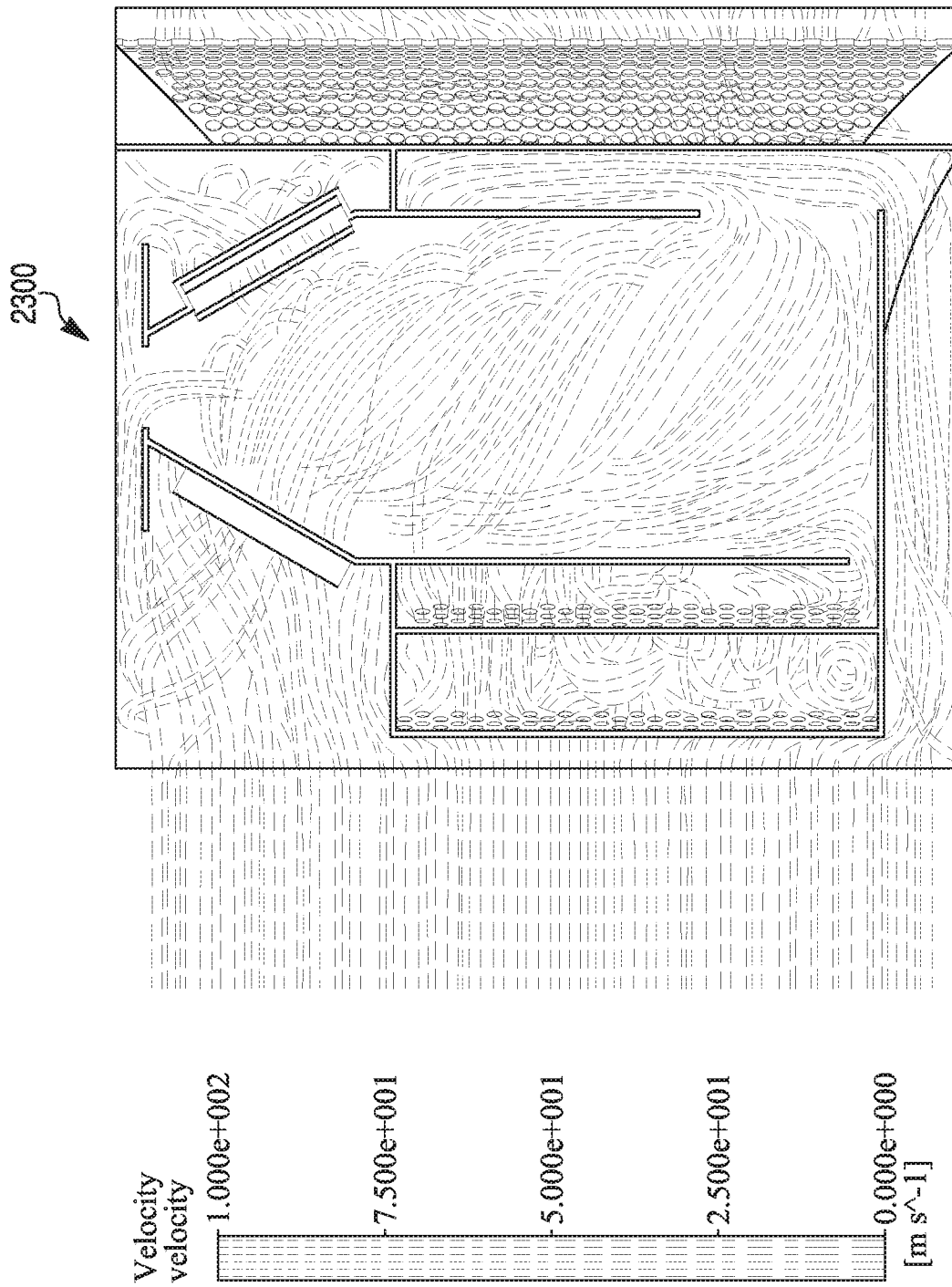
FIG. 30 is a fluid flow velocity path diagram showing fluid velocity paths within the mixing assembly having the modified radial louvered cone with a 35 degree louver opening.

FIG. 28 depicts a flow velocity contour profile 2100 showing fluid velocities of fluid flowing through the mixing assembly 200 having the top cone 800 of FIGS. 11-12 at the first operating exhaust inlet flow speed. In the implementation shown, the scooped inlets 810 have a 35 degree angled inlet opening relative to the sidewall of the top cone 800. FIG. 29 depicts a pressure contour profile 2200 showing fluid pressures within the mixing assembly 200 having the top cone 800 of FIGS. 11-12 at the first operating exhaust inlet flow speed. In the implementation shown, the scooped inlets 810 have a 35 degree angled inlet opening relative to the sidewall of the top cone 800. FIG. 30 depicts a flow velocity profile 2300 showing fluid velocities of fluid flowing through the mixing assembly 200 having the top cone 800 of FIGS. 11-12 at the first operating exhaust inlet flow speed. In the implementation shown, the scooped inlets 810 have a 35 degree angled inlet opening relative to the sidewall of the top cone 800.

Figure 32:
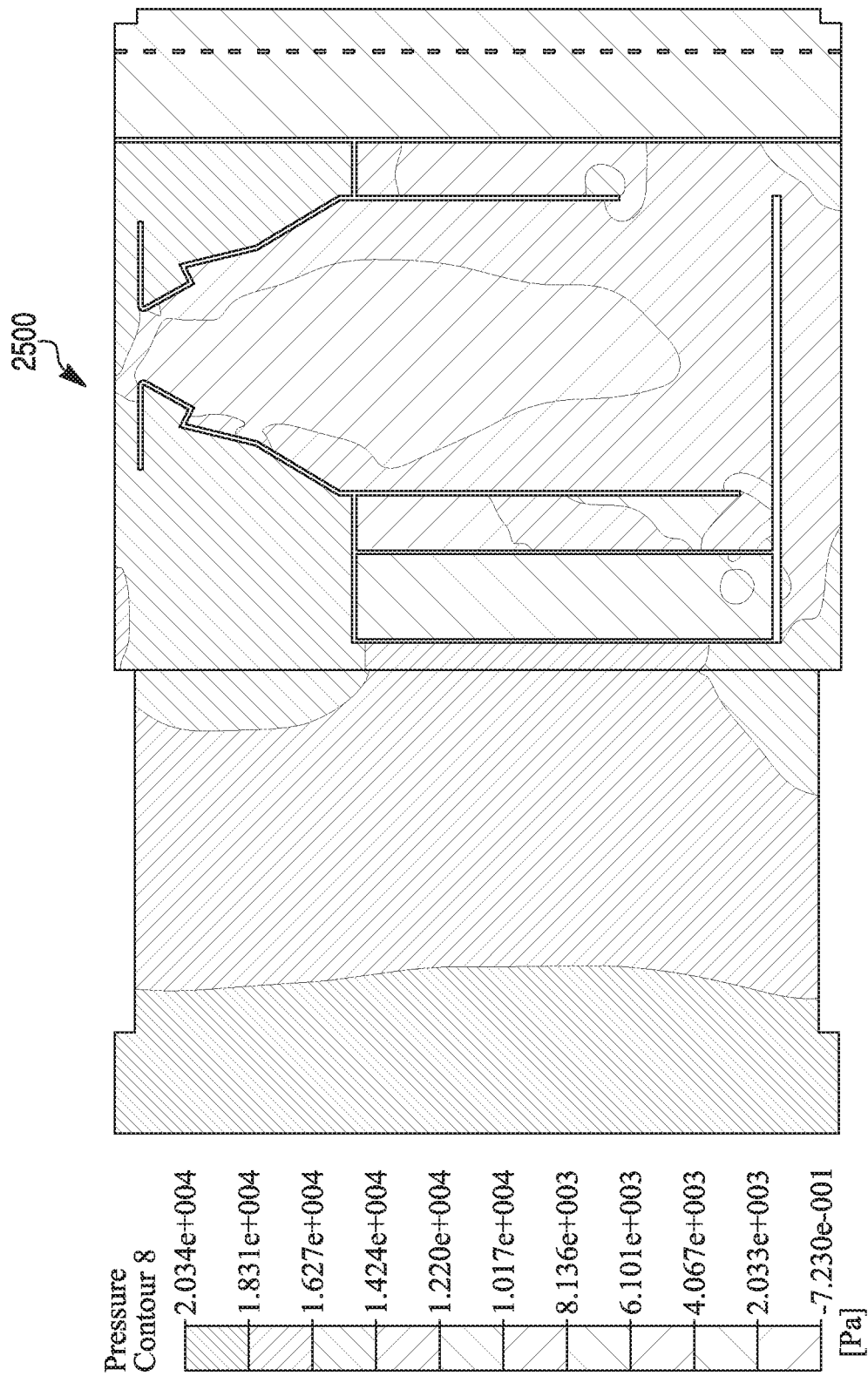
FIG. 32 is a side view of a pressure contour showing pressures within the mixing assembly having the modified radial louvered cone of FIGS. 13-14 with 30 degree louver openings angled at 30 degrees.
Figure 33:
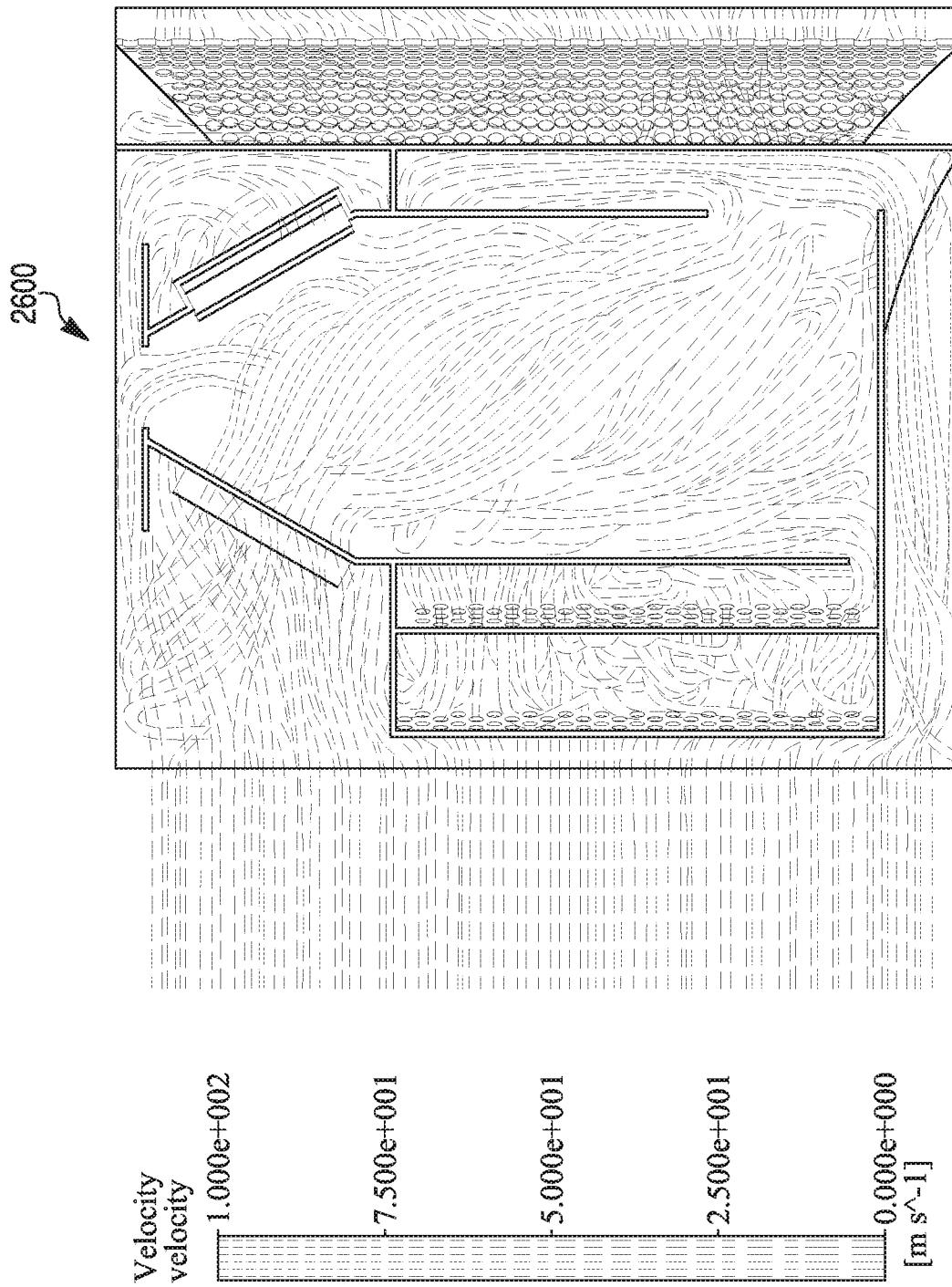
FIG. 33 is a fluid flow velocity path diagram showing fluid velocity paths within the mixing assembly having the modified radial louvered cone of FIGS. 13-14 with 30 degree louver openings angled at 30 degrees.

FIG. 31 depicts a flow velocity contour profile 2400 showing fluid velocities of fluid flowing through the mixing assembly 200 having the top cone 900 of FIGS. 13-14 at the first operating exhaust inlet flow speed. In the implementation shown, the scooped inlets 910 have a 30 degree angled inlet opening relative to the sidewall of the top cone 900 and are angled at 30 degrees on the sidewall of the top cone 900 relative to a vertical axis of the top cone 900. FIG. 32 depicts a pressure contour profile 2500 showing fluid pressures within the mixing assembly 200 having the top cone 900 of FIGS. 13-14 at the first operating exhaust inlet flow speed. In the implementation shown, the scooped inlets 910 have a 30 degree angled inlet opening relative to the sidewall of the top cone 900 and are angled at 30 degrees on the sidewall of the top cone 900 relative to a vertical axis of the top cone 900. FIG. 33 depicts a flow velocity profile 2600 showing fluid velocities of fluid flowing through the mixing assembly 200 having the top cone 900 of FIGS. 13-14 at the first operating exhaust inlet flow speed. In the implementation shown, the scooped inlets 910 have a 30 degree angled inlet opening relative to the sidewall of the top cone 900 and are angled at 30 degrees on the sidewall of the top cone 900 relative to a vertical axis of the top cone 900.

Figure 35:
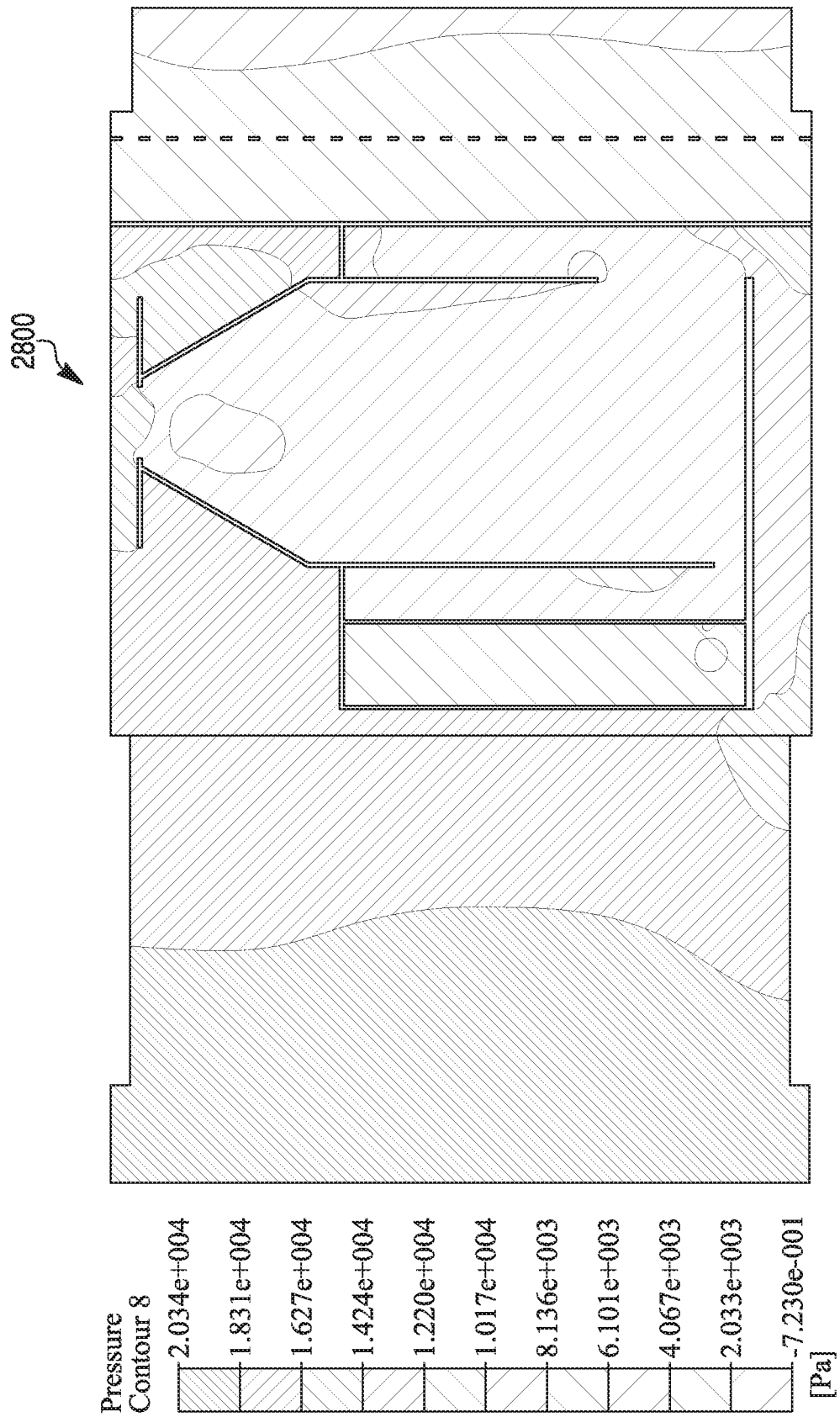
FIG. 35 is a side view of a pressure contour showing pressures within the mixing assembly having the modified radial louvered cone of FIGS. 15-16 with 10 degree louver openings.
Figure 36:
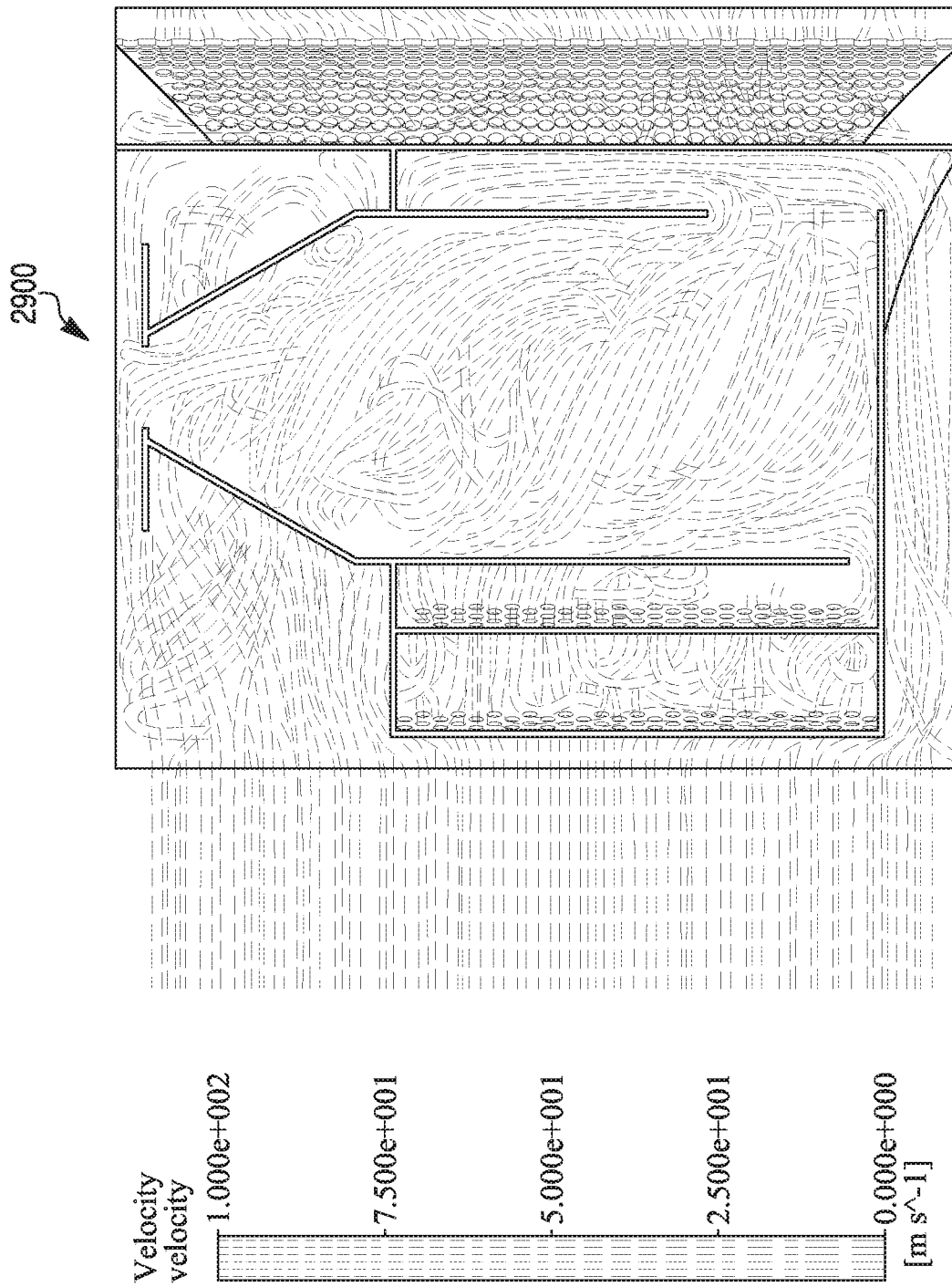
FIG. 36 is a fluid flow velocity path diagram showing fluid velocity paths within the mixing assembly having the modified radial louvered cone of FIGS. 15-16 with 10 degree louver openings.

FIG. 34 depicts a flow velocity contour profile 2700 showing fluid velocities of fluid flowing through the mixing assembly 200 having the top cone 1000 of FIGS. 15-16 at the first operating exhaust inlet flow speed. In the implementation shown, the inlet flaps 1010 have a 10 degree angled inlet opening relative to the sidewall of the top cone 1000. FIG. 35 depicts a pressure contour profile 2800 showing fluid pressures within the mixing assembly 200 having the top cone 1000 of FIGS. 15-16 at the first operating exhaust inlet flow speed. In the implementation shown, the inlet flaps 1010 have a 10 degree angled inlet opening relative to the sidewall of the top cone 1000. FIG. 36 depicts a flow velocity profile 2900 showing fluid velocities of fluid flowing through the mixing assembly 200 having the top cone 1000 of FIGS. 15-16 at the first operating exhaust inlet flow speed. In the implementation shown, the inlet flaps 1010 have a 10 degree angled inlet opening relative to the sidewall of the top cone 1000.

Figure 37:
FIG. 37 is a side view of fluid flow velocity showing a fluid velocity profile within the mixing assembly having the modified radial louvered cone of FIGS. 15-16 with 20 degree louver openings.
Figure 38:
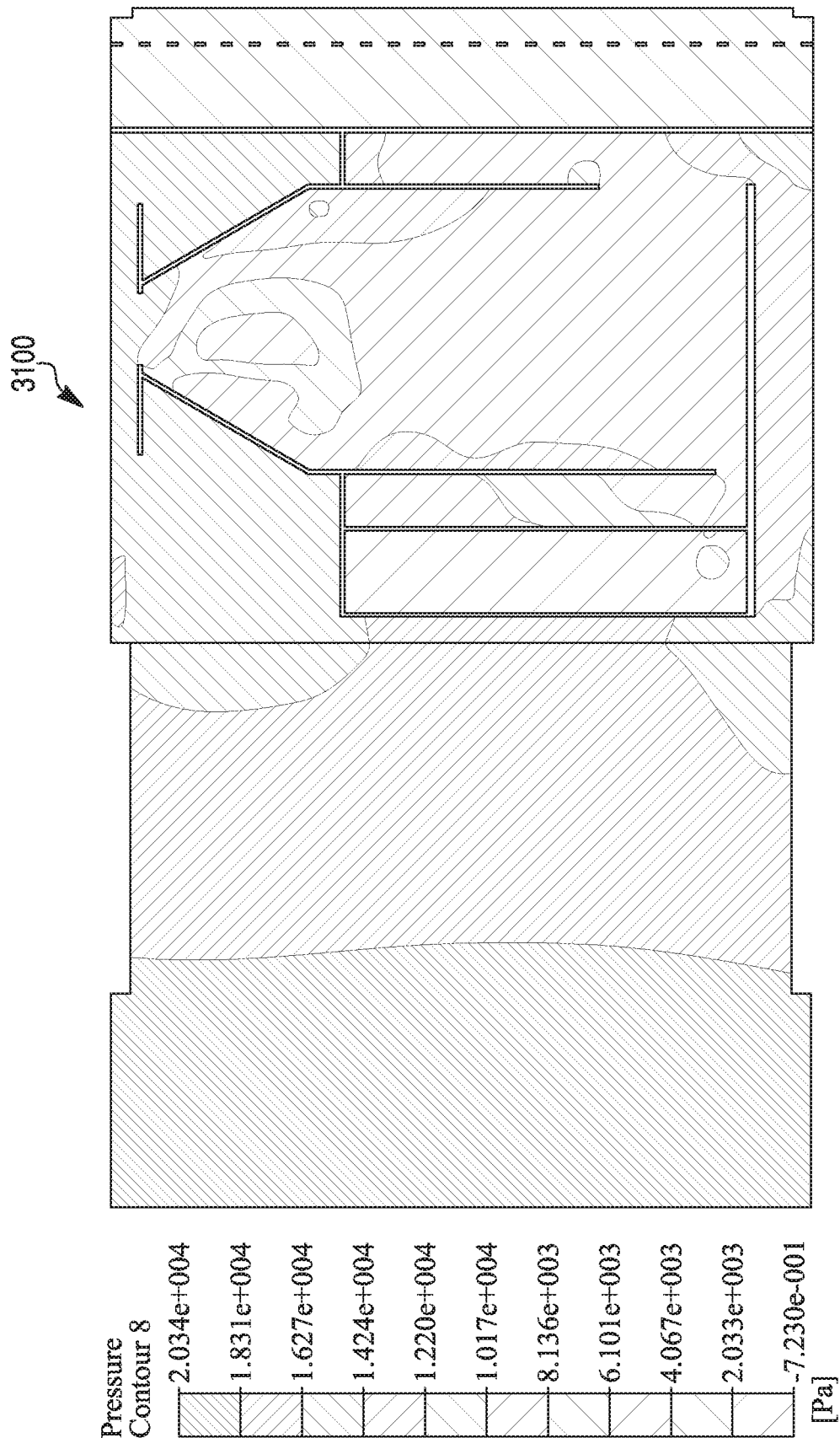
FIG. 38 is a side view of a pressure contour showing pressures within the mixing assembly having the modified radial louvered cone of FIGS. 15-16 with 20 degree louver openings.
Figure 39:
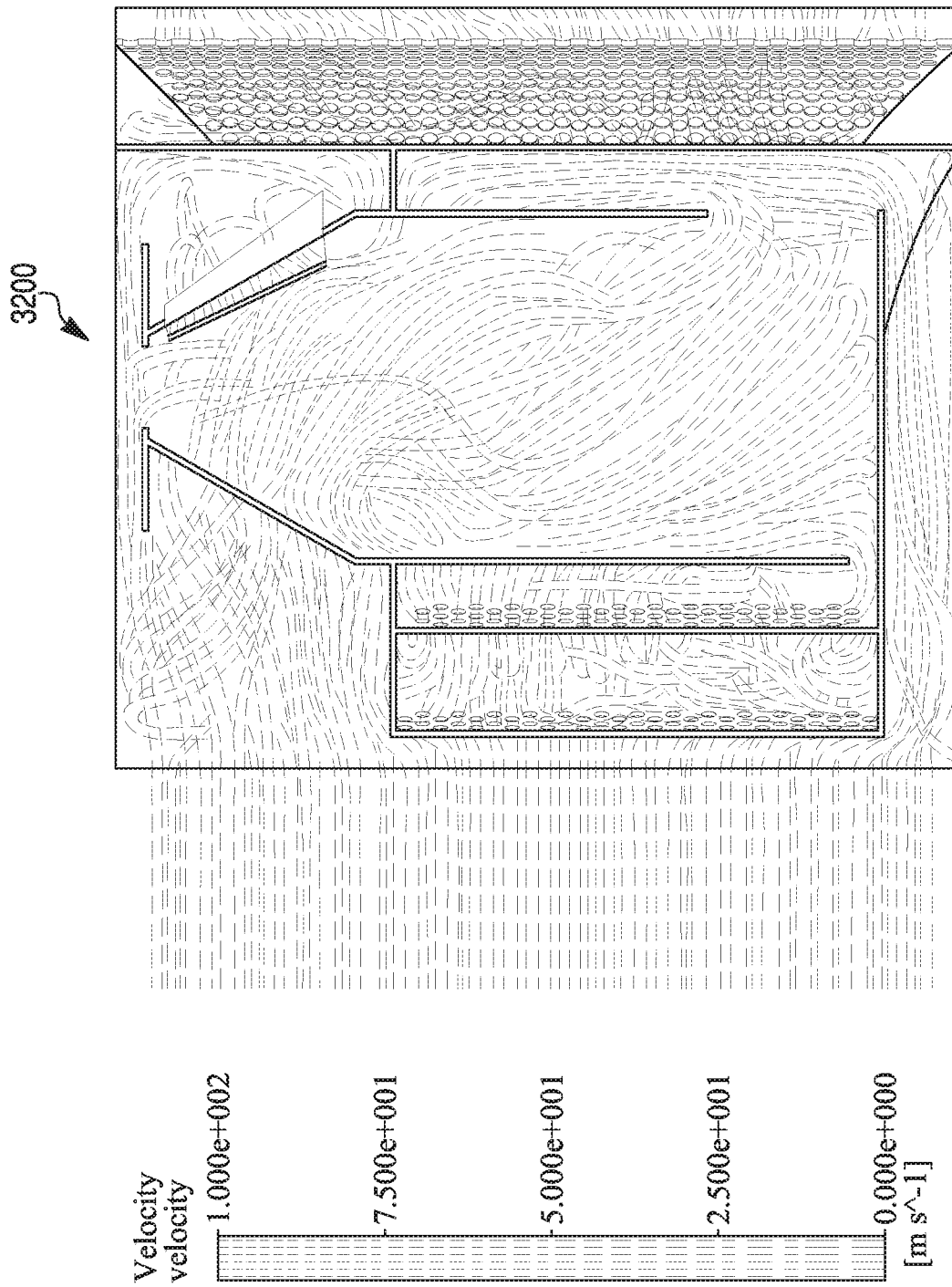
FIG. 39 is a fluid flow velocity path diagram showing fluid velocity paths within the mixing assembly having the modified radial louvered cone of FIGS. 15-16 with 20 degree louver openings.

FIG. 37 depicts a flow velocity contour profile 3000 showing fluid velocities of fluid flowing through the mixing assembly 200 having the top cone 1000 of FIGS. 15-16 at the first operating exhaust inlet flow speed. In the implementation shown, the inlet flaps 1010 have a 20 degree angled inlet opening relative to the sidewall of the top cone 1000. FIG. 38 depicts a pressure contour profile 3100 showing fluid pressures within the mixing assembly 200 having the top cone 1000 of FIGS. 15-16 at the first operating exhaust inlet flow speed. In the implementation shown, the inlet flaps 1010 have a 20 degree angled inlet opening relative to the sidewall of the top cone 1000. FIG. 39 depicts a flow velocity profile 3200 showing fluid velocities of fluid flowing through the mixing assembly 200 having the top cone 1000 of FIGS. 15-16 at the first operating exhaust inlet flow speed. In the implementation shown, the inlet flaps 1010 have a 20 degree angled inlet opening relative to the sidewall of the top cone 1000.

Figure 40:
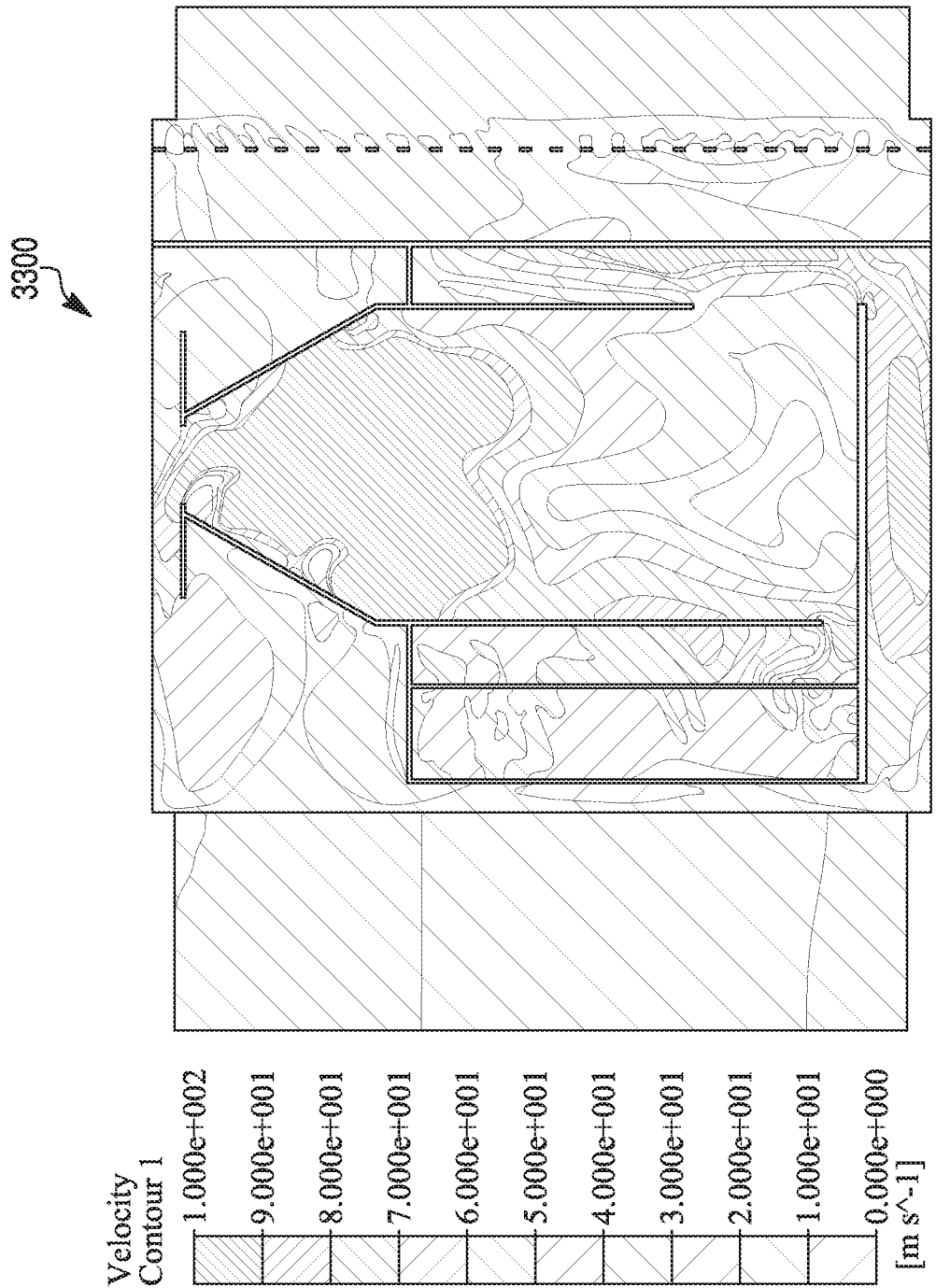
FIG. 40 is a side view of fluid flow velocity showing a fluid velocity profile within the mixing assembly having the modified radial louvered cone of FIGS. 15-16 with 30 degree louver openings.
Figure 41:
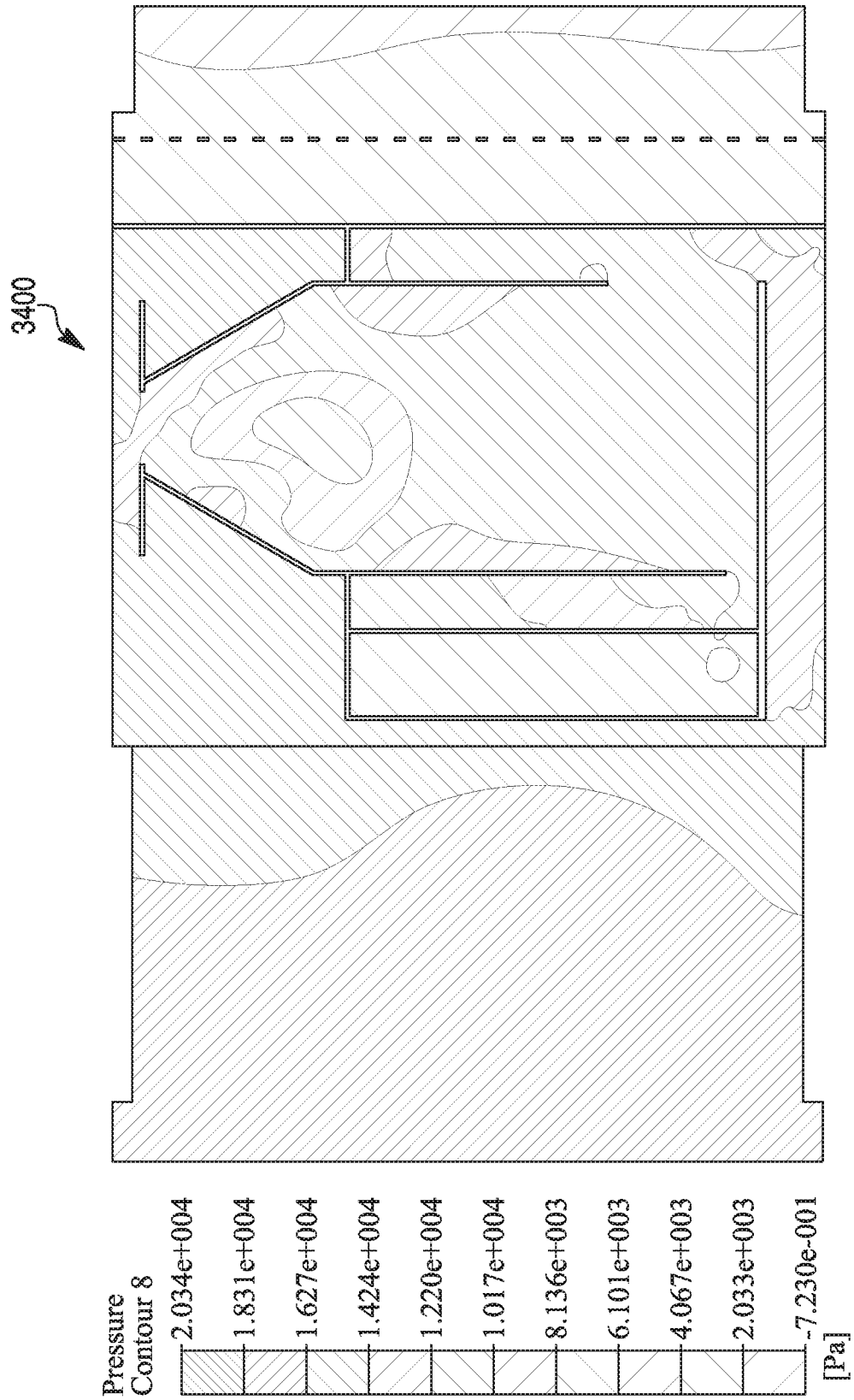
FIG. 41 is a side view of a pressure contour showing pressures within the mixing assembly having the modified radial louvered cone of FIGS. 15-16 with 30 degree louver openings.
Figure 42:
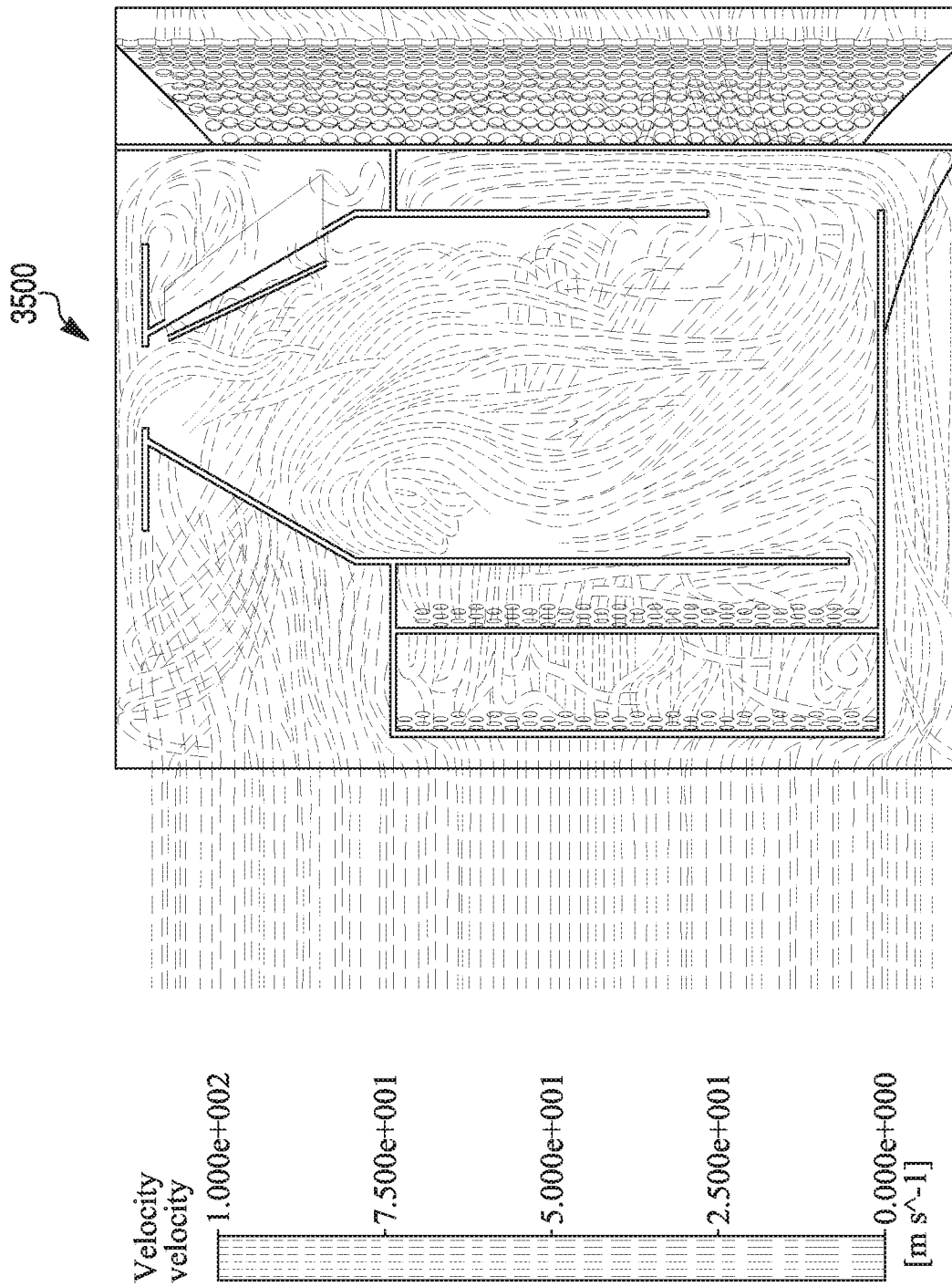
FIG. 42 is a fluid flow velocity path diagram showing fluid velocity paths within the mixing assembly having the modified radial louvered cone of FIGS. 15-16 with 30 degree louver openings.

FIG. 40 depicts a flow velocity contour profile 3300 showing fluid velocities of fluid flowing through the mixing assembly 200 having the top cone 1000 of FIGS. 15-16 at the first operating exhaust inlet flow speed. In the implementation shown, the inlet flaps 1010 have a 30 degree angled inlet opening relative to the sidewall of the top cone 1000. FIG. 41 depicts a pressure contour profile 3400 showing fluid pressures within the mixing assembly 200 having the top cone 1000 of FIGS. 15-16 at the first operating exhaust inlet flow speed. In the implementation shown, the inlet flaps 1010 have a 30 degree angled inlet opening relative to the sidewall of the top cone 1000. FIG. 42 depicts a flow velocity profile 3500 showing fluid velocities of fluid flowing through the mixing assembly 200 having the top cone 1000 of FIGS. 15-16 at the first operating exhaust inlet flow speed. In the implementation shown, the inlet flaps 1010 have a 30 degree angled inlet opening relative to the sidewall of the top cone 1000.

Figure 43:
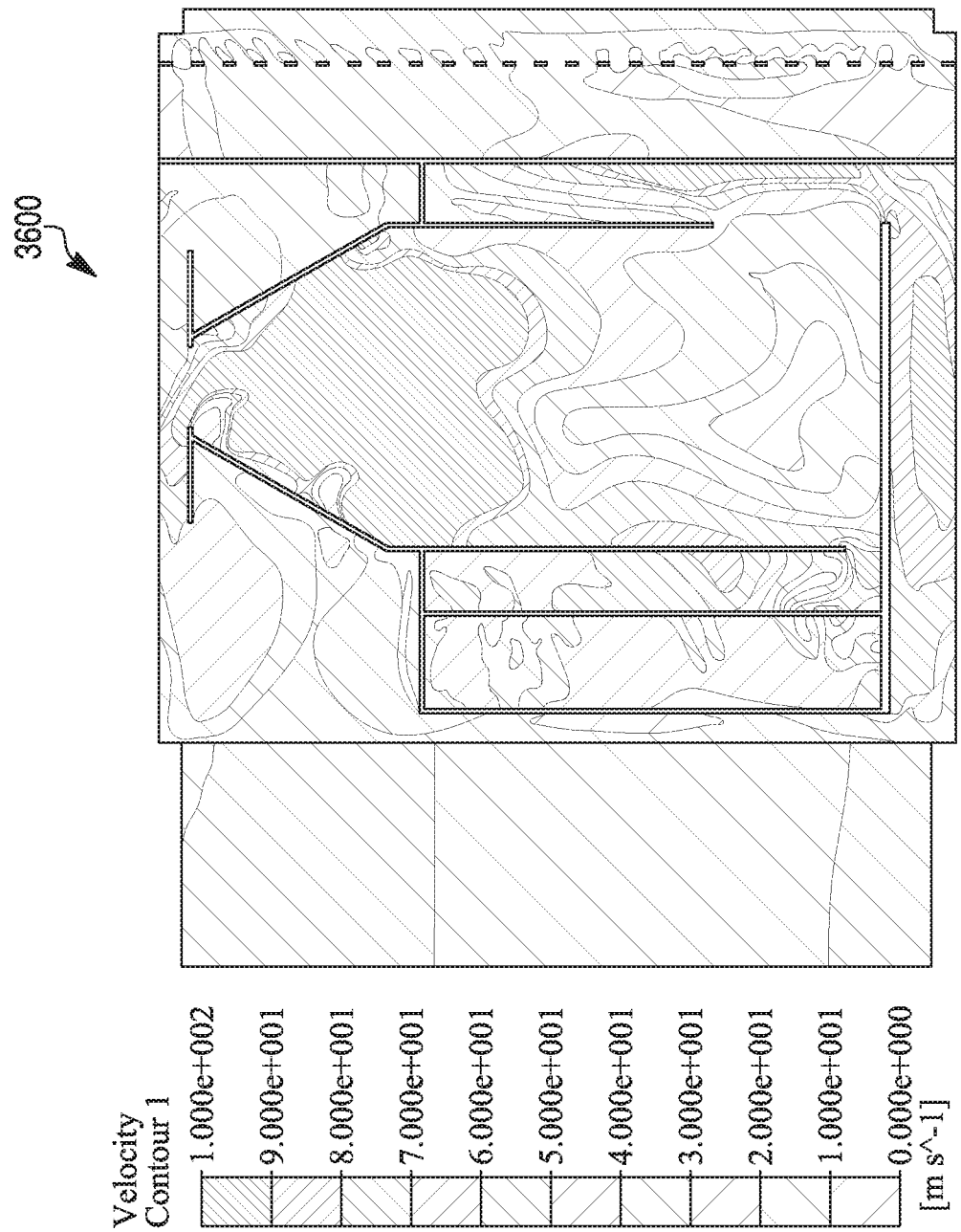
FIG. 43 is a side view of fluid flow velocity showing a fluid velocity profile within the mixing assembly having the modified radial louvered cone of FIGS. 15-16 with 35 degree louver openings.
Figure 44:
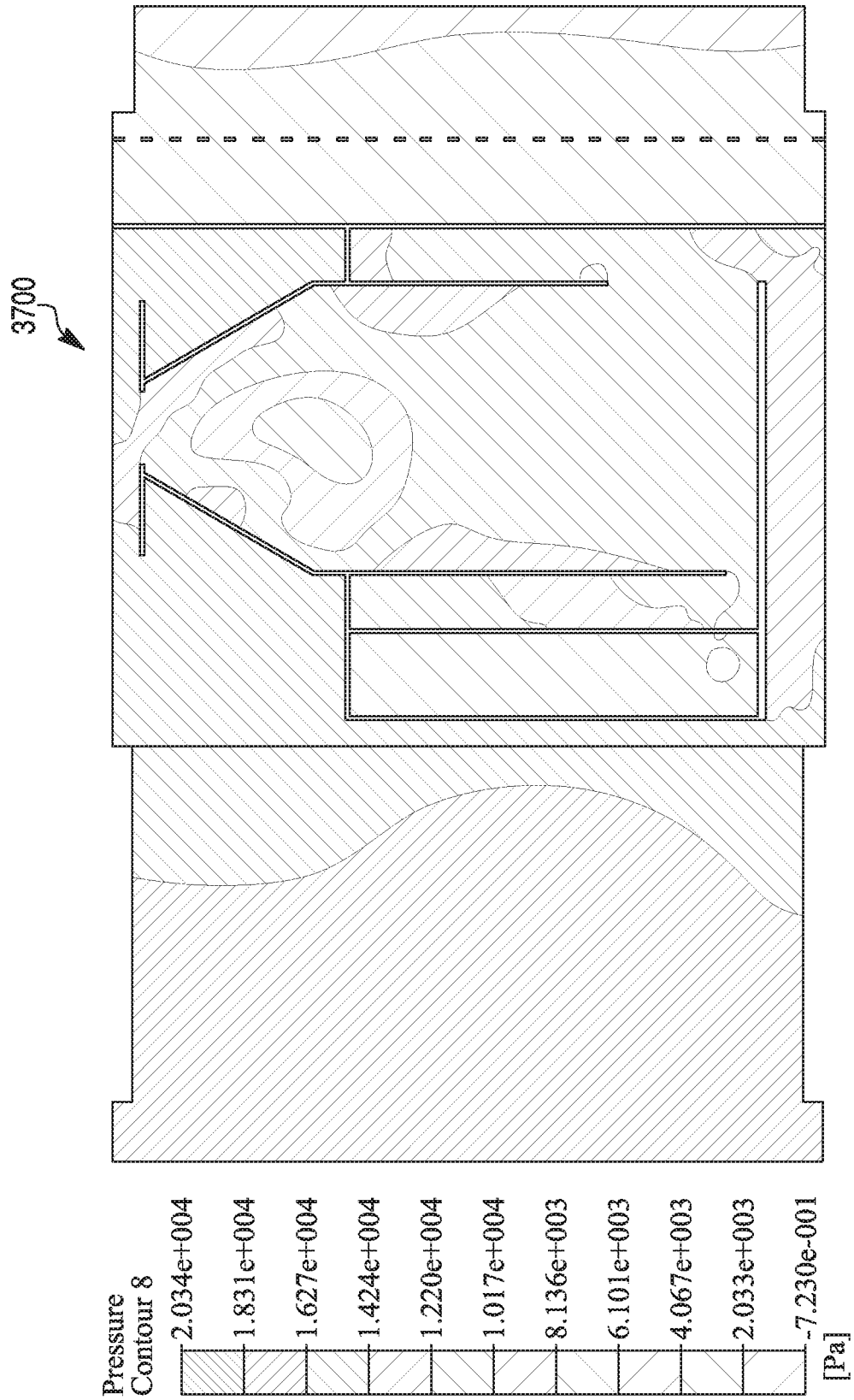
FIG. 44 is a side view of a pressure contour showing pressures within the mixing assembly having the modified radial louvered cone of FIGS. 15-16 with 35 degree louver openings.
Figure 45:
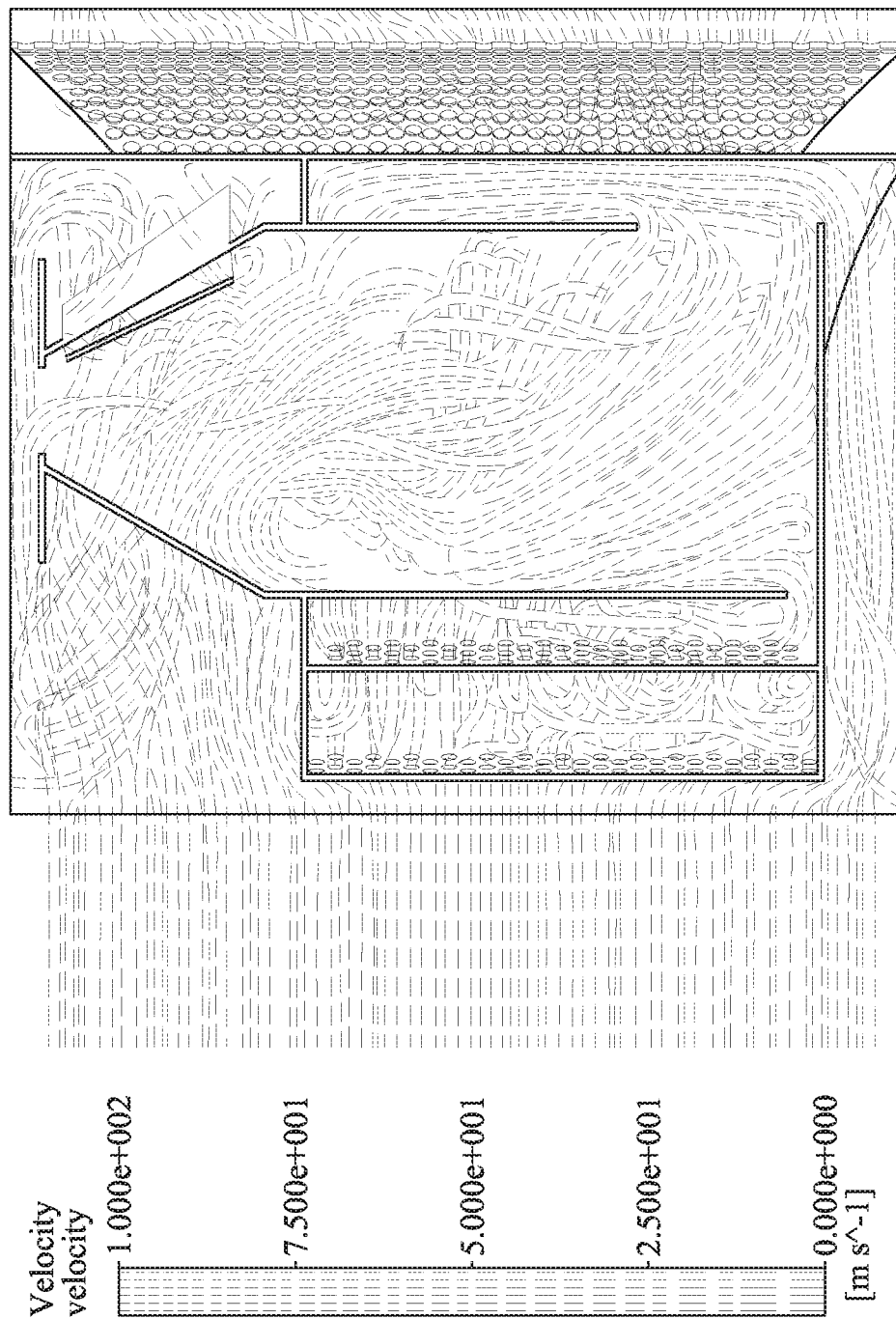
FIG. 45 is a fluid flow velocity path diagram showing fluid velocity paths within the mixing assembly having the modified radial louvered cone of FIGS. 15-16 with 35 degree louver openings.

FIG. 43 depicts a flow velocity contour profile 3600 showing fluid velocities of fluid flowing through the mixing assembly 200 having the top cone 1000 of FIGS. 15-16 at the first operating exhaust inlet flow speed. In the implementation shown, the inlet flaps 1010 have a 35 degree angled inlet opening relative to the sidewall of the top cone 1000. FIG. 44 depicts a pressure contour profile 3700 showing fluid pressures within the mixing assembly 200 having the top cone 1000 of FIGS. 15-16 at the first operating exhaust inlet flow speed. In the implementation shown, the inlet flaps 1010 have a 35 degree angled inlet opening relative to the sidewall of the top cone 1000. FIG. 45 depicts a flow velocity profile 3800 showing fluid velocities of fluid flowing through the mixing assembly 200 having the top cone 1000 of FIGS. 15-16 at the first operating exhaust inlet flow speed. In the implementation shown, the inlet flaps 1010 have a 35 degree angled inlet opening relative to the sidewall of the top cone 1000.

Figure 46:
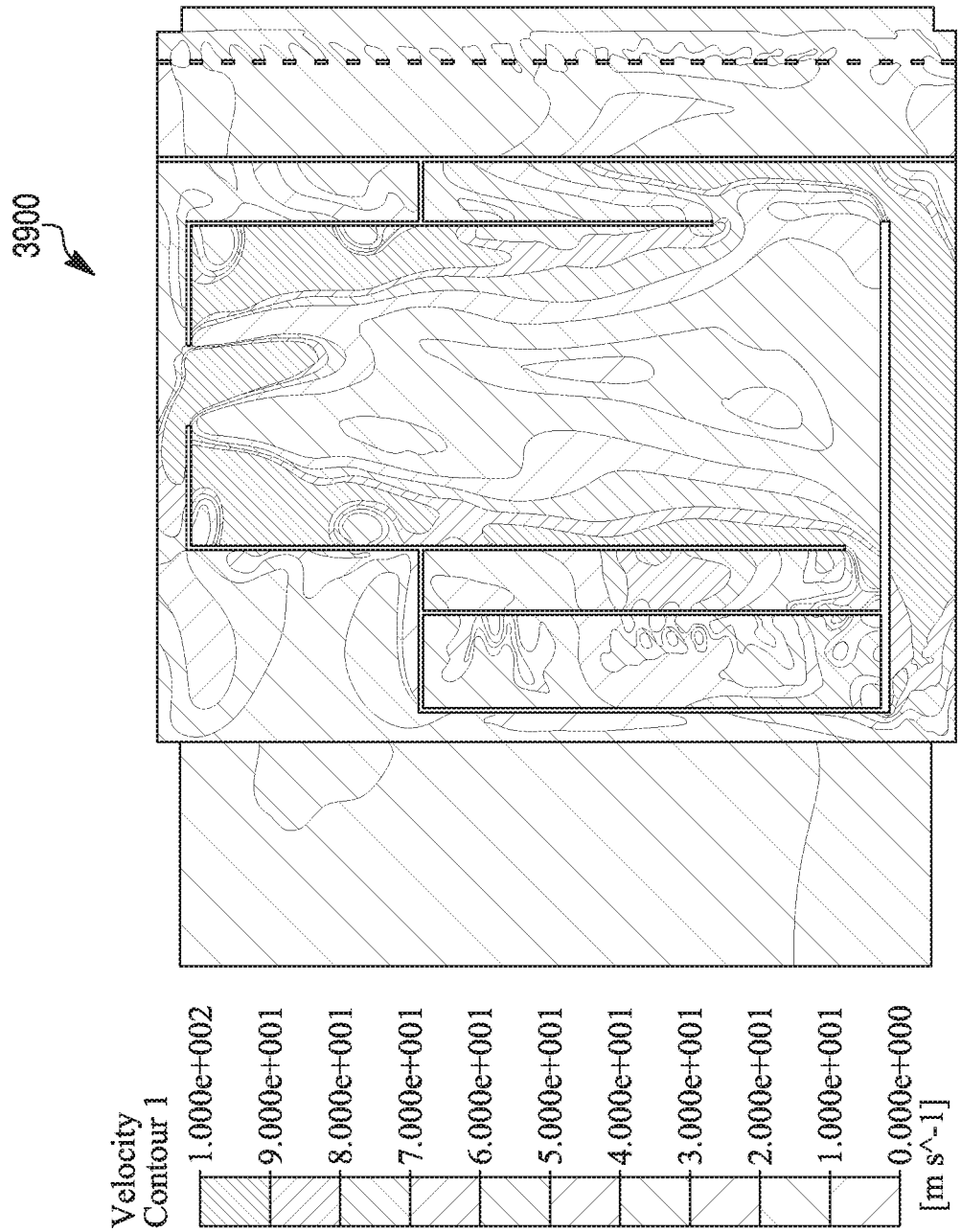
FIG. 46 is a side view of fluid flow velocity showing a fluid velocity profile within the mixing assembly having the louvered cylinder of FIGS. 17-18.
Figure 47:
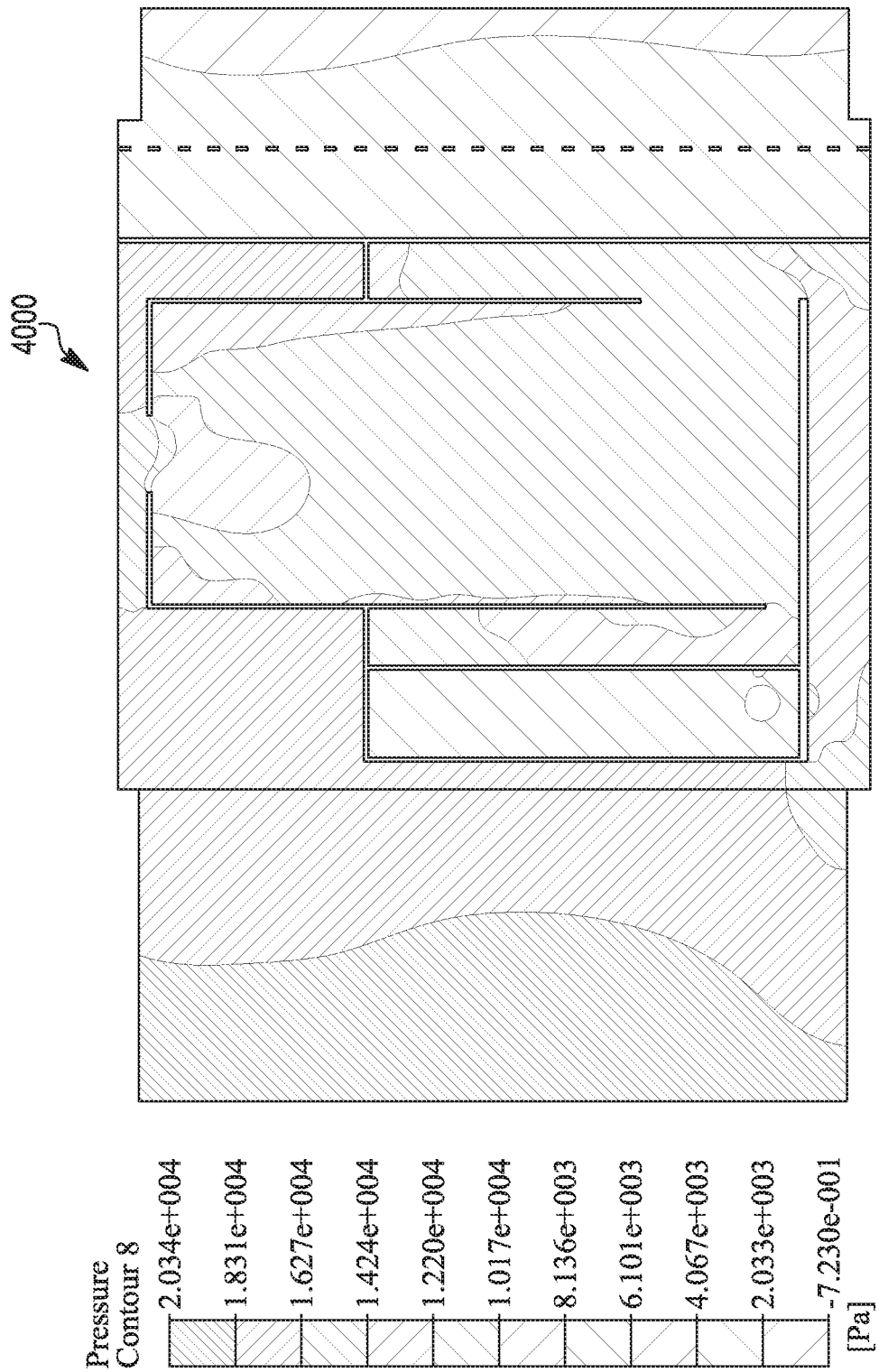
FIG. 47 is a side view of a pressure contour showing pressures within the mixing assembly having the louvered cylinder of FIGS. 17-18.

FIG. 46 depicts a flow velocity contour profile 3900 showing fluid velocities of fluid flowing through the mixing assembly 200 having the cylinder 1100 of FIGS. 17-18 at the first operating exhaust inlet flow speed. FIG. 47 depicts a pressure contour profile 4000 showing fluid pressures within the mixing assembly 200 having the cylinder 1100 of FIGS. 17-18 at the first operating exhaust inlet flow speed. In FIG. 45 depicts a flow velocity profile 4100 showing fluid velocities of fluid flowing through the mixing assembly 200 having the cylinder 1 of FIGS. 17-18 at the first operating exhaust inlet flow speed.

Figure 49:
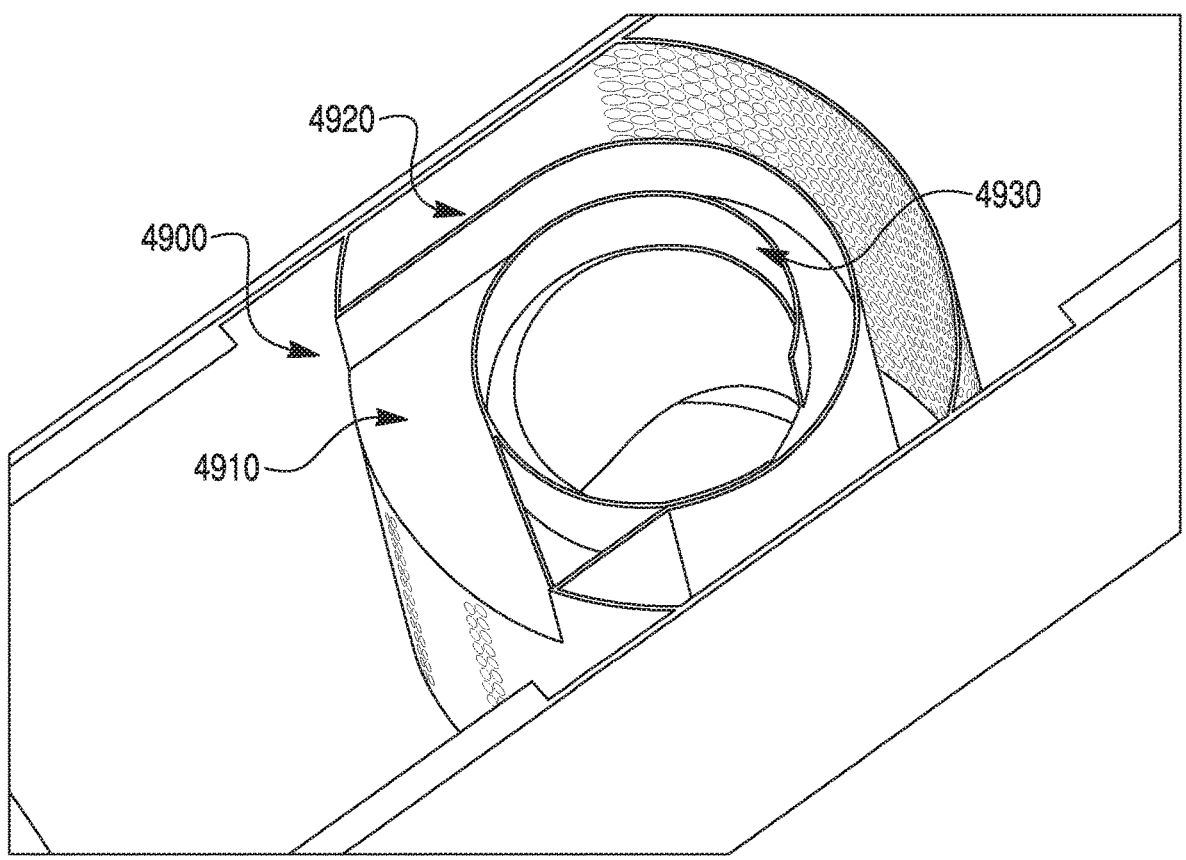
FIG. 49 is a perspective view of the mixing assembly of FIGS. 2-6 with a swirl assembly.

FIG. 49 depicts a swirl inducer 4900 in lieu of the top cone 240 for the mixing assembly 200 of FIGS. 2-6. In the implementation shown, the swirl inducer 4900 includes an inlet 4910, an outer wall 4920, and an inner wall 4930. The outer wall 4920 and inner wall 4920 defined a swirl path 4930 for exhaust gas entering through the inlet 4910 and entering into an interior of the inner tube 230.

While this specification contains many specific implementation details, these should not be construed as limitations on the scope of what may be claimed, but rather as descriptions of features specific to particular implementations. Certain features described in this specification in the context of separate implementations can also be implemented in combination in a single implementation. Conversely, various features described in the context of a single implementation can also be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, the separation of various system components in the implementations described above should not be understood as requiring such separation in all implementations, and it should be understood that the described components and systems can generally be integrated in a single product or packaged into multiple products embodied on tangible media.

As utilized herein, the terms "approximately," "about," "substantially", and similar terms are intended to have a broad meaning in harmony with the common and accepted usage by those of ordinary skill in the art to which the subject matter of this disclosure pertains. It should be understood by those of skill in the art who review this disclosure that these terms are intended to allow a description of certain features described and claimed without restricting the scope of these features to the precise numerical ranges provided. Accordingly, these terms should be interpreted as indicating that insubstantial or inconsequential modifications or alterations of the subject matter described and claimed are considered to be within the scope of the invention as recited in the appended claims. Additionally, it is noted that limitations in the claims should not be interpreted as constituting "means plus function" limitations under the United States patent laws in the event that the term "means" is not used therein.

The terms "coupled," "connected," and the like as used herein mean the joining of two components directly or indirectly to one another. Such joining may be stationary (e.g., permanent) or moveable (e.g., removable or releasable). Such joining may be achieved with the two components or the two components and any additional intermediate components being integrally formed as a single unitary body with one another or with the two components or the two components and any additional intermediate components being attached to one another.

The terms "fluidly coupled," "in fluid communication," and the like as used herein mean the two components or objects have a pathway formed between the two components or objects in which a fluid, such as water, air, gaseous reductant, gaseous ammonia, etc., may flow, either with or without intervening components or objects. Examples of fluid couplings or configurations for enabling fluid communication may include piping, channels, or any other suitable components for enabling the flow of a fluid from one component or object to another.

It is important to note that the construction and arrangement of the system shown in the various exemplary implementations is illustrative only and not restrictive in character. All changes and modifications that come within the spirit and/or scope of the described implementations are desired to be protected. It should be understood that some features may not be necessary and implementations lacking the various features may be contemplated as within the scope of the application, the scope being defined by the claims that follow. In reading the claims, it is intended that when words such as "a," "an," "at least one," or "at least one portion" are used there is no intention to limit the claim to only one item unless specifically stated to the contrary in the claim. When the language "at least a portion" and/or "a portion" is used the item can include a portion and/or the entire item unless specifically stated to the contrary.

What is claimed is:

1. A mixing assembly comprising:
an outer body defining an interior volume and having a first center axis;
a front plate defining an upstream portion of the interior volume;
a back plate defining a downstream portion of the interior volume;
a middle member defining a volume and having a second center axis, the second center axis being transverse to the first center axis; and
an inner member positioned coaxially with the middle member inside the volume defined by the middle member;
wherein the front plate comprises inlets configured to direct exhaust to (i) a first flow path into an interior of the inner member, (ii) a second flow path into the volume of the middle member between a sidewall of the middle member and a sidewall of the inner member, and (iii) a third flow path into the interior volume of the outer body.

2. The mixing assembly of claim 1, wherein the front plate comprises a plurality of openings.

3. The mixing assembly of claim 1, wherein the back plate comprises a plurality of openings.

4. The mixing assembly of claim 1 further comprising a top cone coupled to a first end of the inner member.

5. The mixing assembly of claim 4, wherein the top cone defines an exhaust assist opening and comprises a side wall defining a plurality of inlets.

6. The mixing assembly of claim 5, wherein the plurality of inlets defined by the sidewall of the top cone are scooped inlets.

7. The mixing assembly of claim 5, wherein the plurality of inlets defined by the sidewall of the top cone comprise inlet flaps.

8. The mixing assembly of claim 5, wherein the plurality of inlets defined by the sidewall of the top cone are configured to direct exhaust to a first portion of the first flow path and the exhaust assist opening is configured to direct exhaust to a second portion of the first flow path.

9. The mixing assembly of claim 1, wherein the exhaust of the first flow path and the exhaust of the second flow path mix at a second end of the inner member.

10. An exhaust assembly comprising:
a catalyst; and
a mixing assembly positioned upstream of the catalyst, the mixing assembly comprising:
an outer body defining an interior volume and having a first center axis;
a front perforation plate defining an upstream portion of the interior volume;
a back perforation plate defining a downstream portion of the interior volume;
a middle cylinder defining a volume and having a second center axis, the second center axis being transverse to the first center axis; and
an inner tube positioned coaxially with the middle cylinder inside the volume defined by the middle cylinder;
wherein the front perforation plate comprises inlets configured to direct exhaust to (i) a first flow path into an interior of the inner tube, (ii) a second flow path into the volume of the middle cylinder between a sidewall of the middle cylinder and a sidewall of the inner tube, and (iii) a third flow path into the interior volume of the outer body.

11. The exhaust assembly of claim 10 further comprising a top cone coupled to a first end of the inner tube, wherein the top cone defines an exhaust assist opening and comprises a sidewall defining a plurality of inlets.

12. The exhaust assembly of claim 11, wherein the plurality of inlets defined by the sidewall of the top cone are scooped inlets.

13. The exhaust assembly of claim 11, wherein the plurality of inlets defined by the sidewall of the top cone are inlet flaps.

14. An exhaust aftertreatment assembly comprising:
a doser; and
a top cone, the top cone comprising:
a sidewall defining a conical shape and having a plurality of inlets;
an upper opening at an upper end of the sidewall, the upper opening having a diameter based, at least in part, on a spray cone diameter for reductant spray from the doser at a spray break-up length for the doser; and
a bottom opening at a lower end of the sidewall,
wherein the conical shape defined by the sidewall forms an angle relative to a central axis, the angle based, at least in part, on a spray angle for reductant spray from the doser.

15. The exhaust aftertreatment assembly of claim 14, wherein the plurality of inlets of the sidewall of the top cone are scooped inlets.

16. The exhaust aftertreatment assembly of claim 14, wherein the plurality of inlets of the sidewall of the top cone are inlet flaps.

17. The exhaust aftertreatment assembly of claim 14 further comprising an exhaust assist port coupled to the sidewall of the top cone, the exhaust assist port having an opening coaxially aligned with the upper opening.

18. The exhaust aftertreatment assembly of claim 17, wherein the plurality of inlets of the sidewall of the top cone are configured to direct exhaust to a first portion of a first flow path through the top cone and the exhaust assist port is configured to direct exhaust to a second portion of the first flow path through the top cone.

19. The exhaust aftertreatment assembly of claim 14, wherein the bottom opening is coupled to a downstream mixing component.

20. The exhaust aftertreatment assembly of claim 19, wherein the downstream mixing component is an inner member positioned at an angle relative to an upstream exhaust flow.

* * * * *